US008868508B2

(12) United States Patent
Drobychev et al.

(10) Patent No.: US 8,868,508 B2
(45) Date of Patent: Oct. 21, 2014

(54) STORAGE OF DATA IN A DISTRIBUTED STORAGE SYSTEM

(75) Inventors: Alexandre Drobychev, San Jose, CA (US); Alexander Kesselman, Sunnyvale, CA (US); Rebekah C. Vickrey, Mountain View, CA (US); Frank C. Dachille, Mountain View, CA (US); George Datuashvili, Cupertino, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 13/023,503

(22) Filed: Feb. 8, 2011

(65) Prior Publication Data

US 2011/0196833 A1 Aug. 11, 2011

Related U.S. Application Data

(60) Provisional application No. 61/302,930, filed on Feb. 9, 2010.

(51) Int. Cl.
*G06F 7/00* (2006.01)
*G06F 17/00* (2006.01)
*G06F 17/30* (2006.01)

(52) U.S. Cl.
CPC .............................. *G06F 17/30575* (2013.01)
USPC ........................... 707/652; 707/644; 707/640

(58) Field of Classification Search
None
See application file for complete search history.

(56) References Cited

U.S. PATENT DOCUMENTS

| 6,167,427 | A | 12/2000 | Rabinovich et al. |
|---|---|---|---|
| 6,226,650 | B1 | 5/2001 | Mahajan et al. |
| 6,591,351 | B1 | 7/2003 | Urabe et al. |
| 6,728,751 | B1 | 4/2004 | Cato et al. |
| 6,857,012 | B2 * | 2/2005 | Sim et al. ...................... 709/222 |
| 6,883,068 | B2 | 4/2005 | Tsirigotis et al. |
| 6,973,464 | B1 | 12/2005 | Gao |
| 7,107,419 | B1 | 9/2006 | Ghemawat et al. |
| 7,251,670 | B1 | 7/2007 | Day |

(Continued)

FOREIGN PATENT DOCUMENTS

EP 1 860 542 A2 11/2007

OTHER PUBLICATIONS

Google Inc., PCT/US2011/024246, Feb. 9, 2011, International Search Report and Written Opinion mailed Apr. 26, 2011, 9 pgs.

(Continued)

*Primary Examiner* — Fred I Ehichioya
*Assistant Examiner* — Jau-Shya Meng
(74) *Attorney, Agent, or Firm* — Morgan, Lewis & Bockius LLP

(57) ABSTRACT

A distributed storage system has multiple instances. There is a plurality of local instances, and at least some of the local instances are at physically distinct geographic locations. Each local instance is configured to store data for a non-empty set of blobs in a plurality of data stores having a plurality of distinct data store types. In addition, each local instance stores metadata for the respective set of blobs in a metadata store distinct from the data stores. There is also a plurality of global instances. Each global instance is configured to store data for zero or more blobs in zero or more data stores and store metadata for all blobs stored at any local or global instance. The system selects one global instance to run a replication module that replicates blobs between instances according to blob policies.

12 Claims, 35 Drawing Sheets

(56) References Cited

U.S. PATENT DOCUMENTS

| | | |
|---|---|---|
| 7,293,154 B1 | 11/2007 | Karr et al. |
| 7,320,059 B1 | 1/2008 | Armangau et al. |
| 7,450,503 B1 | 11/2008 | Ginjpalli et al. |
| 7,506,338 B2 | 3/2009 | Alpern et al. |
| 7,558,927 B2 | 7/2009 | Clark et al. |
| 7,567,973 B1 | 7/2009 | Burrows et al. |
| 7,571,144 B2 | 8/2009 | Beckstrom et al. |
| 7,647,329 B1 | 1/2010 | Fischman et al. |
| 7,653,668 B1 | 1/2010 | Shelat et al. |
| 7,660,836 B2 | 2/2010 | Bolik et al. |
| 7,716,171 B2 | 5/2010 | Kryger |
| 7,761,412 B2 | 7/2010 | Talius et al. |
| 7,761,678 B1 | 7/2010 | Bodmer et al. |
| 7,774,444 B1 | 8/2010 | George et al. |
| 7,778,972 B1 | 8/2010 | Cormie et al. |
| 7,778,984 B2 | 8/2010 | Zhang et al. |
| 7,885,928 B2 * | 2/2011 | Harrington et al. ........... 707/637 |
| 7,958,088 B2 | 6/2011 | Yerneni et al. |
| 8,010,514 B2 | 8/2011 | Zhang et al. |
| 8,099,388 B2 | 1/2012 | Shen et al. |
| 8,112,510 B2 | 2/2012 | Alon et al. |
| 8,190,561 B1 | 5/2012 | Poole et al. |
| 8,484,206 B2 | 7/2013 | Schmidt et al. |
| 2002/0078300 A1 | 6/2002 | Dharap |
| 2002/0147774 A1 | 10/2002 | Lisiecki et al. |
| 2003/0033308 A1 | 2/2003 | Patel et al. |
| 2003/0149709 A1 | 8/2003 | Banks |
| 2004/0199810 A1 | 10/2004 | Tarcea et al. |
| 2004/0215650 A1 | 10/2004 | Shaji et al. |
| 2004/0236763 A1 | 11/2004 | Krishnamoorthy et al. |
| 2005/0125325 A1 | 6/2005 | Chai et al. |
| 2005/0160078 A1 | 7/2005 | Benson et al. |
| 2005/0198359 A1 | 9/2005 | Basani et al. |
| 2006/0026219 A1 | 2/2006 | Orenstein et al. |
| 2006/0112140 A1 | 5/2006 | McBride et al. |
| 2006/0221190 A1 | 10/2006 | Limberis et al. |
| 2006/0253498 A1 | 11/2006 | Barrs et al. |
| 2006/0253503 A1 | 11/2006 | Barrs et al. |
| 2007/0050415 A1 | 3/2007 | Armangau et al. |
| 2007/0078901 A1 | 4/2007 | Satou et al. |
| 2007/0143372 A1 | 6/2007 | Martinez et al. |
| 2007/0156842 A1 | 7/2007 | Vermeulen et al. |
| 2007/0203910 A1 | 8/2007 | Ferguson et al. |
| 2007/0266204 A1 | 11/2007 | Mizuno |
| 2007/0283017 A1 * | 12/2007 | Anand et al. ................. 709/226 |
| 2008/0027884 A1 | 1/2008 | Boutault |
| 2008/0147821 A1 | 6/2008 | Dietrich et al. |
| 2009/0083342 A1 | 3/2009 | Tomic et al. |
| 2009/0083563 A1 | 3/2009 | Murase |
| 2009/0222884 A1 | 9/2009 | Shaji et al. |
| 2009/0228532 A1 | 9/2009 | Anzai |
| 2009/0240664 A1 | 9/2009 | Dinker et al. |
| 2009/0265519 A1 | 10/2009 | Moore et al. |
| 2009/0271412 A1 | 10/2009 | Lacapra et al. |
| 2009/0276408 A1 | 11/2009 | Auerbach et al. |
| 2009/0327602 A1 | 12/2009 | Moore et al. |
| 2010/0017037 A1 | 1/2010 | Nam et al. |
| 2010/0057502 A1 | 3/2010 | Arguelles et al. |
| 2010/0094981 A1 | 4/2010 | Cordray et al. |
| 2010/0138495 A1 | 6/2010 | McIntyre et al. |
| 2010/0189262 A1 | 7/2010 | Ducharme et al. |
| 2010/0241660 A1 | 9/2010 | Bhorania et al. |
| 2010/0281051 A1 | 11/2010 | Sheffi et al. |
| 2010/0325476 A1 | 12/2010 | Zhang et al. |
| 2011/0016429 A1 | 1/2011 | Yoshihama |
| 2011/0185013 A1 | 7/2011 | Obata et al. |
| 2011/0196832 A1 | 8/2011 | Zunger et al. |
| 2011/0238625 A1 | 9/2011 | Hamaguchi et al. |

OTHER PUBLICATIONS

Google Inc., PCT/US2011/024247, Feb. 9, 2011, International Search Report and Written Opinion mailed Sep. 23, 2011, 15 pgs.
Google Inc., PCT/US2011/024249, Feb. 9, 2011, International Search Report and Written Opinion mailed Apr. 26, 2011, 10 pgs.
Chang et al., "Bigtable: A Distributed Storage System for Structured Data," OSDI, Oct. 31, 2006, 1-14 pgs.
Ghemawat et al., "The Google File System," SOSP' 03, Oct. 19-22, 2003, 15 pgs.
Google Code, "Protocol Buffers Language Guide," Jul. 11, 2008, 16 pgs. http://code.google.com/apis/protocolbuffers/docs/proto.html.
Korn et al., "The VCDIFF Generic Differencing and Compression Data Format," RFC 3284, Jun. 2002, 1-29 pgs.
Barrett, How Index Building Works, Google Code, Nov. 24, 2008, 3 pgs.
Xu, A Dynamic Distributed Replica Management Mechanism Based on Accessing Frequency Detecting, ACM SIGOPS, vol. 38, iss. 3, 2004, 9 pgs.
Little, The Replica Management System: a Scheme for Flexible and Dynamic Replication, IEEE Proc. Of 2nd Int'l Workshop on Configurable Distributed Systems, 1994, pp. 46-57.

* cited by examiner

Server Allocation

| Task / Function | Typical Number of Servers at an Instance |
|---|---|
| 502 — Blobmaster | 10 |
| 504 — Bitpusher | 100 |
| 506 — BigTable Servers | 50 |
| 508 — File System Servers | 1000 |
| 510 — Tape Servers | 10 |
| 512 — Tape Master | 5 |
| 514 — Replication Management | 10 |
| 516 — Quorum Clock Server | 5 |

Egress Map 134
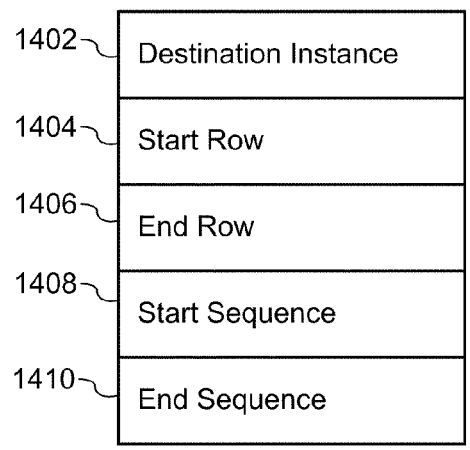
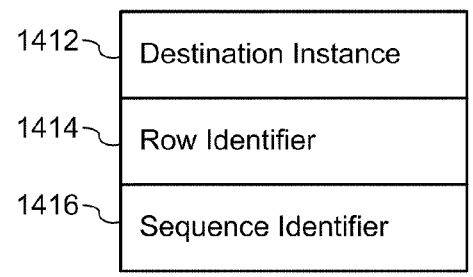
Figure 14A    Figure 14B
Ingress Map 136
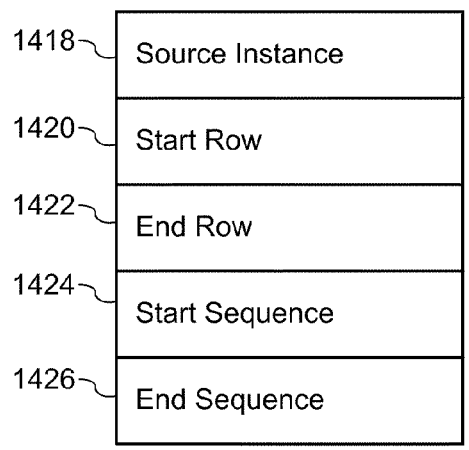
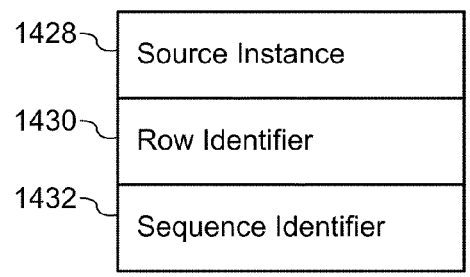
Figure 14C    Figure 14D

A − B =

B − A = ∅ —1508-5

A ∩ B = [ D ]—1508-6

Original Transmission Plan

Revised Transmission Plan

Alternative Revised Transmission Plans

Phase 1 : Write a Blob to the Distributed Storage System

Phase 2 : Create a Second Representation Using a Remote Procedure Call

Phase 3 : Read either Representation from the Distributed Storage System

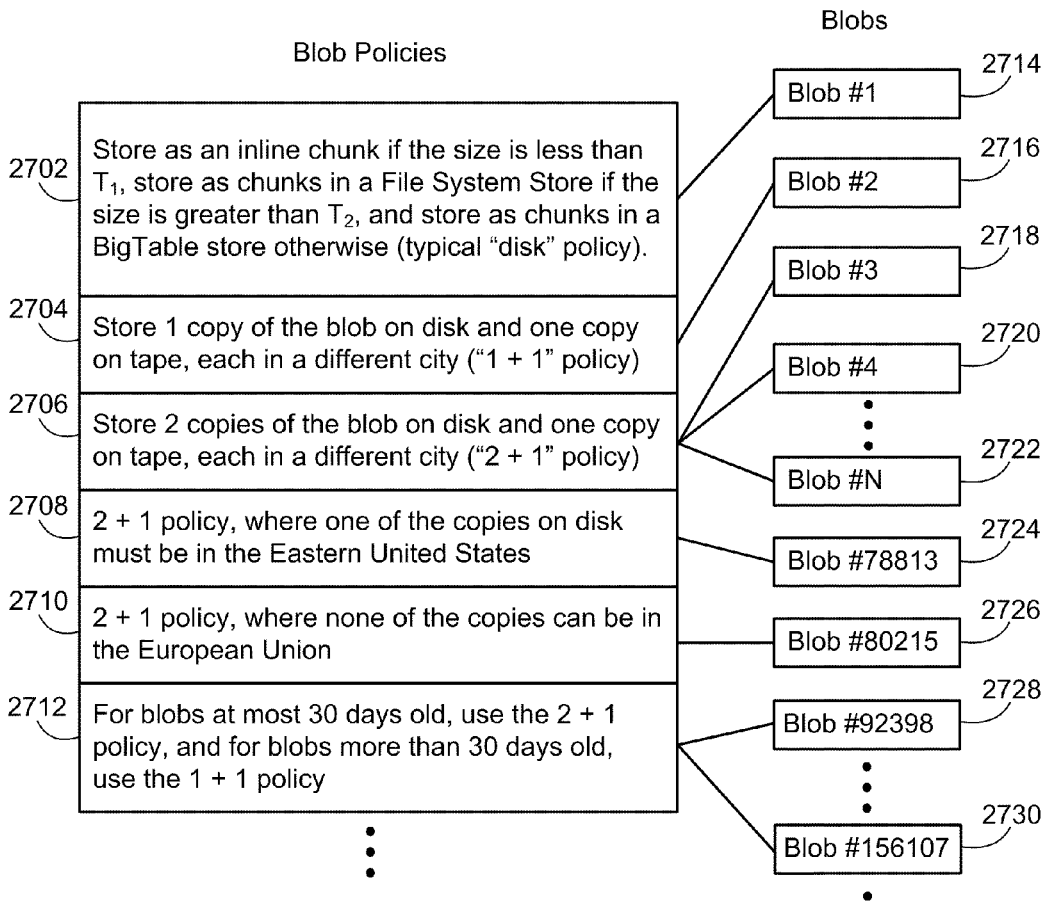

STORAGE OF DATA IN A DISTRIBUTED STORAGE SYSTEM

PRIORITY

This application claims priority to U.S. Provisional Application Ser. No. 61/302,930, filed Feb. 9, 2010, entitled "Storage of Data in a Planet-Scale Distributed Storage System", which is incorporated by reference herein in its entirety.

TECHNICAL FIELD

The disclosed embodiments relate generally to distributed storage systems, and more specifically to storage of blobs in large-scale distributed storage systems.

BACKGROUND

User applications are commonly delivered to end users with web-based interfaces. These applications are available to millions of users all over the world, and require a substantial amount of space for data storage. For example, the Gmail™ application is used by many millions of users, and requires storage space for each user's email. Such applications impose several constraints on the storage system, and prior art systems do not satisfactorily meet these constraints.

One desirable property of a storage system is that it be both large and scalable. Even if a storage system could handle current storage needs, many systems will not scale to meet the growing needs.

Another desirable property of a storage system is that the data stored is near the end user so that that reading and writing data is fast. A single centralized storage facility at one location or a small number of locations does not meet the needs of users throughout the world because some users have to read and write data over slow network links.

Another desirable property of a storage system is that the data be reliably backed up, so that it can recover from both natural and human errors. Many storage systems do not maintain multiple copies of data, so that recovery could require retrieval from tape backup, taking a very long time.

Another desirable property of a storage system is that network and data center failures should be transparent to end users. In most systems, if a network link or data center goes down, some users will not be able to access their own data while the failure is resolved or a temporary workaround is manually implemented.

SUMMARY

The above deficiencies and other problems associated with existing distributed storage systems are addressed by the disclosed embodiments. Some of the disclosed embodiments implement distributed storage systems with instances located throughout the world. Replicas of data blobs are distributed throughout the storage system, with new blobs created near the relevant users. Based on both usage and policy, copies of blobs are transmitted to other instances, which optimize storage space based on the actual needs of the end users. The architecture of the disclosed distributed storage system embodiments facilitates growth, both within individual instances, and the addition of new instances. Moreover, in the disclosed architecture, various portions of the data are effectively "backed up" by other copies of the data elsewhere within the distributed storage system. In addition, the disclosed architecture facilitates locating data near where it is used, so that users everywhere have relatively fast access.

In accordance with some embodiments, a distributed storage system for storing electronic data comprises instances, which may be local instances or global instances. The system has a plurality of local instances, and at least a subset of the local instances are at physically distinct geographic locations. Each local instance includes a plurality of server computers, each having memory and one or more processors. Each respective local instance is configured to store data for a respective non-empty set of blobs in a plurality of data stores having a plurality of distinct data store types and store metadata for the respective set of blobs in a metadata store distinct from the data stores. The system has a plurality of global instances. Each global instance includes a plurality of server computers, each having memory and one or more processors. Each global instance is configured to store data for zero or more blobs in zero or more data stores and store metadata for all blobs stored at any local or global instance. One global instance has a background replication module that replicates blobs between instances according to blob policies.

In accordance with some embodiments, a distributed storage system for storing electronic data comprises instances, which may be local instances or global instances. The system has a plurality of local instances, and at least a subset of the local instances are at physically distinct geographic locations. Each local instance includes a plurality of server computers, each having memory and one or more processors. Each respective local instance is configured to store data for a respective non-empty set of blobs in a plurality of data stores having a plurality of distinct data store types and store metadata for the respective set of blobs in a metadata store distinct from the data stores. The system has a plurality of global instances. Each global instance includes a plurality of server computers, each having memory and one or more processors. Each global instance is configured to store data for zero or more blobs in zero or more data stores and store metadata for all blobs stored at any local or global instance. Each local or global instance has a dynamic replication module that dynamically replicates blobs from one local or global instance to another local or global instance based on user requests to access blobs that are not stored at a local or global instance near the user.

In accordance with some embodiments, a distributed storage system for storing electronic data comprises a plurality of instances. Each instance includes a plurality of server computers having memory and one or more processors. At least a subset of the instances are at physically distinct geographic locations. Each instance stores data for a plurality of blobs. Each blob has an associated blob policy that specifies the desired number of copies of the blob as well as the desired locations for copies of the blob. The system includes a location assignment module configured to compare the desired number of copies of each blob and desired location constraints for each blob to a current number of copies of each blob and current locations of copies of each blob. The location assignment module is also configured to issue commands to delete a copy of a respective blob or to replicate a respective blob to another instance when the current number of copies of a respective blob and/or current locations of the respective blob are inconsistent with the desired number of copies of the respective blob or the desired location constraints of the respective blob.

In accordance with some embodiments, a computer-implemented method of utilizing a tape system for data storage executes at one or more server computers, each having one or more processors and memory. The memory stores one or more programs for execution by the one or more processors on each server computer. The method receives a request to store a blob of data in a tape store, and the request includes the content of the blob. The method writes the content of the blob to a first tape store buffer. Then, when a predefined condition is met, the method writes the content from the first tape store buffer to a tape. In some embodiments, the predefined condition is that the first tape store buffer fills to a first threshold percentage of capacity. In some embodiments, the predefined condition is that a predefined length of time has passed since a last time content was written from the first tape store buffer to a tape. Other embodiments have a predefined condition that is a combination of these two conditions. The method later receives a request from a client to read the blob of data from the tape store. When read requests reach a second threshold, the method reads the contents of the blob from tape, and writes the contents of the blob to a second tape store buffer. The method sends a message to the client indicating that the blob contents are available for reading.

In accordance with some embodiments, a computer-implemented method of storing data for files executes at one or more server computers, each having one or more processors and memory. The memory stores one or more programs for execution by the one or more processors on each server computer. The method receives a first blob of data, and splits the first blob of data into one or more first chunks of data. The method computes a content fingerprint for each of the first chunks of data. The method stores the first chunks of data in a chunk store and stores the content fingerprints of the first chunks of data in a store distinct from the chunk store. The method also receives a second blob of data, and splits the second blob of data into one or more second chunks of data. The method computes a content fingerprint for each of the second chunks of data. For each second chunk of data whose content fingerprint matches a content fingerprint of a first chunk of data, the method stores a second reference to the corresponding first chunk of data that has a matching content fingerprint and does not store the second chunk of data itself. For each second chunk of data whose content fingerprint does not match a content fingerprint of a first chunk of data, the method stores the second chunk of data in a chunk store.

In accordance with some embodiments, a computer-implemented method of storing data for files executes at one or more server computers, each having one or more processors and memory. The memory stores one or more programs for execution by the one or more processors on each server computer. The method receives a first representation of a blob of data having a specified first representation type, and stores the first representation of the blob of data. The method also stores metadata for the blob of data, including a name of the blob, the representation type, and a storage location for the first representation of the blob. The method also receives a request to create a second representation of the blob with a second representation type, and creates a second representation of the blob having the second representation type. The method stores the second representation of the blob of data and updates the metadata for the blob of data to indicate the presence of the second representation of the blob with the second representation type. The method receives a request from a client for a copy of the blob, and the request includes a specified representation type. The method retrieves either the first representation of the blob or the second representation of the blob, the retrieved representation of the blob corresponding to the representation type requested by the client. The method sends the retrieved representation of the blob to the client.

In accordance with some embodiments, a computer-implemented method of reading a blob from a distributed storage system executes at a client on a computer having one or more processors and memory. The memory stores one or more programs for execution by the one or more processors on the computer. The method receives a request from a user application for a blob and locates an instance within the distributed storage system that is geographically close to the client. The method contacts a blob access module at the located instance to request metadata for the requested blob. The request includes user access credentials. The method receives from the blob access module a collection of metadata from the requested blob, and a set of one or more read tokens. The method selects an instance that has a copy of the requested blob based on the received collection of metadata and contacts a data store module at the selected instance. The method provides the data store module with the set of one or more read tokens. The method receives the content of the requested blob in one or more chunks and assembles the one or more chunks to form the requested blob. The method returns the blob to the user application.

Thus methods and systems are provided that are scalable, and efficiently use existing storage capacity and network bandwidth. The methods and systems effectively use the distributed resources to place copies of blobs near where they are needed, with additional copies at other locations that can function as real-time backups. Because of intelligent background replication and replication based on immediate end user needs, the disclosed methods and system provide a system that is reliable, provides quick access for users, and uses the existing storage capacity effectively.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 14A-14D illustrate skeletal data structures for egress and ingress maps according to some embodiments.

FIG. 27 provides an exemplary list of blob policies, and illustrates the relationship between blobs and blob policies according to some embodiments.

FIG. 28 provides a high-level illustration of how blobs are stored according to some embodiments.

Figure 1A:
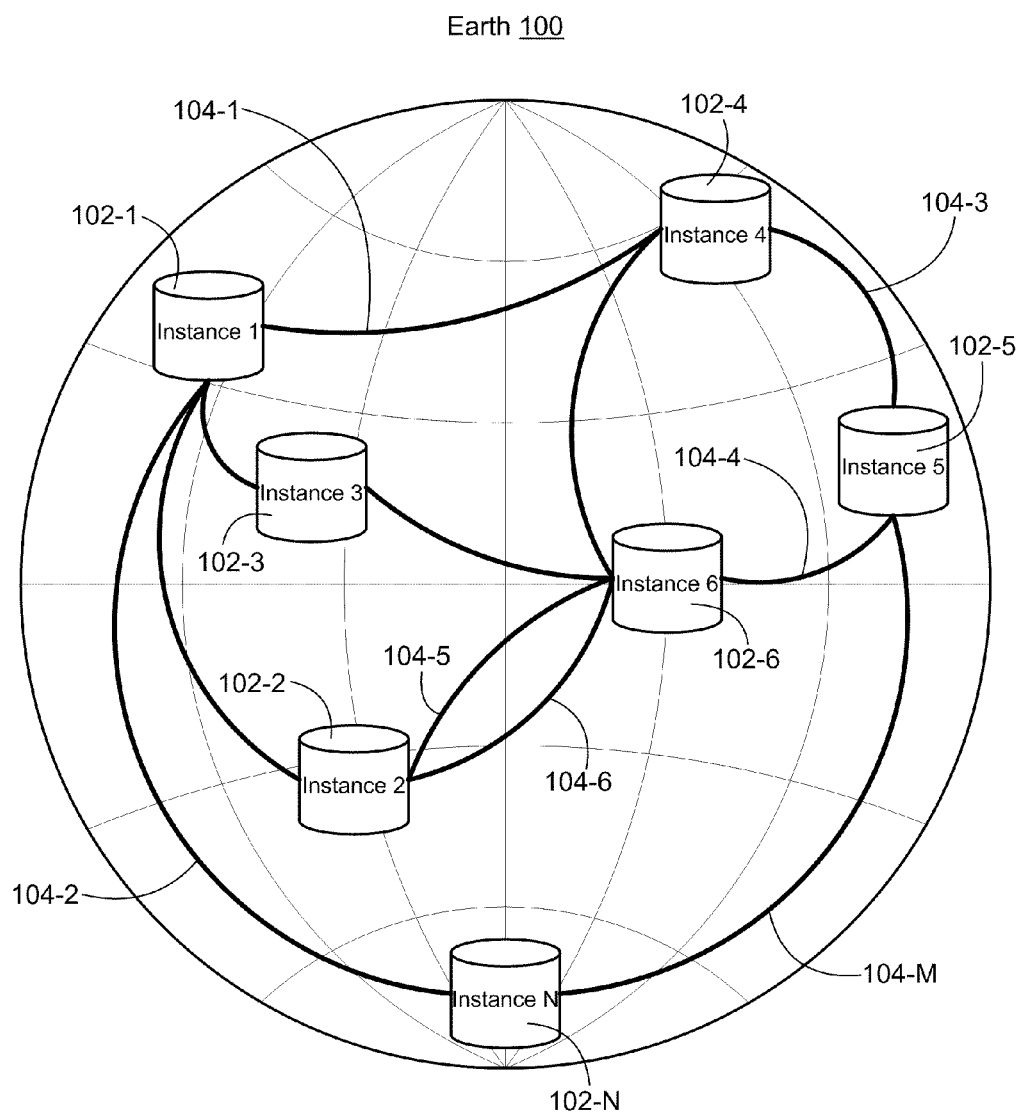
FIG. 1A is a conceptual illustration for placing multiple instances of a database at physical sites all over the globe according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

Purpose

Embodiments of the present invention provide a distributed storage system. In some embodiments, the distributed storage system is global or planet-scale. The term "Planet-scale" contrasts the disclosed embodiments with existing machine-scale or data-center-scale storage systems, but does not necessarily require that the elements be located all over the planet. The disclosed embodiments form a single storage system from the perspective of its users, even in an environment with many data centers (sometimes referred to as instances). Planet-scale systems differ from data-center-scale systems primarily in that the network link between two data centers is orders of magnitude slower and of lower capacity than the links within a data center, so data-center-scale techniques do not apply.

Advantages of the disclosed embodiments include functionality that:

makes temporary datacenter unavailability events as invisible as possible to the user. The disclosed embodiments adapt to the unavailability of one data center by directing traffic to other data centers and potentially making additional copies of data at additional data centers. Outages of data centers or certain network links to data centers are fairly common. Because the storage for a single user's data may be spread over a large number of data centers, this creates difficulties for applications that lack a planet-scale storage system.

makes decisions about where to store individual pieces of data on its own. This means that a user is insulated from issues related to insufficient capacity being available at any particular data center. The disclosed embodiments will simply spread their data over multiple data centers. This automatic distribution also addresses the case where a data center is unavailable in the long term or even permanently: the disclosed embodiments can easily transfer the data elsewhere, without needing to notify the user.

The disclosed embodiments are designed primarily for immutable or weakly mutable data. "Weakly mutable" means that, when you change an entry, that change will ultimately propagate everywhere, but the time for the propagation is not constrained. This is sometimes referred to as "eventually consistent." On the other end of the spectrum is "strongly mutable" data. For strongly mutable data, once you have written a change, all future reads are guaranteed to return the newly written value, regardless of where the user or data reside. Many applications only require weak mutability, or no mutability at all, and this can be implemented much more cheaply than strong mutability, so there is an advantage in doing so. The disclosed embodiments primarily address the needs of weakly mutable data, although some of the disclosed methods apply to distributed storage systems in general without regard to whether the underlying data is weakly mutable or strongly mutable.

The disclosed embodiments form a "blob store." A blob store maps blob names onto arbitrary contents, and the blob store makes no attempt to interpret the contents. In this way, a blob store is conceptually similar to a file system, with a blob name corresponding to file name.

One feature of the disclosed embodiments is dynamic replication. At any point in time, a blob may have one or more replicas. Replicas may be added on-the-fly in response to demand. This means that blobs that are in high demand can get a large number of replicas (improving latency, availability, and so on) without user intervention, while blobs that are in low demand have less replication and a lower cost for storage.

Another feature of the disclosed embodiments is background replication. Users can specify a replication policy such as "keep two copies on disk and one on tape, in three different metro areas." The system will monitor blobs in the background, and add or remove replicas in various locations, in order to satisfy this policy. The system that implements this background replication must trade off costs of storage and transit to and from various locations.

The combination of demand based replication and background replication based on policy can provide fairly optimal storage at a much lower cost. Since the disclosed embodiments can add and remove replicas on a per-blob basis, and do so dynamically, users can specify a baseline policy for the least-needed blobs, and rely on real-time replication to add replicas for just those blobs that need additional copies. This can greatly reduce the overall cost of data storage.

An additional feature of the disclosed embodiments is content-based de-duplication. In the underlying storage system, if two blobs have identical contents, the data is stored only once. For example, consider the use of a blob store to store email attachments. If a person sends copies of the same attachment to multiple recipients, some embodiments of the present invention would only store a single copy of the attachment.

The disclosed embodiments are implemented on top of various data-center-scale storage systems such as BigTable and GFS (Google File System). That is, embodiments of the present invention utilize both BigTable storage and GFS storage as data stores for blobs.

Various features of the disclosed embodiments resolve problems created by prior art data storage systems. For example, keeping track of which piece of data is at which data center is very complex, especially when there is blob-level granularity. Without a dedicated system that manages the locations of individual blobs, most applications forego implementing individualized locations: such systems instead stick with a conceptually simpler system along the lines of "we have a complete data set X, and we have copies of the entire dataset at data centers A, B, and C." The complete-dataset-only solution makes it easy to find a piece of data (it is at every data center), but creates other problems.

One problem with the complete-dataset-only solution occurs when a data center becomes unavailable. The software that accesses the data must be able to handle the outage and reroute user requests intelligently. This alone largely eliminates the perceived simplicity of have a complete data set at each data center because the application software cannot rely on any individual data center.

A complete-dataset-only implementation also requires enough capacity at every data center to store the entire dataset. Not only is this expensive, it is also sometimes impossible to extend capacity at a particular data center (e.g. because one has run out of electrical capacity). This means that if the service needs more data, it needs to retire an existing data center, get capacity at a new datacenter, transfer all of the data (while simultaneously providing user access, because the service can't shut down), reconfigure the systems to recognize the new set of data centers, etc. Similar problems happen if a data center needs to have long-term maintenance or other unavailability. This is a major problem for distributed applications.

Another problem with a complete-dataset-only implementation is over-storage of little-needed blobs. Generally, the number of copies of the dataset has to be fixed by the number of copies needed for the most-needed blobs. Even if just a small number of blobs require a large number of copies, the same number of copies applies to all of the other blobs, creating large unnecessary overhead costs with little value.

Because of these factors, application developers artificially reduce the number of data centers at which they store data, and they will store data disproportionately at large data centers with high capacity. This causes underutilization of smaller data centers, and generally a less-then-optimal distribution of data.

Furthermore, even if application developers were to implement more flexible designs without the complete-dataset-only limit, there are inherent inefficiencies by not coordinating among various applications. For example, if multiple large applications implement distributed storage systems, the decisions about where to store data, when to transfer it, and so on, will be inefficient and may collide because each application is competing for the same scarce resources (disk space, network bandwidth, etc) without coordination. Having a single unified storage system allows replication decisions to be centralized, which allows the most efficient possible allocation of resources.

Outline

A single deployment of a disclosed distributed storage system is called a "universe." A universe comprises multiple instances, which are individual sub-nodes of a distributed storage system. Typically, there will be one instance per data center, but this is not required. Each instance has zero or more chunk stores. A chunk store is an underlying, typically data-center-scale, storage system, in which a blob can be written. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned objects. Each blob at any point in time has replicas in one or more chunk stores around the world. Each instance also has a metadata table, which contains entries describing individual blobs: the contents of each blob, who is allowed to access the blobs, where the replicas of the blobs are located, and so on. Instances come in two types, known as local and global. The difference is that local instances store metadata only for blobs which have replicas in one of the chunk stores of the instance, while global instances store metadata for all blobs. There are generally only a few global instances in the universe.

Each blob is broken up into chunks, which are simply subsets of the contents of the blob. In some embodiments, each chunk holds a contiguous range of bytes from a blob. Blobs are broken into multiple chunks when a single blob is so large as to be unwieldy if manipulated as a single object. For example, failure in replicating a single large blob would be more likely to occur and more costly if it did occur (i.e., retransmitting the entire large blob again). If the same large blob were broken into many individual chunks, then no specific chunk would be likely to have a failure, and if one did fail, it would be inexpensive to retransmit the single chunk that failed. Each chunk is identified by a chunk ID. In some embodiments, the chunk ID is a mathematical function of the contents of the chunk. Embodiments that compute the chunk ID as a function of the contents have content-based de-duplication because the same content will always result in the same chunk ID. Note that content-based de-duplication of individual chunks results in de-duplication of blobs only if the splitting of blobs into chunks is performed in the same way for both blobs. In some embodiments, the splitting into chunks is deterministic (i.e., there is no randomness), so two identical blobs would have identical sets of chunks. One of the fields of the blob metadata is the extents table, which maps logical ranges of byte positions within each blob onto individual chunks. The actual chunk contents are stored in the chunk stores.

A single instance includes the following components:

A metadata table, which is a database containing the metadata for each appropriate blob. In some embodiments, the metadata is saved in a BigTable.

A blobmaster, which is a program that acts as the external interface to the metadata table. A blobmaster provides functions such as "please return the metadata for blob X."

Zero or more chunk stores, which are storage systems such as databases (e.g., BigTable), distributed file systems (e.g., GFS), or tape drive arrays. Inline chunk stores are a special case where the actual content is saved in the metadata table. Note that each chunk store belongs to a single instance. For example, even when there are two instances at the same data center, there are no shared chunk stores.

A bitpusher, which is a program which acts as the external interface to the chunk stores. A bitpusher provides functions such as "please return the contents of chunk X."

The blobmaster and bitpusher "programs" (as well as most other program identified herein) are meant in the sense of a distributed system. Each of these "programs" comprises one or more tasks, where a task is a single occurrence of the binary program executing on a particular machine. For example, the bitpusher at a single instance may actually be running on 100 different machines simultaneously, with each task running the same code. In some embodiments, each bitpusher task is responsible for a different subset of data. In addition, some embodiments assign tasks to virtual machines, and the mapping of virtual machines onto physical machines is done by a distributed computing environment. In these embodiments, portions of independent tasks may be running on the same physical machine at the same time.

In some embodiments, the partitioning of the blobmaster into tasks is done on a per-blob-ID basis. That is, at any given moment, there is a single blobmaster task responsible for each blob ID at that instance. This mapping of blob IDs to tasks, and the complicated handling of distributing load evenly, restarting failed blobmasters, etc. is handled in some embodiments by a BigTable coprocessor system. In general, the task scheduling system for blobmasters must coordinate closely with the database system that stores the metadata in order to guarantee that each blob ID is assigned to a unique blobmaster task. The task scheduling system must also coordinate closely with the network communication system used by clients to contact a blobmaster about a particular blob.

One special kind of chunk store is an inline chunk store, where the chunks are stored inside the metadata table along with the metadata for the blob. Inline chunk stores are normally handled by the same code paths as non-inline chunk stores, but data read operations from an inline chunk store are optimized specially. These stores are more expensive than other stores (e.g., because they don't provide content-based de-duplication—the chunks are stored with each blob that requires them) but are significantly faster to access.

Each instance may also include one or more auxiliary components:

A replication module comprises one or more servers that maintain a persistent queue of tasks to copy data from one instance to other instances. In some embodiments, the replication module maintains two or more independent queues to optimize processing. These replication queues are sometimes referred to as "repqueues."

A tape master is an auxiliary server that helps the operation of tape-based chunk stores. In general, tape-based chunk storage uses two phases to read or write to tape, using an intermediate read/write buffer that may be managed by a tape master.

A quorum clock server is an auxiliary server that simply reports the current time according to that machine's internal clock. In some embodiments, each instance has multiple quorum clock servers to reduce the risk of problems associated with failure or glitch in a single clock.

A statistics server is an auxiliary server that aggregates information from bitpushers and replication queues around the world about the current availability of capacity in chunk stores, network bandwidth, etc.

A "life of a blob" server is a debugging tool that allows developers and support technicians to examine the full history of a blob, including all operations that create, read, write, or replicate the blob, or chunks that comprise the blob. The full history also includes changes to the metadata for a blob, such as access rights.

The location assignment daemon, known as the "LAD," is a system that makes decisions about background replication. The LAD always runs at a single instance, which must be a global instance.

Embodiments of the disclosed distributed storage system use several external systems for support. For example, a distributed storage system may use a configuration file distribution system, a load balancing service, and an authentication system. A configuration file distribution system pushes out updates to configuration files in a safe way to all of the servers at all of the instances. This enables configuration to be managed at a single central location, while usage of the configuration information is done locally at each instance. A load balancing service routes traffic to particular instances when there are choices among multiple instances. Embodiments of the distributed storage system report to the load balancing service how much traffic is currently flowing to each instance, and in return the load balancing service can answer questions of the form "I have a request originating here, which needs to talk to one of the following instances. Which one would be best to use?" The underlying network protocol includes an authentication system so that network calls into the distributed storage system can be reliably associated to the principals (i.e., users) making those calls.

Applications that wish to use embodiments of the disclosed distributed storage system use a client library, which is a code library that is embedded in application programs. The client library defines the outside API of the distributed storage system, providing operations such as "create a new blob with contents X" and "read the contents of this blob." In its simplest mode, the client library provides an API similar to that of a file system. The client library also provides more advanced API routines that are specific to embodiments of the disclosed distributed storage system. For example, a client can access specific generations or specific representations of a blob (explained in more detail below). For example, the files used for a website (HTML pages, CSS files, JavaScript files, image files, etc.) may have multiple versions over time, and each of these versions could se saved as distinct generations.

Reading a Blob

One common operation responds to a request to "read the contents of blob X." In a simple mode of operation, a blob is identified by a blob ID, which is similar to a file name. For example, the string "/blobstore/universename/directory/subdirectory/blobname" could be the blob ID of a blob when the individual components of the string are replaced by specific actual names. In some embodiments, the process works as follows:

(1) The application calls the "read a blob" API function in the client library.
(2) The client contacts a blobmaster. The client asks the load balancing service to give it any blobmaster, which is commonly the nearest blobmaster. The client asks the blobmaster for the metadata for the blob.
(3) The blobmaster looks up the metadata. In the simplest case, the desired blob is stored at the instance to which this blobmaster belongs. The blobmaster examines the metadata and verifies that, for example, the given user is authorized to view the contents of the blob. If the user is not authorized, the blobmaster returns an appropriate error message. If the user is authorized, the blobmaster returns:
  the metadata for the blob, which includes the mapping from byte ranges in the blob to chunk IDs;
  the list of chunk stores, which includes instance names, in which replicas can be found (not just the current instance); and
  either a set of read tokens or the chunk contents. In general, the blobmaster returns read token, which are cryptographically signed tokens saying that the blobmaster has authorized the given user to access the contents of particular chunks (e.g., one read token per chunk). However, in the special case that the blob is stored in an inline chunk store at the instance, the blobmaster returns the actual contents of the blob instead of read tokens.
(4) If the blob contains non-inline chunks, the client now contacts a bitpusher. In some embodiments, the client asks the load balancing service to give it any bitpusher belonging to an instance at which the blob has a replica. Because the previous load balancer call likely returned the closest blobmaster to the client, and the current scenario assumes there is a replica at that instance, the load balancing service will generally assign a bitpusher belonging to the same instance as the blobmaster that responded to the initial request. Although some embodiments will always assign a bitpusher from the same instance as the blobmaster in the current scenario, the more flexible assignments provided by a load balancer can better optimize the use of resources. The client sends read tokens to the bitpusher, and the bitpusher returns the contents of the chunks.

The process of reading a blob is more complex if the blob is not present at the instance that the client originally contacted. In some embodiments, the original blobmaster contacted may reside at a global instance, which holds all of the metadata for all of the blobs. In other embodiments, clients can only contact only local blobmasters, and local blobmasters will contact global blobmasters when necessary. In some embodiments, connections from a local blobmaster to a global blobmaster use a load balancing service to select an appropriate global blobmaster. In other embodiments, the small number of global blobmasters are geographically dispersed, so each local blobmaster contacts a specific global blobmaster when necessary to find a blob. In the subsequent discussion, "initial blobmaster" and "initial instance" refer to the blobmaster and the instance originally contacted, which may be global instances.

When a desired blob is not stored at the initial instance, the blob metadata is retrieved from a global instance. The global instance may be the initial instance; otherwise, the local blobmaster at the initial instance may query a global blobmaster. As noted above, contacting a global blobmaster generally uses a load balancing call. The global blobmaster first determines if the desired blob exists and whether the user has rights to access it. If the requested blob does not exist, or the user does not have access privileges, the global blobmaster returns an appropriate error message. If the blob does exist, and the user has access rights, then the global blobmaster examines the set of locations at which the blob is currently stored to develop a delivery strategy. If there is a replica of the blob "close" to the client, then the strategy is generally to return the blob metadata to the client (either directly, or indirectly via the initial blobmaster), and everything proceeds as before. In this case, the client will access the blob at the identified close replica.

If the nearest replica of the blob is "far" from the client, the global blobmaster may instead choose to trigger real-time replication to copy the blob from a distant replica to an instance closer to the client. Real-time replication begins by picking a replica of the blob to act as the "source replica," and a chunk store belonging to the initial instance (which is typically a local instance close to the client) to act as the destination chunk store. The initial instance triggers real-time replication.

Part of the real-time replication process is to change the metadata of the blob to indicate that there is now a new replica at this initial instance. The replication is flagged as being "real-time" and therefore gets the highest priority for the use of network links, etc. Of course this means that real-time replications are expensive operations. Much of the logic of background replication, described below, is designed to minimize the use of real-time replication. Another part of real-time replication is the actual replication of the blob contents. In some embodiments, the replication module at the source instance creates a queue entry for each chunk in the blob to replicate, and proceeds to replicate the chunks. Because real-time replication has the highest priority, the replication of these chunks typically occurs right away.

Once a dynamic replication starts, the process continues to completion regardless of the original request. That is, even if the original user request for the blob is rescinded, the replication does not stop. Some embodiments of the disclosed distributed storage system do not leave blobs in inconsistent or incomplete states.

The initial blobmaster returns the new metadata to the client, and the read process continues as described above. Assuming that the client does, indeed, read from this instance, (which is generally true), the bitpusher at this instance will both write the data locally to the designated chunk store (to create the new replica) and forward the chunks to the client. Both of these operations occur as bytes arrive at the initial instance from the source copy. Conceptually, the client is reading from the remote instance, but simultaneously a local copy is being saved. The idea is that (a) because the distributed storage system has already paid the really expensive cost—the cost of copying data over a long-haul link—the system may as well create an additional copy locally; and (b) if someone has accessed the blob now, it's likely that someone may access it again soon, so having a local copy will be helpful.

Note that the new replica created by real-time replication is identical in every way to any other replica of the blob. The new copy is not a special, transient replica, and is not subject to more restricted access. This new replica is identified in the metadata for the blob, so once it is copied, any user with appropriate access privileges may access this new copy.

In some embodiments, the full set of rules for deciding whether or not to invoke real-time replication can be more complicated than distance between the client and the source replica. In some embodiments, real-time replication rules may be specified as part of a blob's replication policy. Some exemplary factors that may be considered are:

- distance from the client to the various replica locations;
- the current status of various network links, storage systems, and so on, which enable forming an accurate estimate the actual cost of accessing the various replicas;
- whether the user or owner of the blob has specified a policy that deliberately prohibits or discourages real-time replication. For example, the blob user or owner may know a priori (either at policy-writing time or at the time of the individual request) that this request is not likely to be repeated again, so the cost of creating a new replica would be wasted; and/or
- whether the policy imposes a "hard constraint." For example, a blob should never be stored in the E.U. for legal reasons.

Some embodiments of the present invention provide more advanced forms of "reading a blob." In some embodiments, the general blob reading API is a class that provides the following functionality: (a) start a new blob reader that fetches the metadata for the blob; (b) read any particular subrange of byte positions within a blob; or (c) return summary statistics derived from metadata, such as the total size of a blob in bytes.

In some embodiments, the API provided by the client library implements ordinary POSIX file semantics, including "open," "pread," etc.

Some embodiments improve performance by having each bitpusher task maintain an in-memory cache of chunks that the bitpusher has recently processed. If there are multiple tasks at a particular instance, then chunk IDs are preferentially assigned to a particular task by a mathematical function of the chunk ID. This means, for instance, that client read requests for a particular chunk will attempt to contact the bitpusher task that is more likely to have cached the same chunk ID previously. This cache locality improves cache usage. The client will contact another task only if the preferred task is overloaded or unavailable.

Writing a Blob

Embodiments of the disclosed distributed storage system are primarily designed for immutable or weakly mutable data, so these embodiments generally provide a more restricted set of API functions for file content manipulation than most file systems. Specifically, some embodiments allow a user to create a blob, completely overwrite a blob's contents, or delete the blob, but not partially modify the internal contents of a blob. This is not a fundamental limitation, because any partial modification of a blob's contents could be accomplished by deleting the old version and creating a new blob with the desired modifications. Other embodiments do not impose these limitations, but may internally implement changes as a delete plus a create. In terms of POSIX file semantics, the embodiments that impose these limits support the modes "r" and "w," but not, for example, "r+."

The simplest form of writing a blob creates a new blob. The process of overwriting an existing blob is described below. The description here illustrates the operations performed to write a blob in embodiments of a distributed storage system, but is not intended to be limiting. One of ordinary skill in the art would recognize that many variations of disclosed operations are possible within the scope of the disclosed teachings.

A user application begins writing a blob by instantiating a "blob writer" object. The blob writer object is capable of creating (or really, overwriting) a single blob. The application repeatedly calls a write function, passing data to the blob writer. In some embodiments, the write function permits the user application to specify that "the following data should start at offset X within the blob." This is syntactically analogous to POSIX pwrite( ). Higher-level API functions within the blob writer object expose behaviors analogous to POSIX write( ) etc. Note that it is an error to write to a data range of a blob that has already been written.

In some embodiments, the client buffers writes, so that the client can decide on the most natural partitioning of the written data into chunks. In some embodiments, the partitioning optimizes both content-based de-duplication and keeps the number of chunks small. Typically, having a smaller number of chunks makes the underlying storage more efficient. In some embodiments, the partitioning divides each blob into chunks of a fixed size. Some embodiments use Rabin-Karp chunking or other complex algorithms.

The client decides which type of chunk store should be used to write the data. The selection is based on the data being written as well as the blob policy the user selects for the blob. Some policies are very explicit about the type of data store. For example, "always write these blobs to inline-in-memory chunk stores" would be an appropriate policy for a blob that needs to be accessed very quickly. Other policies provide a range of options based on blob characteristics. For example, some embodiments include a "standard disk" policy that writes to different stores depending on the size of the blob: blobs whose total size is less than one threshold are saved to an inline store; blobs between the first threshold and a second threshold are saved to a BigTable-based store; and very large blobs with size greater than the second threshold are saved as chunks in a distributed file system store. This allocation based on size works in some embodiments because different chunk stores can handle different sizes better. For small blobs, the overhead cost of storing to inline chunks is low and the efficiency gain is high; a BigTable-based store is generally efficient but may have trouble handling very large data; and the distributed file system store (using GFS, for example) is very good at handling large data, but has a high overhead per datum and thus is inappropriate for small data.

When the cache is full, or when the application explicitly calls a Flush( ) method on the client, the client actually writes the data to a data store. The actual write to a data store is accomplished by contacting a bitpusher (selected by load balancing) and writing data. In general, the bitpusher is near the client. The bitpusher verifies that this user is allowed to write, and then actually writes the chunk. In embodiments that implement content-based de-duplication, the chunk is not written if the chunk is already present. The bitpusher returns to the client a write token for each chunk. In some embodiments, a write token is a cryptographically signed token indicating that a certain chunk was written to a specific chunk store, as part of a certain blob, etc. Inline chunks are written through this code path as well, but do not perform content-based de-duplication.

Either at the end of blob writing, or when the application explicitly calls a FlushMetadata( ) method on the client, the client writes the metadata for this blob to a metadata store. The client contacts a blobmaster (selected by load balancing or based on the instance(s) where chunk data has been written) and tells the blobmaster that that it is writing to a particular blob ID. The client passes various information to the blobmaster: all of the write tokens that it has received; structural and access control information about the blob such as its extents table; and the relevant blob policy. As soon as this data is written to a local instance, read operations that arrive at this local instance will be possible. In addition, this change to metadata will be propagated to other relevant instances as soon as it is written. The changes to the metadata are replicated by the metadata replication system. Metadata replication is discussed below, and in more detail in co-pending application U.S. patent application Ser. No. 12/703,167, "Method and System for Efficiently Replicating Data in Non-Relational Databases," filed Feb. 9, 2010, which is incorporated herein by reference in its entirety.

In some embodiments, the client calls a Finalize( ) function on the blob writer when it is done writing a blob. The call to Finalize( ) will also occur automatically if the blob writer object is deleted before the Finalize( ) method is called. The process of finalizing performs several important operations. First, finalizing flushes the client's data buffer, to guarantee that all of the blob contents are physically written to a data store. Second, as part of finalizing, the client decides where the initial location of the blob should be. In the common case where all chunks were written to the same chunk store, the location is that chunk store (and the instance where that chunk store is located). If chunks were spread over multiple chunk stores, the client typically picks the chunk store that received the majority of the bytes, or the greatest number of bytes. Because chunks are not necessarily the same size, having the majority of bytes is not necessarily the same as having the greatest number of chunks. If a blob is large and the bitpushers were highly loaded during the write process, the chunks may be distributed across multiple targets. Similarly, if the upload took a long time, and during that time a particular instance became temporarily unavailable, the writes would have gone to an alternative bitpusher at a different instance. As these examples illustrate, in the process of writing a blob, individual chunks may be written to different chunk stores within one instance, or different chunk stores at different instances.

As part of the finalizing process, the client flushes its metadata. Along with this metadata update flush, the client sends a command to "finalize the blob at instance Z." When a metadata update to "finalize" is received by a blobmaster, several things happen, including determining whether all of the chunks of the blob are already present at the chosen destination location. (This is the common case!) If so, the blobmaster immediately marks the blob as finalized. At this point, future modifications to the contents of this blob are forbidden. In some embodiments, all of the chunks must be saved to the same chunk store at the destination instance in order to immediately mark the blob as finalized. In these embodiments, all of the chunks must be consolidated into a single chunk store prior to designating the blob as "finalized."

If the blob cannot be immediately finalized, it is instead marked as "finalizing." Future modifications are immediately forbidden, and the blobmaster at the destination instance triggers chunk replication operations to copy chunks from wherever they may be to the chosen destination. In particular, when the metadata update that triggers finalization arrives, either directly from the client or via the metadata replication system, at the blobmaster for the instance responsible for the chosen destination chunk store, the blobmaster at that instance will trigger the copies. Other blobmasters will note that the blob is finalizing, but not trigger any copies. As chunks are replicated successfully, the replication module writes further metadata updates for the blob, indicating that chunks are present. As each chunk is received, the blobmaster determines if all of the chunks identified in the metadata are present. When all of the chunks are finally at the designated instance, the blobmaster marks the blob as finalized.

Regardless of whether a blob could be finalized immediately, or required replication of one or more chunks, the blobmaster makes a call to the background replication system as soon as the blob is finalized. This is explained in more detail below in the section on "background replication."

Overwriting a Blob

Overwriting blobs is closely related to blob generations. Blobs stored in embodiments of the disclosed distributed storage system comprise one or more generations. A generation is effectively a version of the blob contents. Each time the blob is overwritten, the old generation continues to exist, but a new generation is created. Each generation of a blob has a generation ID. In some embodiments, the generation ID is a 64-bit integer. In some embodiments, the default generation ID is the timestamp at which the generation was created, with the least-significant bits containing some tiebreakers to resolve ambiguities if multiple servers try to write data within the same microsecond. In some embodiments, clients are permitted to override the default ID with any selected unique value (the client could not use the same generation ID for two distinct generations of the same blob).

The description of writing a blob above actually applies to a single generation: it is an individual generation of a blob that may be uploading, finalizing, or finalized; and an individual generation has replicas at various locations, etc. Read operations most commonly ask for the most recent generation, and thus the generation returned may depend on which instance is queried at the start of the read operation. Due to latency, different instances may know about different subsets of generations, and thus the "most recent" generations at different instances may be different. (This scenario exemplifies the "eventual consistency" of weak mutability addressed above.) Read operations may also ask to see a specific generation, or even to see the metadata for all generations. In some embodiments, a write operation invariably creates a new generation. When a blob writer object is first created, its arguments include the blob ID to be written, and optionally the generation number that should be assigned. As noted above, some embodiments automatically use a timestamp as a default generation ID.

In some embodiments, there is a location assignment daemon (LAD) that coordinates the planet-scale behavior of blob generations over the long term. The LAD may relocate individual generations of a blob to different instances, or delete specific generations according to a blob's policy. For example, a typical policy specifies keeping N generations of a blob (N can equal 1), so the LAD may delete all generations beyond the first N. The LAD comprises multiple processors running in parallel so that the entire set of blobs can be reviewed in 4 to 8 hours.

The term "generation" is appropriate because two generations of a blob are related but different from one another, and there are only a certain number of generations alive at any time.

In addition to generations, embodiments of the present invention include several other advanced metadata concepts, including references and representations. References act like hard-links in a file system. Each blob has one or more references, and when the last reference to a blob is deleted, the blob itself is deleted. In general, a blob is initially created with a single reference. In some embodiments, each reference has its own access control lists, policies, and so forth. In some embodiments, one of the references to a blob is designated as the default reference, which is generally the original reference when the blob was created. A read request is actually a request to read a particular reference to a blob. If no reference ID is specified, the default reference is assumed. In some embodiments, reference IDs are strings, which may be fixed length or variable length. In other embodiments, a reference ID is an integer, such as a 32 bit or 64 bit integer. In some embodiments, the reference ID is part of the blob ID, so a blob ID may have the form /blobstore/universe/directory/subdirectory/blobname:referencepathimorepathireferencename. The some embodiments, the default reference ID is the empty string. The use of the empty string as the default reference enables simplified blob IDs.

It is useful to note that "references" and "generations" are distinct independent attributes of a blob. Each reference refers to the whole blob, which includes all generations of the blob. As new generations are created, the same references apply to the new generations. In addition, as new references are created, the references apply to all of the generations. References and generations are effectively orthogonal attributes.

In some embodiments, references are deleted by issuing a metadata change that marks a particular reference with a "tombstone" time. A tombstone time is a timestamp that specifies when the physical reference will actually be deleted. For example, the tombstone time may be 30 days after being marked for deletion. References with tombstones are normally considered to be "deleted" for the purpose of ordinary reads, but references with tombstones can still be accessed and undeleted by certain "superusers." The existence of superusers provides a safety mechanism against accidental deletion. Once the tombstone time is passed, the reference is actually removed, and if this is the last reference to the blob, the entire blob is deleted. This is described in more detail below with respect to "tombstone expiration."

Another important concept for blobs is "representations." Conceptually, representations identify distinct ways to view or format the same piece of information. For example, a digital photograph may have one representation that is a full-size high-resolution image, and a second low-resolution thumbnail image. In some ways, representations are like different language translations of the same book. In some embodiments, representations are managed by coprocessors, which operate in parallel with the functionality described above. Note that "coprocessors" here do not inherently refer to CPU or hardware coprocessors, although in some embodiments, the coprocessor functionality is fully or partially implemented in CPU/hardware coprocessors. In the blob hierarchy, each blob has one or more generations, and each generation has one or more representations. In general, each blob generation has only a single representation.

To summarize, the overall metadata structure for blobs comprises three components:
- one base metadata entry per generation. This generation entry contains data for each representation. The representation entries describe the contents of the blob, including the extents table that identifies the chunks, and offsets to each chunk.
- one reference metadata entry per reference. This reference entry contains access control lists (e.g., who has access), policies, etc.
- any inline data saved for the blob, with one entry per chunk. Each inline entry is associated with a unique generation and a unique representation. In some embodiments, there is no re-use of inline chunks.

Replication

Embodiments of the disclosed distributed storage system store both blobs and metadata for the blobs. The blobs may be very large, and comprise uninterpreted binary data, whereas the metadata for each blob is small, and comprises a well-defined set of attributes. Moreover, blobs exist because end users access the contents of the blobs (directly or indirectly), whereas metadata for blobs exists to facilitate access to blob contents. For these and other reasons, replication of metadata uses a different mechanism than replication of blobs. Both forms of replication are described below. In general, "replication" will refer to blob replication unless the context clearly indicates otherwise. In both forms of replication, there is a source instance that provides the data to be copied, and a destination instance, which is the target for the copy. For blob replication, one or more destination chunk stores must be selected to store the chunks that are copied.

Blob replication can be triggered in multiple ways. Blob replication is called implicitly both by real-time replication and background replication. In some embodiments, replication can be called directly by a function in the client library API.

In some embodiments, blob replication begins by a call to the ReplicateBlob( ) function at a blobmaster. In some embodiments, the function call to replicate occurs at the blobmaster for the destination instance. That is, the call is made to a blobmaster at the instance responsible for the destination chunk stores. In alternative embodiments, the call to begin replication occurs at the instance that will act as the source for a copy of the blob. In some embodiments, the arguments to the ReplicateBlob( ) function include the blob ID, the source instance, and the priority for the copy. In embodiments where ReplicateBlob( ) calls always occur at the destination instance, the function call need not specify the destination instance (it is implied). In some embodiments, the destination instance is included as an argument (or an optional argument) in order to provide greater flexibility about which blobmaster to call. The priority is assigned based on the type of request. For example, real-time replication has a high priority and is allowed to use a high network priority as well, because it is generally in response to a real-time request from an end user. Background replication tasks have varying priority determined by the LAD, but virtually always use a low network priority because they are not time-sensitive.

In some embodiments, the destination blobmaster (or the blobmaster that received the call to replicate) contacts the source blobmaster and asks it to initiate the source operation. This initiation at the source is sometimes referred to as "metadata pinning." The term "pinning" is used to indicate that during the replication process, the source copy of the blob is not allowed to be removed. While a blob is being copied from one instance to another, there is essentially a single copy of the blob that "spans" two instances. Once the replication is complete, there are two independent replicas, which are individually subject to deletion and removal. At the completion of the copy operation, the metadata for the blob is updated again to indicate that the copy operation is complete.

In some embodiments, a blobmaster at the source instance prepares for replicating chunks of a blob by making an immediate change to the blob metadata at the source instance. The change indicates that there is now a new replica of the blob at the destination instance. The state of the new replica indicates that replication is in progress from the source instance. This is sometimes referred to as being "in-flight." The source instance writes this change to its own metadata table. This change to the metadata at the source is important for several reasons, such as preventing removal of the source copy before the copy operation is complete. In particular, the background processing of the LAD could determine that the copy of the blob at the source is no longer needed; the change to the metadata indicates that the replica of the blob at the source instance is in use by a pending copy, and therefore this replica may not be removed.

The source instance transmits the entire metadata for the blob to the destination instance. In some embodiments, the metadata is copied as-is. In alternative embodiments, the metadata for the blob is converted to a sequence of one or more metadata mutation operations, as used in typical metadata replication. The mutations (also known as deltas) are then sent to the destination instance. The use of deltas to transmit the metadata facilitates general metadata replication because there are no collisions between the different replication methodologies. The use of deltas also facilitates compaction, which is described in more detail below.

After the destination instance receives the metadata for the blob, the destination blobmaster initiates chunk replication by informing its local replication manager. The destination replication manager sends a "replicate chunks" command, which specifies the chunks to be copied, the source and destination for the chunks, and sometimes various auxiliary information such as priorities. In some embodiments, the command to replicate chunks specifies the chunks stores where the chunks are currently stored at the source instance as well as the chunk stores to store the chunks at the destination instance. In some embodiments, the destination chunk stores are determined by the blob policy, and are thus not included in the replicate command. In some embodiments, identifying the specific chunk stores is optional, with storage determined based on policy if the chunk stores are not specified.

The replication manager either executes the replicate commands immediately, or places the commands in a replication queue. In some embodiments, the replication queues are "stable." That is, once the replication manager acknowledges to the blobmaster that a command has been queued, the replication manager promises to execute the command, even if the replication manager or the queues managed by the replication manager fail before completing all of the commands. For example, some embodiments save the replication queues in persistent storage.

The replication manager maintains a priority queue of logical copy operations. Each queue entry specifies the chunks to be copied, the source instance, the destination instance, the network quality of service, the requesting user, and the priority. The priority is passed to the replication manager as part of the replication request. Sometimes the copy operations are referred to as "links" because multiple links may be used to copy chunks from an original source to the final destination. In some embodiments, each queue entry corresponds to exactly one chunk; in other embodiments, a single queue entry may specify a list of chunks. In some embodiments, the replication manager detects the presence of duplicate requests, which would include requests to send the same chunk from the same source to the same destination. In some embodiments, entries are considered duplicates only if they have the same network quality of service, requesting user, and priority as well. In embodiments that detect duplicates, one of the duplicates is selected to process, which may be the one with the higher quality of service, the one with the higher priority, or the one that was inserted into the replication queue earlier. In these embodiments, the duplicates that are not selected may be deleted, or placed into a holding state until the chunks are copied based on the selected queue entry. The network quality of service (QOS) may determine the speed of transfer, and can be used to determine which processes are abandoned when a network communication link becomes overloaded. The quality of service can be specified by the end user or the client library. Of course, a higher quality of service costs more, so the requester must determine if the benefit of higher quality is worth the additional cost.

The replication manager executes a replicate command by asking the local bitpusher to pull the data from a remote bitpusher, and to write the data locally as soon as it arrives. When the replication manager has finished a copy operation, a metadata change is written to the blobmaster, which indicates that the new chunk is present.

In an alternative embodiment, if both the source and destination of the replication are inline chunk stores, then the data is copied as part of the metadata replication.

Each blobmaster periodically examines its metadata, and determines the effects of recent metadata changes. In some embodiments, this periodic examination of metadata accompanies compaction analysis, because both review metadata changes. During this examination, if the blobmaster determines that all chunks of a replication have arrived, the blobmaster modifies the information for the replica to remove the annotation that a copy is in progress. This would allow the source replica to be removed later, if the LAD or other process decides that this replica is no longer needed.

Metadata Replication and Compaction

In some embodiments, blobmasters perform two special related tasks with metadata: blobmasters replicate changes in the metadata to other instances and compact the changes at their own instance. Replication propagates changes to the metadata to every other instance that needs to track the changes. In general, the changes must be propagated to every global instance and each local instance that has a copy of the blob whose metadata has changed. Because the changes are stored and replicated as deltas, some embodiments periodically compact the changes to provide faster access to the data and reduce the storage space usage. The compaction process merges information about changes into the underlying base data. The operations of replication and compaction are interrelated in some important ways.

To understand metadata replication and compaction, it is useful to know how metadata is stored. For each blob, the metadata table contains both the current "merged" state of the metadata, and a sequence of zero or more metadata delta records. Each metadata update is implemented by writing a new delta record, which efficiently captures just the changes. The updates are done as "blind writes," without database locks and without a read-modify-write cycle.

One attribute of a metadata delta is a sequence identifier. In some embodiments, sequence identifiers are globally unique, which provides a well-defined unique ordering of the metadata deltas. In some embodiments, sequence identifiers are fixed-length binary strings, but other embodiments use a variable-length string, a 64-bit integer, or other appropriate data type. A sequence identifier is also referred to as a "sequencer," because it specifies where each delta falls in the global ordering of deltas.

In some embodiments, a sequence identifier comprises a timestamp and a tie breaker. The timestamp indicates when the delta was created. In some embodiments, the timestamp is the number of microseconds since the beginning of the current epoch or other well-defined point in time. In some embodiments, the timestamp is assigned by the blobmaster that received the metadata update. Generally, the timestamp is assigned at the moment the update is received. In some embodiments, one or more special clocks are used to assign these timestamps. Some embodiments use a "stable clock system" as described below.

A tie breaker uniquely identifies the blobmaster that issued the timestamp. As noted above, the blobmaster functionality at an instance may be performed by many different blobmaster tasks, each of which may assign tie breaker values to sequence identifiers that it generates. Therefore, some embodiments compute a tie breaker value as a mathematical function of both the physical machine on which the blobmaster task is running, and the UNIX process ID assigned to the task. In some embodiments, the tie breaker value is computed as a function of additional values, such as the instance identifier of the instance where the blobmaster task is running. By combining both the timestamp and a tie breaker to form a sequence identifier, when a single blobmaster task issues two successive sequence identifiers, the second one will be strictly greater than the first one. Also, because of the tie breaker values included in sequence identifiers, the sequence identifiers are globally unique. In particular, if a single blobmaster task is restarted, or if two blobmasters act on the same blob at different instances, they are guaranteed to generate different sequence identifiers.

Sequence identifiers constructed with timestamps and tie breakers have several useful characteristics. Because of the timestamp portion of sequence identifiers, the sequence identifiers are at least approximately in the natural order because the system clocks on the various computers maintain roughly the same time. That is, sequence identifiers create a stable, well-defined sort order for deltas. Because of this, the order of operations is defined to be the order created by the sequence identifiers, regardless of the "actual" order in the real world. To guarantee the approximate natural order of metadata deltas, some embodiments include programs, processes, or policies to prevent excessive divergence of the time clocks throughout the distributed storage system.

In some embodiments, each delta specifies the instance where the delta was created. That is, the instance of the blobmaster that initially received the delta. This is the instance that will be responsible for replicating the delta to all other relevant instances. The combination of sequence identifier and instance of origin for a delta is sometimes referred to as the provenance of the delta.

A metadata merger program is used to read metadata so that the most current metadata is returned to each requestor. The metadata merger program starts with "merged" base metadata. The metadata merger program then applies each of the associated zero or more deltas, in order, to the base metadata, to produce final merged metadata. In this way, metadata reads always get the most current information that is available at the instance, even if new deltas have been inserted. Whenever metadata is read by a blobmaster, the blobmaster reads both the merged base metadata and all of the associated deltas, passes them through this merger process, and returns the final result to the caller.

This use of deltas guarantees that future reads at the same blobmaster (even if a distinct blobmaster task) will correctly reflect the indicated change as soon as a delta is written to the system. The use of deltas also has the consequence that deltas accumulate over time and slow down reads. Therefore, it is desirable to incorporate deltas into the merged base metadata as soon as possible. The process of incorporating deltas into the corresponding base value and deleting the merged deltas is called compaction.

In some embodiments, each blobmaster continually runs a maintenance cycle in the background, which examines each blob in its metadata table in turn. This maintenance cycle handles both compaction and replication. In alternative embodiments, blobmasters run a maintenance cycle on a periodic basis, such as every hour, or every 10 minutes. In some embodiments, the maintenance cycle is managed by a process other than the blobmaster. While some embodiments address compaction and replication in the same maintenance cycle, these two processes can be implemented separately.

In some embodiments, deltas are grouped together into two dimensional "shapes." In general, a shape comprises one or more rectangles. One of the dimensions comprises sequence identifiers, and the other dimension comprises blob IDs. Each delta applies to a unique blob (i.e., there is a unique blob ID), and has a sequence identifier, so each delta corresponds to a unique point in this two-dimensional delta space. Conversely, each point in this two-dimensional delta space corresponds to at most one delta. The deltas in this two-dimensional space are very sparse. Some embodiments provide data structures and routines to implement geometric shapes on this space, and perform ordinary computational geometry tasks on the shapes, such as intersections, unions, and set theoretic differences.

In order to track metadata replication, some embodiments maintain an egress map and an ingress map. An egress map tracks deltas that have been transmitted to, and acknowledged by, other instances. In some embodiments, the egress map uses shapes as described above to identify the deltas that have been transmitted to and acknowledged by other instances. An ingress map tracks deltas that were transmitted from another instance to the current instance, and acknowledged by the current instance. In some embodiments, the ingress map uses shapes as described above to identify the received deltas. The ingress map at A from B should be the same as the egress map at B for A because both represent the set of deltas transmitted from B to A and acknowledged by A.

In some embodiments, the blobmaster backs up the state of the egress map in the metadata database. Although generally reliable, the consequence of losing data from the egress map is simply that the blobmaster will retransmit some data unnecessarily. (Each delta will be inserted only once, even if the same delta is retransmitted.) When a blobmaster starts up, it reads its egress map from the metadata database, and sets up its ingress map by contacting all of its peer blobmasters at other instances to retrieve data from their egress maps.

When the maintenance cycle processes a row in the metadata table, it first determines how many of the deltas can be merged into the base data without risk of creating inconsistencies between different instances. The compaction horizon specifies the upper limit of sequence identifiers that may be compacted. The blobmaster can safely compact any deltas with sequence identifiers less than this value (i.e., merge the deltas into the merged base metadata, and discard the deltas). In some embodiments, the blobmaster can safely compact any deltas with sequence identifiers less than or equal to the compaction horizon.

Generally, it is safe to compact a specific delta if two conditions are satisfied:
  The blobmaster knows with certainty that it will never receive another delta for this blob with a sequence identifier less than the sequence identifier of the specific delta. In general, the order of the deltas is important, so they need to be applied in sequence identifier order; and
  If the specific delta was created at the current instance, the blobmaster must know that this delta has already been replicated to all other appropriate instances, and the replication has been successfully acknowledged. After merging, the delta will be gone, so it must be transmitted to the other instances first. Note that this applies only to deltas created at the current instance because the current instance is responsible to replicate deltas created at the current instance.

In some embodiments, the compaction horizon is computed using the egress and ingress maps. An illustrative calculation of a compaction horizon for a given blob performs the following calculation for each other instance and for each ingress and egress map. (For example, if there are fifty other instances, then the following calculation is performed 100 times.) Compute the least sequence identifier not present in the metadata row associated with the blob ID. That is, if S is the shape for the deltas in the map, look at just the sequence identifiers corresponding to the given blob ID. Find the least sequence identifier not in this set.

The same operation is performed for each other instance and each ingress and egress map. The compaction horizon computed by this method is the minimum of all the individual calculations. This is a valid compaction horizon because (a) any delta received via metadata copying in the future will have a sequence identifier greater than or equal to this value (this follows from the use of ingress maps for each instance); and (b) all deltas with sequence identifiers less than this value have already been replicated to every other instance (this follows from the use of egress maps). It is noted that any future metadata changes associated with the given blob at the current instance will have sequence identifiers greater than the computed compaction horizon because sequence identifiers are monotonically increasing.

In some embodiments, the calculations above are limited to instances that have metadata for the identified blob (i.e., instances that have replicas of the blob as well as all global instances). In other embodiments, the calculations above for ingress maps are limited to instances that have replicas of the identified blob.

The compaction process is described in more detail below with respect to FIGS. 8, 12A, 12B, 15A, and 15B. Although the above description calculated the compaction horizon for a single metadata row, some embodiments apply the same process to groups of metadata rows, which may comprise contiguous ranges of blob IDs.

In some embodiments, the maintenance cycle regularly computes a transmission plan, which is a map from shapes in delta space to sets of instances that need to receive the designated deltas. For each entry in a plan, the maintenance cycle maintains a queue. Deltas may be written into this queue, and whenever enough bytes have been written to a particular queue, the queuing system immediately initiates a transmission of metadata to the appropriate destinations, and updates its egress maps at the appropriate time (the ingress maps are updated by the destinations). In alternative embodiments, the maintenance cycle runs at periodic times, and initiates a transmission of metadata as part of each cycle.

In summary, some embodiments of the disclosed distributed storage system have a continuously running maintenance cycle that executes the following operations for each blob's metadata:

Compute the compaction horizon.

Create a metadata record in memory for this row, which includes the base metadata values for each individual data item.

For each delta, determine if it is in the transmission plan for any destinations. If so, add the delta to the appropriate queue(s).

If the delta's sequence identifier is less than the compaction horizon, apply the delta to the metadata record in memory, and mark that delta cell for deletion.

Once all of deltas with sequence identifiers less than or equal to the compaction horizon have been processed, some embodiments perform special computations that happen at delta compaction time. Some embodiments use this opportunity to perform special computations because each delta is compacted exactly once in its lifetime at each instance. Therefore any actions that need to occur once per delta are typically scheduled to occur at the time the delta is compacted. Some embodiments perform various combinations of the following actions at compaction: (1) if any reference tombstones have expired, then the indicated reference is removed. If this was the last reference, then the blob as a whole (all generations) is marked for deletion; (2) if any deltas have caused a user's usage of the storage system to change (e.g., the user has written new data to the system that causes a change to "accounting"), then the system records all of the relevant changes to usage; (3) if the blob metadata is no longer needed at this instance, because the blob has no replicas at this instance and the instance is not global, then the entire blob (all generations) is marked for deletion at this instance. If it is later discovered that there are uncompactable deltas, the marking for deletion is undone; (4) if a delta indicates that a particular generation ought to be removed from this instance, then that generation is marked for deletion.

Once all deltas have been processed, changes in usage and updates to the metadata database are recorded.

Although compaction is important for reading efficiency, and provides an opportunity to perform other once-per-delta activities, compaction does not affect the consequences of a read operation. The deltas are either applied to the base metadata during a read operation, or were already applied to the base metadata during compaction. Because of this, some embodiments implement compaction as a background operation.

Metadata transmission plans can be modified to improve the overall efficiency of replicating the metadata to other instances. In some embodiments, every so many rows of work, the metadata replication system draws a rectangle in delta space identifying a range of blob IDs and a range of sequence identifiers. The range of sequence identifiers is bounded by the infinite past on one side and the current sequence identifier value on the other. The rectangle is selected so that once the maintenance cycle has reached the bottom of the blob ID range, every delta in the rectangle will have been replicated to every other relevant instance. The system then compares this rectangle to each egress map entry, in turn, to see what metadata deltas still need to be transmitted to each instance. The system then merges and/or modifies the transmission sets for individual instances for optimal delivery. For example, if the set of deltas to send to instance X is nearly the same as the deltas to send to instance Y, an optimal transmission plan may send the common set of deltas to both X and Y, and the small difference to just X or Y. For each set of deltas being sent, the system designs a transmission plan that uses "tree distribution" to minimize the amount of network traffic needed. This works particularly well when the set of recipients for the same set of deltas is as large as possible. Transmission plans, and how they may be optimized, are described in more detail below with respect to FIGS. 15A and 15B.

Background Replication

Much of the efficiency provided by embodiments of the disclosed distributed storage system comes from choosing replica locations well. Having well-placed replicas minimizes the need for real-time replication and other network use. Furthermore, users will use less storage if (i) they can set policies for less-needed blobs and be confident that these policies will be obeyed, (ii) they have sufficient data integrity guarantees (e.g., making sure that there are enough backups), and (iii) they have confidence that the system will dynamically add replicas for blobs that need it. Therefore, intelligent decisions about where blobs ought to be stored reduce both network usage and disk space usage.

All non-real-time decisions about additions or deletions of blob replicas are made by a module known as the location assignment daemon, which is sometimes referred to as the LAD. The LAD is conceptually a single program that runs continually or periodically to scan the metadata for all blobs. For each blob the LAD makes decisions about where, if anywhere, replicas ought to be added or removed. In an exemplary implementation, the LAD runs as a single (multi-tasked) program at a global instance or an instance that is geographically close to a global index. In other embodiments, multiple smaller LADs run at various locations, and these smaller LADs send their recommendations to a central clearinghouse for collective evaluation and execution. In some embodiments, the central clearinghouse just executes the individual recommendations; in other embodiments, the central clearinghouse evaluates each of the individual recommendations in the context of the entire distributed storage system, and makes decisions on the individual recommendations based on overall resource constraints.

The reason for the central clearinghouse is that the LAD is the only subsystem that is ever allowed to remove a replica of a blob. Without centralized control, there would be very tricky synchronization issues. For example, if there were two LADs and two replicas of a certain blob, each LAD could independently decide that it's safe to remove one, and they could remove different ones, eliminating all replicas of the blob.

LAD decisions are based on policies for each individual blob. In some embodiments, blob policies are specified by a set of predefined attributes. Other embodiments provide a blob policy expression language, which allows greater flexibility in defining blob policies. Other embodiments provide a hybrid approach, including both a predefined set of attributes and an expression language for more complex policy needs.

Embodiments of the LAD have multiple possible implementations, but the implementations have a basic structure in common. The LAD processors examine each blob in some specified sequence. Some embodiments process the blobs in a random or pseudo-random order; some embodiments process the blobs in alphabetical order by the names assigned to the blobs; some embodiments perform a quick first-pass prioritization, then process the blobs in that priority order. For each blob, LAD implementations look at the current set of replicas of the blob and the replication policy for the blob.

For each chunk store, a blob may be in one of four states: absent, present, present and acting as the source of a copy, or the destination of an active copy operation.

A blob may have multiple references, and each reference may have a policy. The policies must be mergeable in a meaningful way—basically, the "policy for a blob" is the union of the policies for each of the references. For example, if one policy says "two replicas on-disk, one of which must be in the western United States" and another says "three replicas on-disk, one of which must be in Europe," the merged policy would be "three replicas on-disk, one of which must be in the western United States, and another of which must be in Europe."

The LAD compares the current state of the blob to the policy, and decides whether it should add or remove any replicas. Generally, the basis for such a decision is to compute the cost and the benefit of any such operation. Benefits include improved compliance with a policy, positioning of a blob closer to where it is expected to be accessed soon, or reduced storage cost if eliminating a no-longer-needed replica. Costs include storage costs and network transit costs. The expected profit is the difference of these two, and if the profit is positive, it establishes the priority for performing this particular operation.

The suggested operations are then inserted into a priority queue and executed, either as-they-come or in batches. When there is a request to add a new replica, the profit computed by the LAD is used as the priority for the ReplicateBlob( ) operation.

Although the basic structure of the LAD is common across multiple implementations, there are some noteworthy differences. As noted above, different LAD implementations may process the blobs in different orders. Another difference is the set of algorithms used to assign costs and benefits for each proposed operation. Some LAD embodiments use a simple rule-based algorithm, such as "if the number of replicas is less than that specified by the policy, then adding new replicas which would match the policy are worth a fixed benefit of X." Other LAD embodiments implement a continuous auction of storage resources, where costs are determined by an "open market" of storage and network capacity, and individual blobs act as "bidders." Another "cost" that is added in some embodiments is a transaction overhead, which prevents moving replicas from one instance to another because of a small benefit. Without the consideration of overhead costs, there could be "oscillation" of a replica back and forth between two instances. This auction methodology generally provides a better allocation of storage and network resources because it considers the overall advantages for groups of blobs rather than doing the analysis for each blob in isolation. Finally, different LAD implementations execute operations in different ways. For example, some implementations execute operations singly, whereas other embodiments execute operations in batches.

Some embodiments provide a LAD simulation system. A LAD simulation system works by running the real LAD against an artificial world. The inputs are a statistical summary of the current state of real blobs (rather than the complete table of blob states, which is very large), and a configuration indicating a sequence of events that may happen at various times in the future. For example, "at time X, we will add 50 petabytes of capacity to the BigTable chunk store at the instance in Chicago" or "at time X, the entire instance in southern India suddenly fails." The simulator runs the LAD against this simulated universe, and applies the LAD operations back to the universe, producing various graphs and records of what would happen over time.

A LAD simulation system provides many advantages. One advantage is that it allows testing of new algorithms for the LAD: developers can see the consequences of new algorithms without having to actually find out in the real world (which would be both dangerous and expensive). Another advantage is that it allows for capacity planning: by feeding projections for changes in system usage and underlying capacity availability into the system, developers can see what the distributed storage system will need over time, and thus plan capital equipment acquisitions. Yet another advantage provided by LAD simulation is that it facilitates disaster readiness: by simulating disaster events of various sorts, developers can verify that the system will respond appropriately in those cases. If not, developers can modify the LAD algorithms so that the distributed storage system does respond well when real disasters occur. An additional advantage of a LAD simulation system is to provide a near term view of the future. By continually running the LAD simulator against the "plan of record," using statistical data periodically derived from the actual state of the world, developers can predict how the distributed storage system will respond over a period of weeks or months, and thus be aware of future events before they happen.

Some embodiments implement a micro-LAD that pays an important role for newly created blobs. When a blob has finished writing (i.e., when it is marked as finalized), the LAD algorithm is immediately run at the blobmaster where the blob was created. This execution of the LAD algorithm is allowed to create new replicas, but isn't allowed to remove any replicas. In some embodiments, the micro-LAD executes only for the newly created blob; in other embodiments, the micro-LAD executes for all blobs stored at the instance where the new blob was created. In general, one or more additional replicas of the blob will be needed to reach the policy goal, so creating additional replicas immediately is important. Until the new replicas are made, the blob is vulnerable to becoming unavailable if the instance becomes unavailable, or even lost if the instance is suddenly destroyed. This immediate micro-LAD run bypasses the usual wait time for a whole cycle of the LAD to complete.

Tape Backup

Embodiments of the disclosed distributed storage system implement a novel approach to tape backup. Unlike most databases, which use a separate scan and backup system, embodiments of the present invention treat tape as simply another storage type. In some embodiments, tapes create multiple storage types, such as tapes that are kept in the tape library versus tapes that are carted off to a vault somewhere. In some embodiments, the difference between tape stores and other data stores is that, because tape is so slow, one is not allowed to directly read from or write to a tape store. In these embodiments, one may only replicate to and from a tape store, which is typically implemented as a background operation. Embodiments of the present invention include a tape manager module that manages a large tape buffer. The tape buffer acts as a staging area for data going to or from tape. In some embodiments, implementations of the tape manager allow a client to read or write to tape. Because tape operations are very slow, client read and write operations will typically be directed to other data stores, even when tape is directly available. Therefore, either by design or by the practical considerations, reading and writing to tape generally does not happen in a real-time way.

Conceptually, backups are therefore driven by blob replication policies. For example, a user or user application may specify the policy "2 copies on-disk, and one copy on-tape, in three different cities." This is a typical policy a user might choose. Multiple copies on disk give both increased data integrity, in case a single copy fails, as well as increased availability, in case one replica is at an instance that is temporarily unavailable. By having the replicas at distinct locations, it can also provide faster access to a greater number of users near each replica. Tape copies improve data integrity but not availability. On the other hand, tape copies are considerably cheaper. The multiple-city requirement in this example policy provides protection against events such as blackouts, which can disrupt multiple instances at the same time. LAD replication will write a copy to tape in some appropriate location.

Blob policies effectively address what will happen at a distributed storage system when a catastrophic event occurs (such as failure of an instance). An operator indicates to the system that all chunk stores at this instance are now invalid. In some embodiments, an operator does this by updating a central configuration file. When the LAD next examines a blob with replicas at the instance marked as invalid, the LAD will discover that the blob is now under-policy: one of its replicas has gone away. The LAD therefore triggers a new replication to restore equilibrium. The cost of reading from tape is generally higher than the cost of reading from disk, because it often involves physically picking up tapes and moving them to a tape drive device. Therefore, the LAD will generally choose to create a new replica from a surviving on-disk replica. However, there may be no such replica. For example, the policy may specify one replica on-disk and one replica on-tape, or the blob may not have been fully replicated yet. In these cases, the LAD will initiate replication from tape.

Another kind of catastrophic event involves overwriting or deleting a blob due to operator error or malice. In this case, an operator can recover the old version by manually requesting that an earlier generation of the same blob be replicated to various locations, and that the new (bad) generations be deleted. In some embodiments, this is implemented by calls to ReplicateBlob( ).

In order to handle these sorts of catastrophic events, some embodiments implement tape as a type of chunk store. At a very high level, this works by maintaining a staging area. In some embodiments, the staging area is a set of files on an ordinary distributed file system. In other embodiments, the staging area is a large memory buffer, which may comprise either volatile or non-volatile storage. Blobs going to or from tape are written to designated locations in this staging area. A tape master module monitors the staging area, and assigns blobs to batches, which are then committed to the underlying tape system using appropriate commands. Tape storage is described in more detail in co-pending application U.S. Provisional Patent Application Ser. No. 61/302,909, filed Feb. 9, 2010, subsequently filed as U.S. patent application Ser. No. 13/023,498, filed Feb. 8, 2011, "Method and System for Providing Efficient Access to a Tape Storage System," which is incorporated herein by reference in its entirety.

Accounting

It is important to keep track of how much storage and network traffic each user uses for a number of reasons: billing, capacity planning, usage quotas, etc. A usage quota specifies a maximum allowed usage of a resource for a user. This is important so that an ordinary user does not use up a disproportionately large percentage of the disk space or network bandwidth, which can adversely affect other users, including other users with higher priority tasks. In some embodiments, quotas are stored in a set of quota servers distinct from the blob and metadata storage at an instance. Quota servers essentially store a set of [tag, usage] pairs, which allow easy look up, and produce logs for auditing purposes. Some embodiments use the following keys for accounting: username, chunk store name, and storage mode. In some embodiments, storage usage is specified as a numbers of bytes.

Some embodiments include four or more storage modes, including

TOTAL: All bytes owned by a given user in a given chunk store.

HYLIC: Bytes in chunks that have been written via the bitpusher, but not yet attached to any blob via a metadata update.

LIVE: Bytes in chunks that belong to a blob for which the user owns at least one reference (and the reference has not yet been marked as deleted).

ZOMBIE: Bytes in chunks that belong to a blob for which all of the user's references have been deleted, although the blob itself has not yet vanished.

As these exemplary storage modes illustrate, the storage modes are not necessarily mutually exclusive. For example, LIVE bytes and ZOMBIE bytes are mutually exclusive, but both of these are included in the TOTAL bytes.

These byte counters are incremented by bitpushers when chunks are created or destroyed, and by the blobmaster at delta compaction time. However, managing these transitions (such as bytes going from HYLIC to LIVE) is surprisingly complicated. To achieve accurate accounting of bytes, some embodiments have the blobmaster maintain a state machine, which tracks blob states at each chunk store for each user who owns a reference to that blob and the chunk store. That is, there is a state assigned to each triple (blob, user, chunk store). The states essentially track the stages of a blob, from early creation to eventual deletion. Within this lifespan, some embodiments identify four states:

> HYLIC: A blob is "hylic" for a user if the chunks have been written to a bitpusher under ownership of that particular user, but the chunks have not yet been attached to any blob. In this inchoate state, the blob is not accessible to anyone.
>
> LIVE: A blob is "live" for a user if that user has at least one reference that does not have a tombstone on it.
>
> ZOMBIE: A blob is a "zombie" for a user if that user has at least one reference, but all of the user's references have tombstones.
>
> DEAD: A blob is "dead" for that user if the user owns no references to that blob, and/or that blob does not exist in the given chunk store. This is the default state.

In summary, for each (blob, user, chunk store) triple, some embodiments track both the state of the blob and the number of bytes that the blob uses in the chunk store. Note that two replicas of the same blob may use different numbers of bytes. For example, some embodiments count byte usage according to the block sizes used in the chunk stores. For example, a file system chunk store may implement 4K blocks, so each blob would use an integer number of these blocks.

Every event in the life of a blob can be considered as moving the blob between the four states identified above, and transitions between these four states correspond to changes in the usage for the four storage modes. The first two storage usage rules depend on the original state of the blob, and the last two storage usage rules depend on the new state of the blob. For each transition, two of the following transition rules will apply:

> If a number of bytes are moving (for a particular user and chunk store) from the DEAD state to any other state, the TOTAL usage is incremented by that number.
>
> If a number of bytes are moving from any state other than DEAD, the usage for that storage mode is decremented by that number of bytes. For example, in a transition from a HYLIC state to a LIVE state, the HYLIC usage is decremented.
>
> If a number of bytes are moving (for a particular user and chunk store) to the DEAD state, the TOTAL usage is decremented by that number.
>
> If a number of bytes are moving to any state other than DEAD, the usage for that storage mode is incremented by that number of bytes. For example, in a transition from a HYLIC state to a LIVE state, the LIVE usage is incremented.

The following sample sequence of events illustrates the accounting process. User Jim writes a 100-byte chunk to the bitpusher. The bitpusher increments the usage for (Jim, chunkstore, HYLIC) and (Jim, chunkstore, TOTAL) by 100. Jim then calls FlushMetadata( ) on his blob writer object, causing those chunks to be added to a blob. The blobmaster records that the size of this blob in the particular chunk store has increased by 100, and notes that 100 bytes have moved from (Jim, chunkstore, HYLIC) to (Jim, chunkstore, LIVE). Under unusual circumstances, the 100 bytes would instead be moved to (Jim, chunkstore, ZOMBIE) if Jim's reference(s) to this blob all have tombstones. If any other users have references to this blob, then for each of them, 100 bytes move from (username, chunkstore, DEAD) to (username, chunkstore, LIVE). Just like Jim, these could be in the ZOMBIE storage mode depending on the state of each user's references.

Continuing the sample sequence of events, assume someone adds a reference to a blob. This results in incrementing the count of the user's total references to the blob and the user's count of live references to the blob. The user's usage transitions from (username, chunkstore, state) to (username, chunkstore, new state). The state may change between LIVE and ZOMBIE. Similar things happen when a reference is removed, or when a tombstone expires. If a replica is removed from an instance, then for all users who have references to that blob, the state changes from whatever it was to DEAD.

The above explanation demonstrates how embodiments of the present invention naturally express every event in the life of a blob in terms of the four primitive modes. The values for those four modes are saved in a log and subsequently used to compute usage over time in each chunk store for each user. This is used to produce billing information. In some embodiments, billing information depends only on TOTAL bytes. Monitoring of hylic, live and zombie bytes is important so that users can see where their bill is coming from. An anomalously high fraction of hylic or zombie bytes could indicate a problem. In some embodiments, different billing rates apple to different storage modes. For example, the billing rate for LIVE storage may be higher than storage of HYLIC or ZOMBIE storage.

Some embodiments of the disclosed distributed storage system track other information in addition to blob storage usage. For example, some embodiments track counts of read and write operations to each chunk store, and usage of each network link by the user. These items translate directly to billing in a natural way, but generally do not involve anything as complicated as the complicated state transitions outlined above.

Logging

Some embodiments log events in the life of a blob for debugging and auditing purposes. In some embodiments, the log is structured as a database, which may be implemented in a BigTable or a relational database. In a BigTable implementation, the key for each row is a blob ID, and the value is simply the sequence of every metadata delta that has been applied to this blob. In some embodiments, certain information stripped out to limit the size, and to prevent blob contents from being inadvertently revealed by the log data.

A "life of a blob" server is an exemplary front-end for this event log. The server may be queried for any particular blob ID by an authorized user, who can then see the full history of all mutations. This information can be used for debugging purposes. Additionally, metadata deltas may have human-readable annotations indicating the author and purpose. Certain metadata changes require such annotations, such as setting of the "administrative bits" in a blob. These are flags that may be used for legal purposes. Two exemplary administrative bits are:

> "blocked:" When this bit is set, the system does not return the contents of this blob to any user, except for designated superusers. However, the blob itself is not actually deleted. One intended purpose of this flag is to respond to legally imposed takedown orders. Even when taken down, there may be reasons not to actually discard the copy.

"preserved:" When this bit is set, the system will not delete the specified generation unless the entire blob is deleted. If this is set in combination with the caller adding a new reference, the blob contents will always be preserved by the system until the reference is released or the flag is cleared. One intended purpose of this flag is to respond to legal preservation orders.

Coprocessors

Because network links are expensive, sometimes it is useful for a user to be able to execute a function to transform a replica of a blob close to where that blob is stored, and transmit the transformed copy to the user. For example, a user may store digital images in embodiments of the distributed storage system, and want to generate small thumbnail images. Rather than shipping a large image across the planet and then computing the thumbnail, it is more efficient to first compute a thumbnail and ship just the thumbnail to the destination. Some embodiments of the disclosed distributed storage system include coprocessor functionality to implement these types of transformations.

In some embodiments, coprocessors are programs initiated by a user of the system that execute within the distributed storage system. Some embodiments expose a network RPC API (Remote Procedure Call in an Application Programmer Interface), which may be accessed by a load balancing system under some particular service name. Some embodiments extend the "read" function in the interface to take as arguments the load-balancer name of a coprocessor, and the name of the RPC to be called. Such a "read" command requests that the given blob be passed through the given function call, with the transformed blob returned to the user.

In some embodiments, the client receives the metadata from the blobmaster as usual, and when the client requests the actual contents of the blob from the bitpusher, the bitpusher initiates the transformation. That is, the bitpusher reads the contents of the blob, calls a nearby coprocessing server (via a load-balancer call) to perform the indicated RPC, and returns that result to the user rather than the blob contents. In the case of inline blobs, the blobmaster does this instead of the bitpusher.

In other embodiments, the "derived blobs" created from the coprocessor call are cached and ultimately saved as part of the original blob. For example, if the blobmaster received a request for the output of passing blob X through the thumbnailer, it could look at the replicas and say, "there is an unthumbnailed copy close by, or a thumbnail copy a bit farther away," and make an efficient decision of whether it would be more efficient to re-run the coprocessor or to fetch remote data. This is similar to decisions about serving data from a remote instance versus performing a real-time replication to a closer instance.

"Representations" of blobs support this concept of creating derived blobs from an original blob. When a coprocessor call is made, if this call has been marked as cacheable, the bitpusher will write out the results of the coprocessor call as chunks to one of its own local data stores, and then inform the blobmaster that it has created a new representation of the blob. In some embodiments, the representation ID of the derived blob is the name of the coprocessor call and the set of arguments that were passed to the coprocessor call. This representation is considered to be a part of the generation from which the derived blob was created. Representations created as derived blobs are replicated and propagated in the usual way.

Saving copies of transformed blobs provides for on-demand performance of potentially expensive operations. In the thumbnailing example, it means that one does not need to precompute thumbnails for every image in order to have them quickly available. Once an image is thumbnailed, the thumbnail persists in the blob store, and future reads can access it. This is especially important for operations that are expensive in both computation and storage, such as conversion of file formats.

The Stable Clock System

In some embodiments, the timestamps used to construct sequence identifiers just read the time from the computer's clock. However, computer clocks are imperfect for several reasons. First, many computer clocks do not track time with sufficient accuracy. Second, computer clocks sometimes jump forward or backward for unknown reasons. Implementations of the disclosed distributed storage systems require a clock that is both accurate and guaranteed to be monotonically increasing, so some embodiments implement a stable clock system.

In a stable clock system, the timestamps need to be monotonically increasing. Specifically, within the lifetime of a single UNIX process, successive sequence identifiers need to be increasing. In some embodiments, this is implemented by running a simple monotonic clock on top of an underlying clock. This guarantees strictly increasing sequence identifiers within a single process (e.g., blobmaster task), but does not guarantee that sequence identifiers issued by different tasks will appear in the right order. In particular, if two successive operations are routed to different blobmaster tasks (e.g., due to load-balancing), they may be issued sequence identifiers that are out of order because the internal time clocks are different. This is contrary to user expectations, and can lead to unexplainable results.

Some embodiments avoid this problem by functionality in the client library. Whenever the client library receives a response from a blobmaster about any operation that issued a new sequence identifier, the client library stores that sequence identifier in memory. When the client library sends future requests, it attaches that sequence identifier to the call, so that any new sequence identifiers issued are greater than that one. This solves the ordering problem, but introduces another one. Since each blobmaster's clock must be monotonic, a blobmaster may have to manually advance its own clock by some amount in order to generate a sequence identifier that is greater than the one passed from the client library. If a client were to send a malformed request, it could corrupt the entire state of the blobmaster, pushing its internal clock into the distant future.

Some embodiments avoid this new problem, by placing a limit on how far forward the clock can be manually adjusted. If the timestamp portion of the sequence identifier passed from the client is too far in the future (e.g., a gap of more than a minute), the blobmaster assumes that the clock value is bogus, and returns an error. However, this creates yet another problem: there is no obvious remediation that a client can do in response to these errors. At best, the system can make sure that these errors are rare and meaningful.

There are two things that could cause this type of irremediable error. One source of the error is a problem on the client side that sent a bogus sequence identifier value. This could be due to a bug in the client library, or memory corruption in the client application, which resulted in overwriting the real value. There is no way to avert these problems with certainty, but eliminating all other sources of the issue would help to identify these potential problems as the source. The other class of problem is that another blobmaster issued a bogus sequence identifier, far in the future, and the client would then (correctly) propagate a bad value everywhere so that all blobmasters had the incorrect future time.

This problem can be averted by ensuring that no blobmaster's clock suddenly jumps forward. Unfortunately, this can easily happen with a machine's system clock for a variety of reasons, including NTP (network time protocol) updates, or sporadic hardware failures. Therefore, to avoid these problems, some embodiments do not use the machine's system clock as the underlying clock for sequence generation. Instead, these embodiments use a stable clock system.

Figure 26:
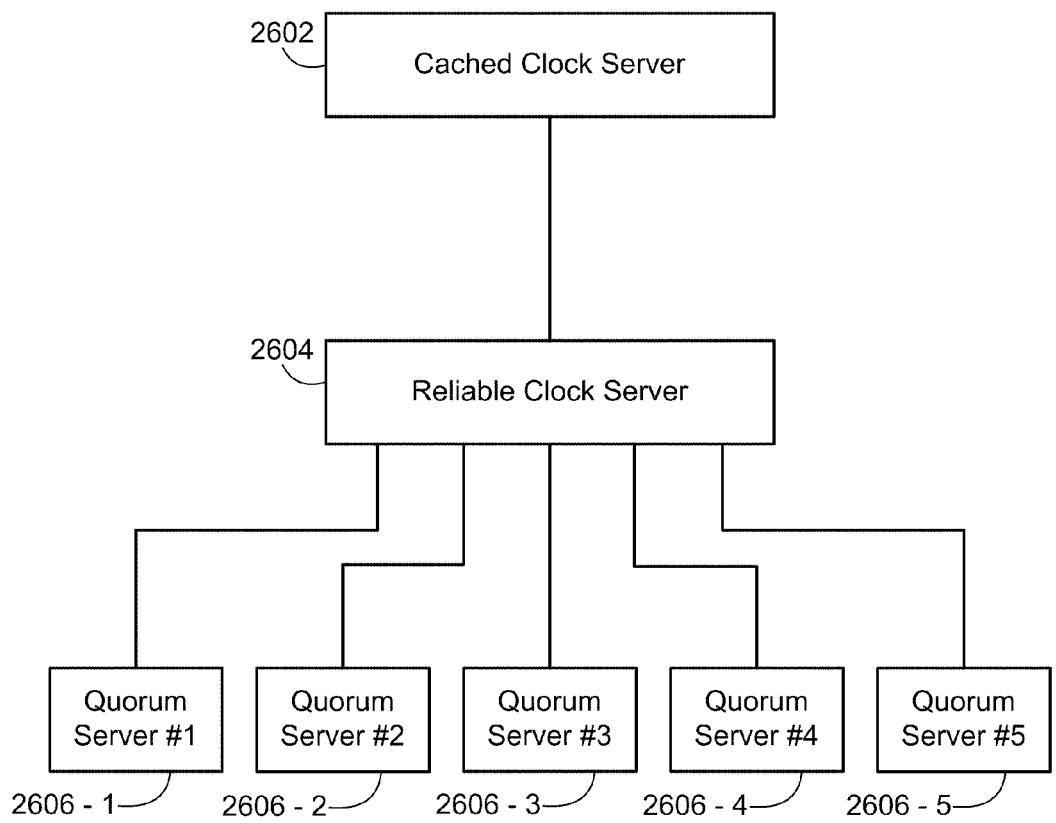
FIG. 26 is a block diagram that illustrates a three layer stable clock system according to some embodiments.

Some embodiments of a stable clock system comprise three layers, as illustrated in FIG. 26. At the bottom are the quorum clock servers 2606-1 to 2606-5, which are servers that simply report their own machine system time in response to a query. The middle layer is the "reliable clock" 2604, which is a software library running on the blobmaster that determines the current time by querying a number of clock servers, and verifying that they agree about what time it is to within some specified precision. In some embodiments, the precision is specified as a small number of milliseconds. In other embodiments, precision had a predefined value in the range of 100-1000 microseconds. If the clock servers 2606 do not agree, the reliable clock server 2604 re-polls the clocks. If there still isn't a reasonable quorum after a few tries, the reliable clock 2604 alerts a human that something has gone seriously wrong. The reliable clock server 2604 is not prone to skewing, but it responds to requests relatively slowly. The reliable clock 2604 calls up each of the clock servers to determine a quorum, rather than reading a single hardware register on a local computer. Therefore, some embodiments include a third layer on top of this, which is sometimes referred to as the "cached clock" server 2602. The cached clock server 2602 periodically queries the reliable clock server 2604, and uses the time from the reliable clock server 2604 to calibrate its own machine system clock. That is, whenever the cached clock server 2602 gets a result from the reliable clock server 2604, the cached clock server 2602 redefines "now" to be the value it received. At any time in the future, the system clock on the cached clock server 2602 will be the elapsed time as measured by the machine system clock, plus that reliable clock value. If the elapsed time as measured by the system clock ever exceeds the time interval between reliable clock retests, the cached clock server 2602 instead rechecks the reliable clock server 2604. In this way, if the machine clock on the cached clock server 2602 does suddenly skew forward, it will trigger a recheck of the reliable clock server 2604, rather than allowing a bogus timestamp to be returned to the caller.

DETAILED DESCRIPTION OF SOME EMBODIMENTS

Figure 2:
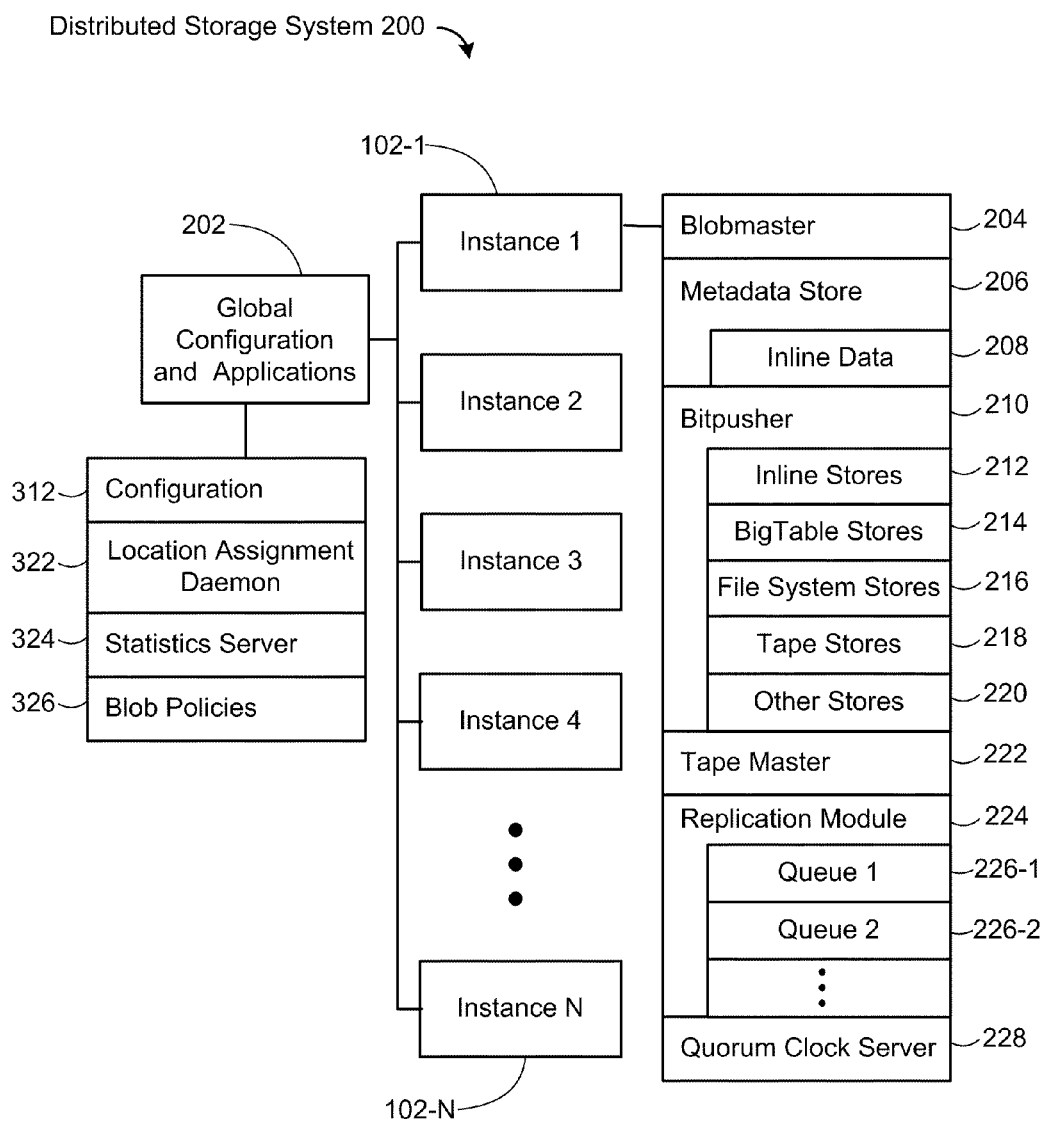
FIG. 2 is a block diagram illustrating multiple instances of a replicated database, with an exemplary set of programs and/or processes shown for the first instance according to some embodiments.
Figure 3:
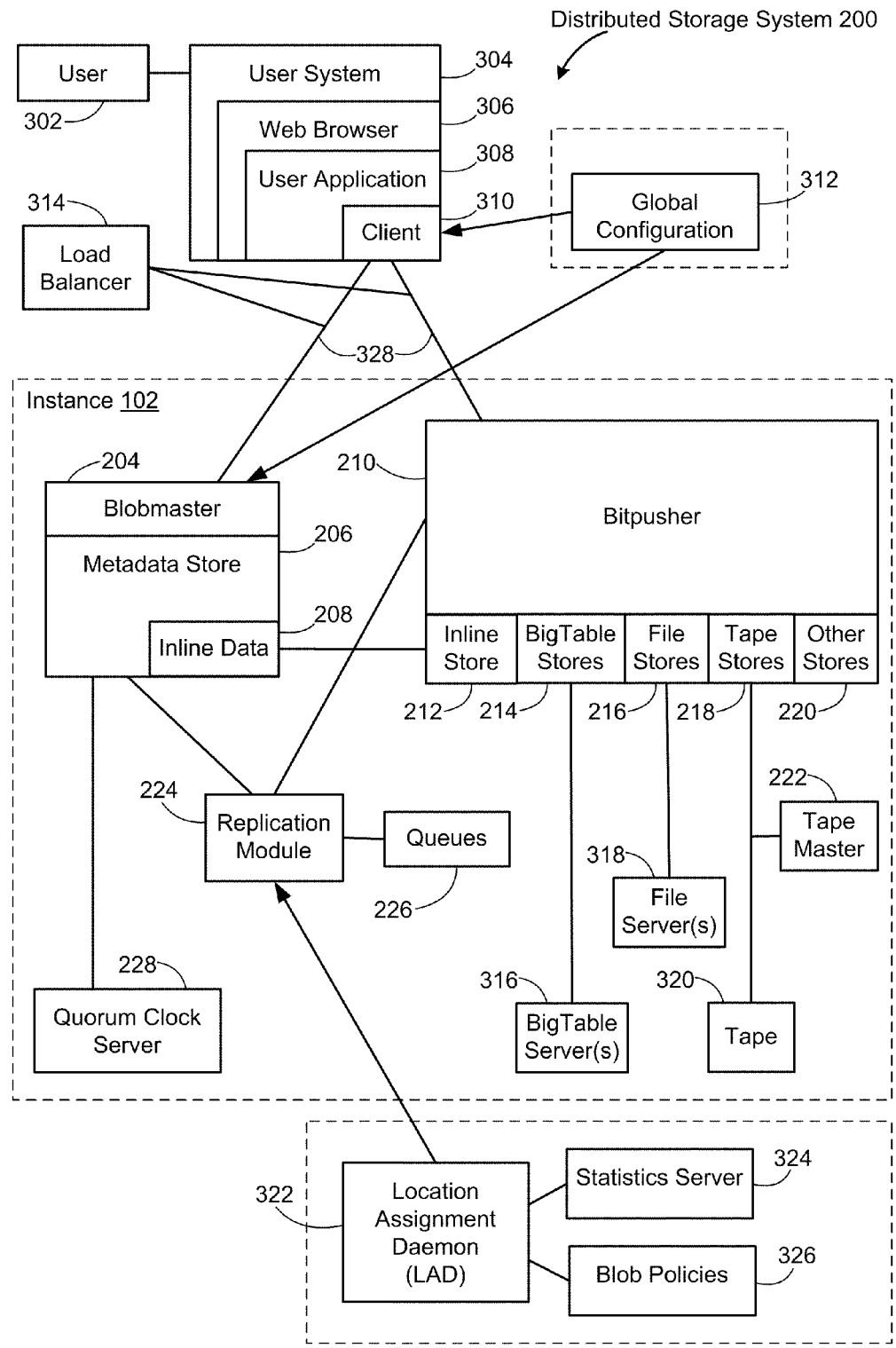
FIG. 3 is a block diagram that illustrates an exemplary instance for the system, and illustrates what blocks within the instance a user interacts with according to some embodiments.

The present specification describes a distributed storage system. In some embodiments, as illustrated in FIG. 1A, the distributed storage system is implemented on a global or planet-scale. In these embodiments, there are a plurality of instances 102-1, 102-2, . . . 102-N at various locations on the Earth 100, connected by network communication links 104-1, 104-2, . . . 104-M. In some embodiments, an instance (such as instance 102-1) corresponds to a data center. In other embodiments, multiple instances are physically located at the same data center. Although the conceptual diagram of FIG. 1 shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
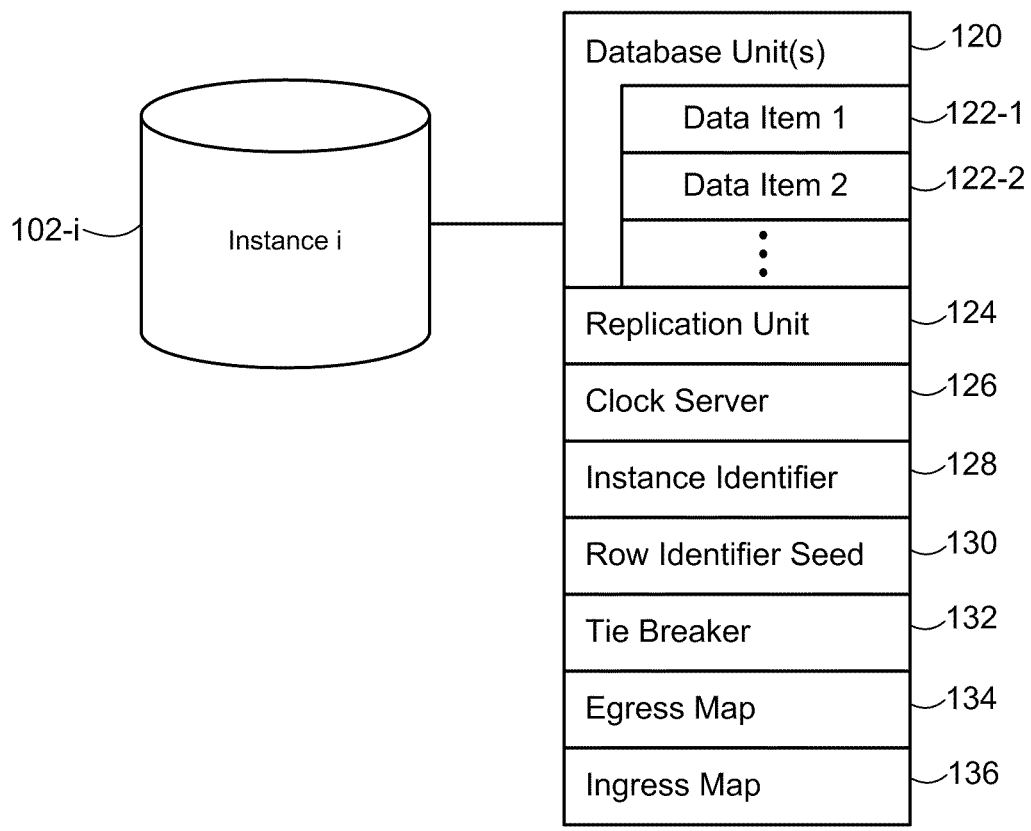
FIG. 1B illustrates basic functionality at each instance according to some embodiments.

FIG. 1B illustrates data and programs at an instance 102-$i$ that store and replicate data between instances. The underlying data items 122-1, 122-2, etc. are stored and managed by one or more database units 120. Each instance 102-$i$ has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances. Egress maps and ingress maps are described in more detail below with respect to FIGS. 14A-14D, 15A, and 17.

Each instance 102-$i$ has one or more clock servers 126 that provide accurate time. In some embodiments, the clock servers 126 provide time as the number of microseconds past a well-defined point in the past. In some embodiments, the clock servers provide time readings that are guaranteed to be monotonically increasing. In some embodiments, each instance server 102-$i$ stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-$i$ stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described below with respect to FIGS. 6-9). In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

In some embodiments the disclosed distributed storage system 200, the distributed storage system is used by one or more user applications 308, which are provided by application servers, such as 150-1, 150-2, 150-3, 150-4, and 150-5 illustrated in FIGS. 1C-1G. Exemplary user applications that use embodiments of the disclosed distributed storage system include Gmail, YouTube, Orkutt, Google Docs, and Picassa. Some embodiments of the disclosed distributed storage system simultaneously provide storage for multiple distinct user applications, and impose no limit on the number of distinct user applications that can use the distributed storage system. For example, a single implementation of the disclosed distributed storage system may provide storage services for all of the exemplary user applications listed above. In some embodiments, a user application 308 runs in a web browser 306, on a user computer system 304. A user 302 interacts with a user application 308 according to the interface provided by the user application. Each user application 308 uses a client library 310 to store and retrieve data from the distributed storage system 200.

Figure 1C:
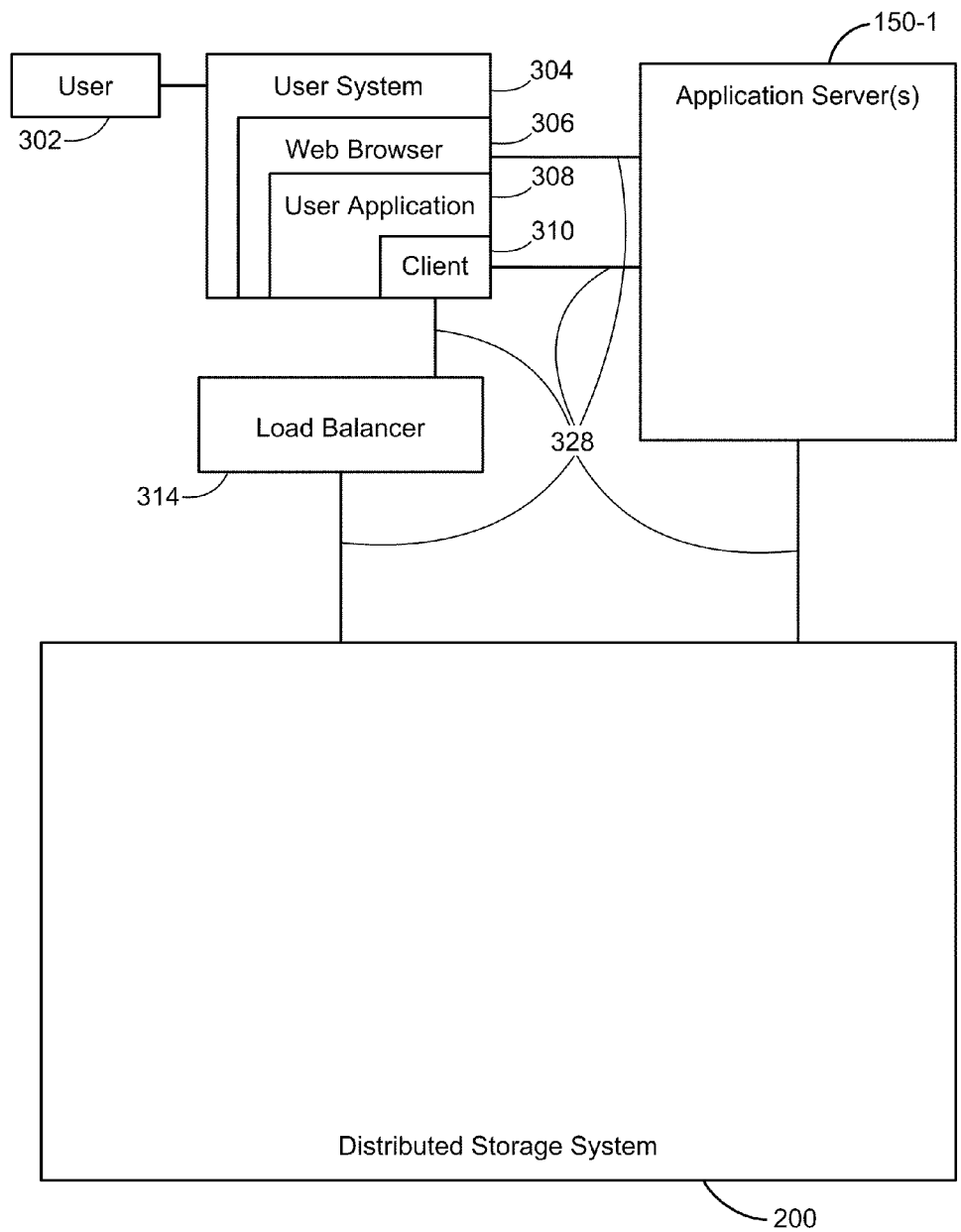
FIGS. 1C-1G illustrate ways that a distributed storage system may be integrated with systems that provide user applications according to some embodiments.

FIG. 1C illustrates an embodiment in which a user application is provided by one or more application servers 150-1. In some embodiments, the web browser 306 downloads user application 308 over a network 328 from the application servers 150-1. In addition to communication between the application server 150-1 and the user system 304, the application server(s) 150-1 communicate over network 328 with the distributed storage system 200. In particular, the application servers may establish storage policies 326 that are applicable to all data stored by the supplied user application. For example, administrators of the Gmail Application servers may establish storage policies 326 that are applicable to millions of user of Gmail.

In some embodiments, communication between the client library 310 and the distributed storage system utilizes a load balancer 314, which can distribute user requests to various instances within the distributed storage system based on various conditions, such as network traffic and usage levels at each instance. In the embodiment illustrated in FIG. 1C, the load balancer 314 is not an integrated component of the distributed storage system 200. The load balancer 314 communicates with both the client library 310 and the distributed storage system 200 over one or more networks 328. The network 328 may include the Internet, one or more local area networks (LANs), one or more wide are networks (WANs), one or more wireless networks (WiFi networks), or various combinations of these.

Figure 1D:
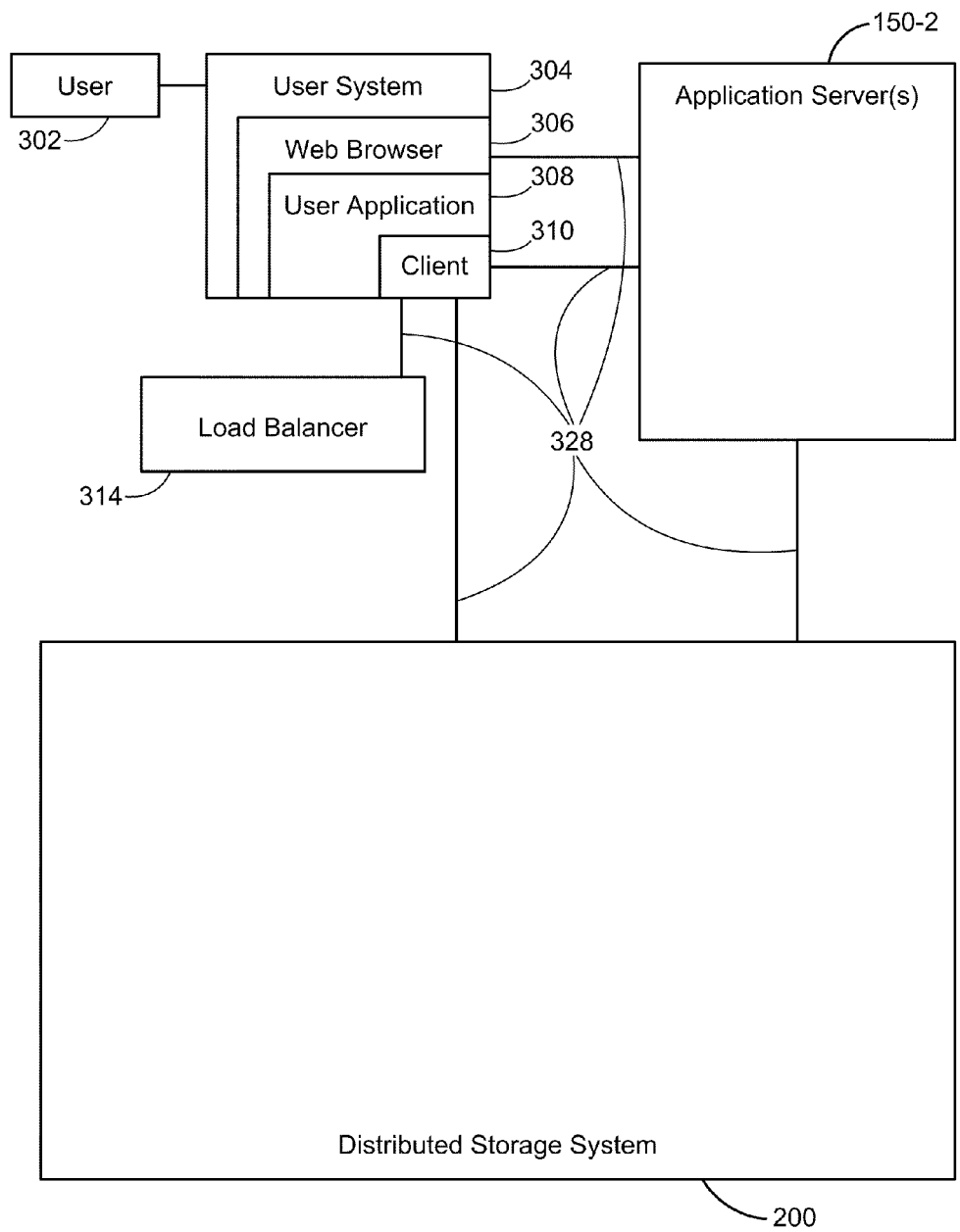

FIG. 1D illustrates an embodiment that is similar to FIG. 1C, except that the load balancing system 314 just returns information to the client library 310 to specify which instance 102 within the distributed storage system 200 should be contacted. The client library 310 then contacts the appropriate instance 102 directly.

Figure 1E:
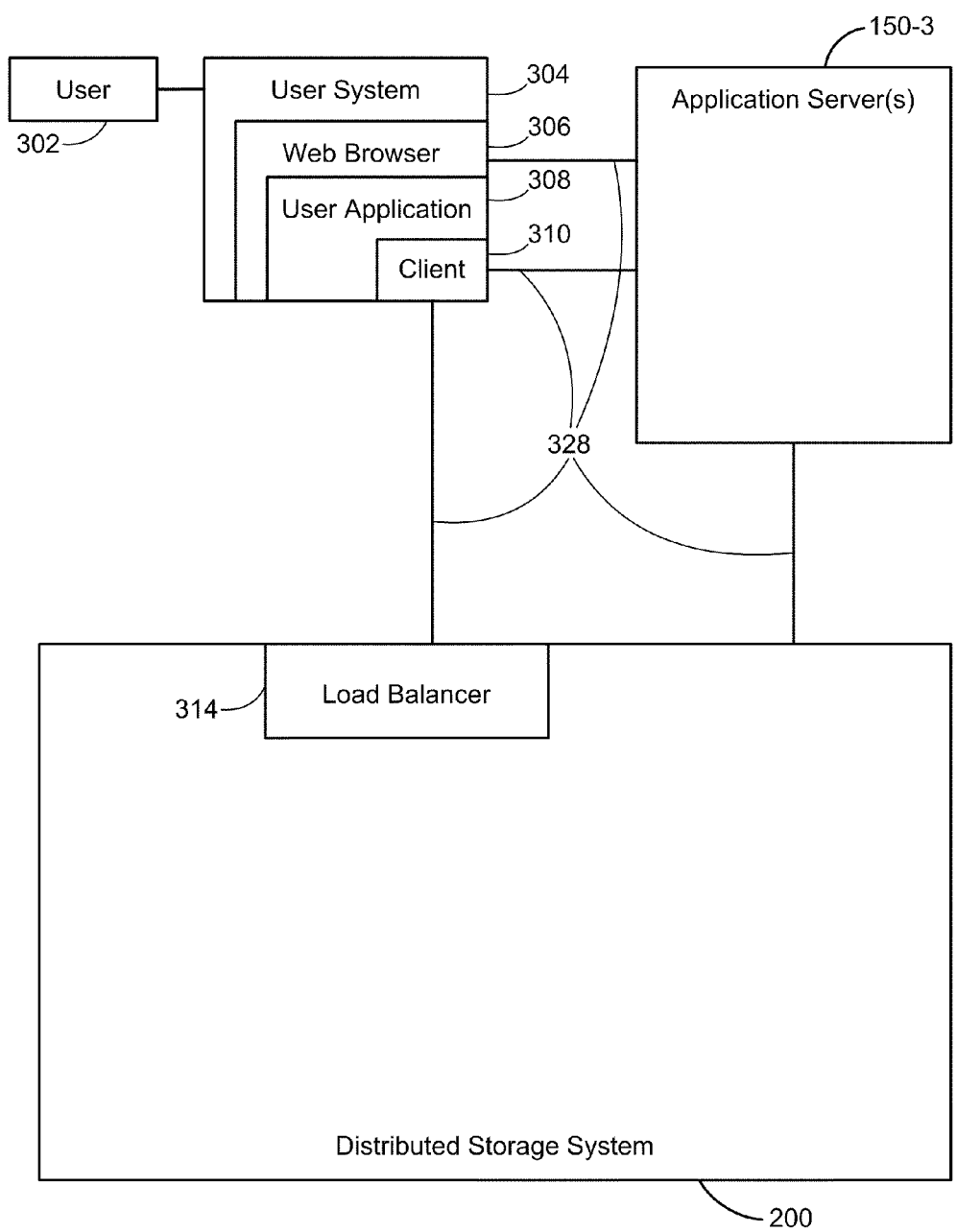

FIG. 1E illustrates an embodiment that is similar to FIG. 1C, except that the load balancing system 314 is an integrated part of the distributed storage application 200. In some embodiments, load balancers 314 are included at some or all of the instances within the distributed storage system 200. Even in these embodiments, a load balancer 314 may direct the communication to a different instance.

Figure 1F:
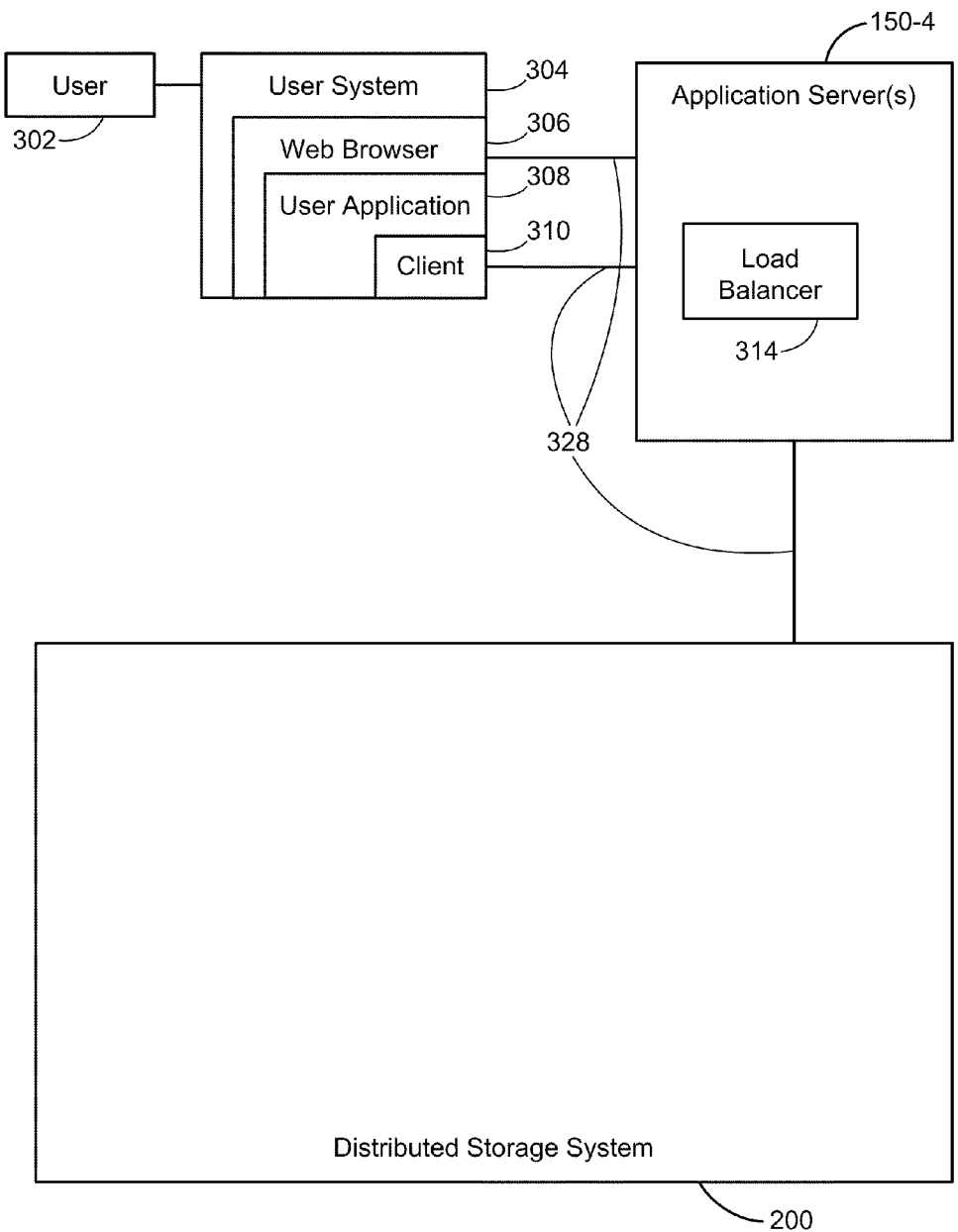

FIG. 1F illustrates an embodiment that is similar to FIG. 1C, except that the load balancing service 314 is included in the application servers 150-4. This embodiment is more commonly used when the distributed storage system 200 is being used by a single user application provided by the application servers 150-4. In this case, the load balancer 314 has a complete picture of the load because the application servers 150-4 receive all of the traffic directed to the distributed storage system.

Figure 1G:
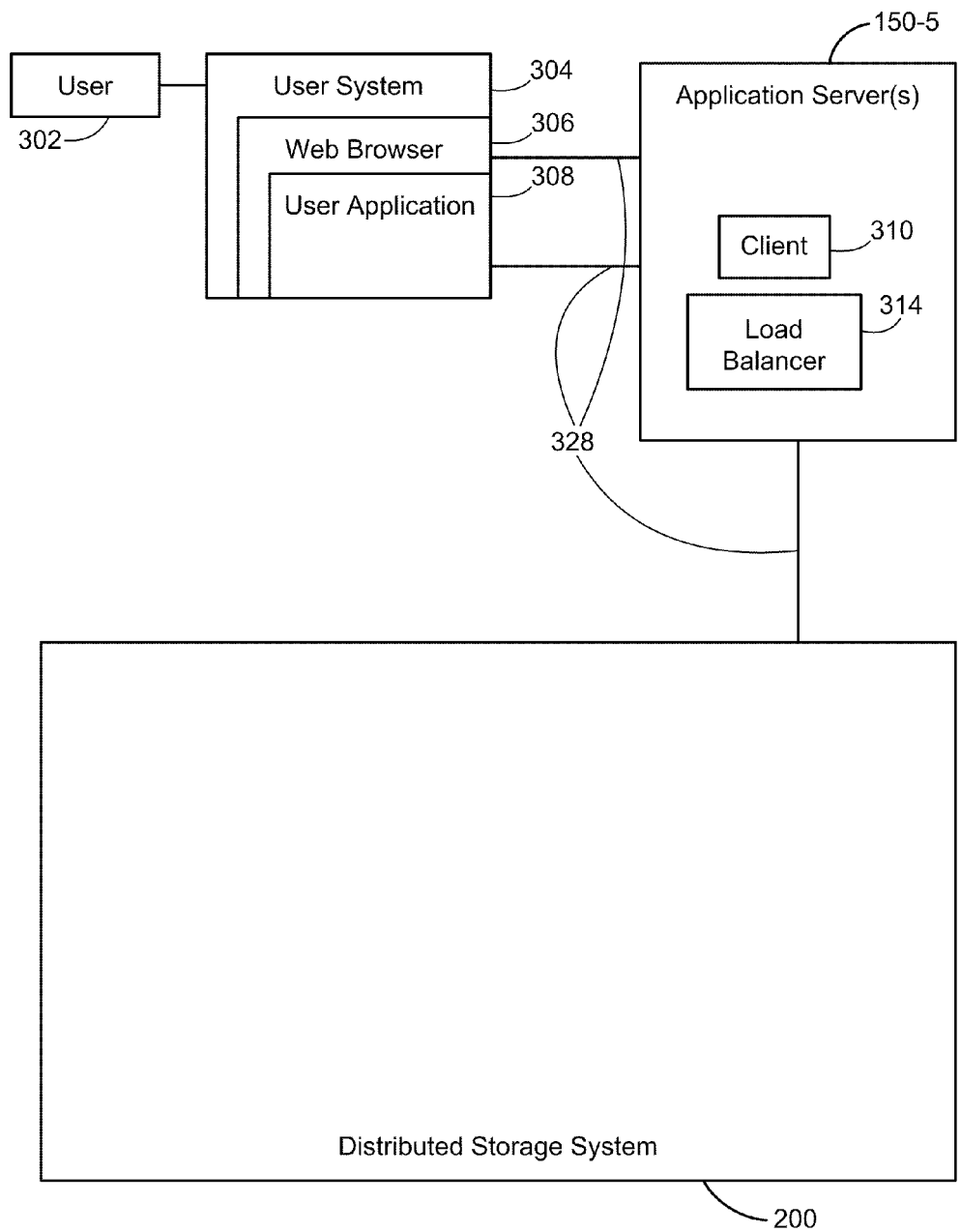

FIG. 1G illustrates a variation of FIG. 1F, in which the client library 310 is maintained at the application servers 150-5 rather than integrated within the running user application 308.

The distributed storage system 200 shown in FIGS. 2 and 3 includes certain global applications and configuration information 202, as well as a plurality of instances 102-1, . . . 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob. The exemplary data structures in FIGS. 18A-18E illustrate other metadata that is stored in metadata table 206 in some embodiments.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. In some embodiments, communication between the client 310 and bitpushers 210 is routed according to a load balancer 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blobs identifies which instances have copies of the desired blob, so the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In some embodiments, a bitpusher has no knowledge of the contents of the data that is read or written, and does not attempt to interpret the contents. Embodiments of a bitpusher 210 support one or more types of data store. In some embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In some embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In some embodiments, the file system is distributed across many individual servers 318 to reduce risk of loss or unavailability of any individual computer.

Tape stores 218 store data on physical tapes 320. Unlike a tape backup, the tapes here are another form of storage. This is described in greater detail in co-pending U.S. Provisional Patent Application Ser. No. 61/302,909, filed Feb. 9, 2010, subsequently filed as U.S. patent application Ser. No. 13/023, 498, filed Feb. 8, 2011, "Method and System for Providing Efficient Access to a Tape Storage System," which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution.

In some embodiments, each instance has a replication module 224, which identifies blobs or chunks that will be replicated to other instances. In some embodiments, the replication module 224 may use one or more queues 226-1, 226-2, . . . . Items to be replicated are placed in a queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. Provisional Patent Application Ser. No. 61/302,896, filed Feb. 9, 2010, subsequently filed as U.S. patent application Ser. No. 13/022,579, filed Feb. 7, 2011, "Method and System for Dynamically Replicating Data Within a Distributed Storage System," which is incorporated herein by reference in its entirety.

In some embodiments, there is a background replication process that creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226, with the lowest priority. The use of blob policies 326 and the operation of a location assignment daemon 322 are described in more detail in co-pending U.S. Provisional Patent Application Ser. No. 61/302,936, filed Feb. 9, 2010, subsequently filed as U.S. patent application Ser. No. 13/022,290, filed Feb. 7, 2011, "System and Method for managing Replicas of Objects in a Distributed Storage System," which is incorporated herein by reference in its entirety.

Figure 4:
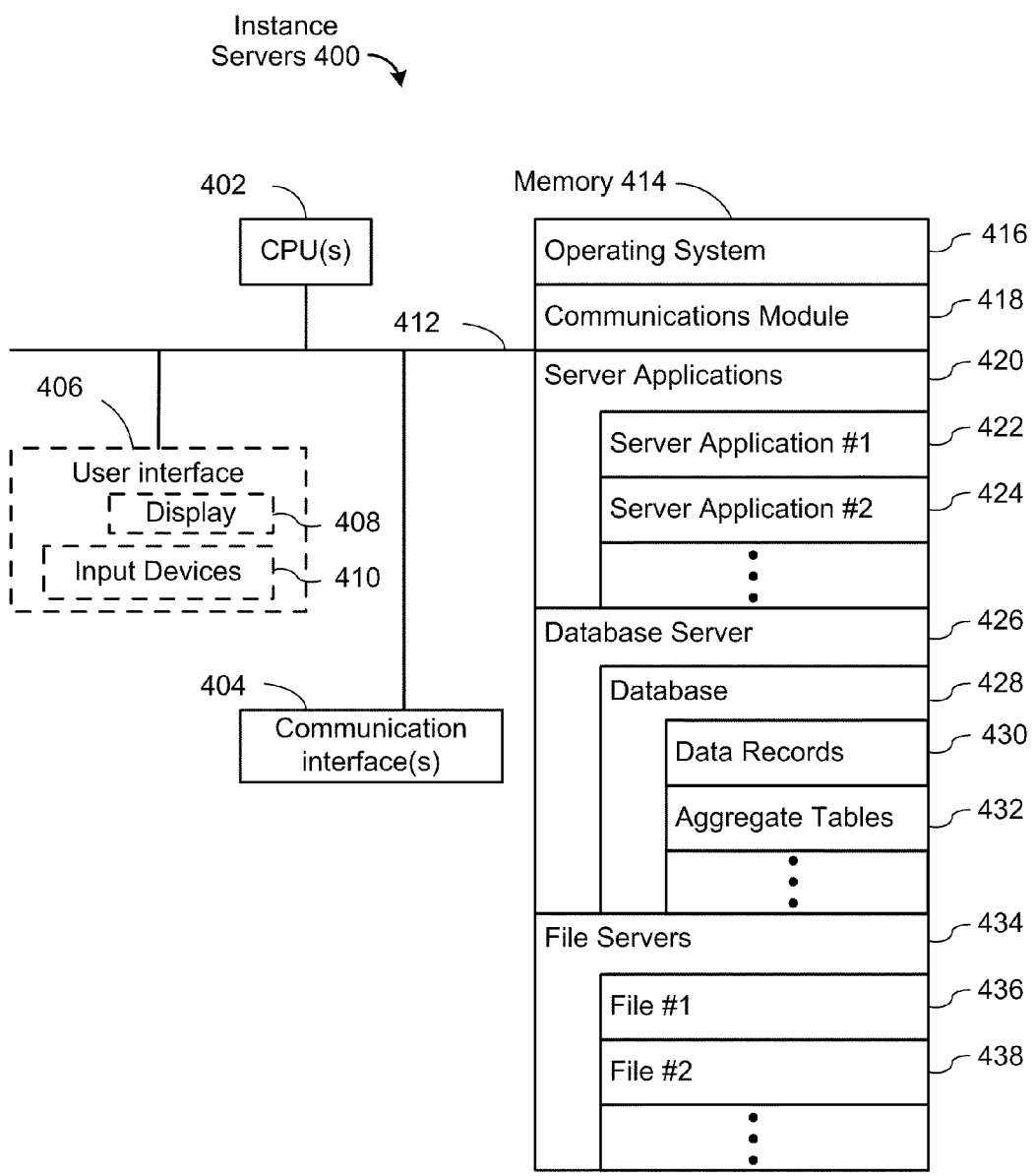
FIG. 4 is a block diagram of an instance server that may be used for the various programs and processes illustrated in FIGS. 1B, 2, and 3, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, programs and/or instructions stored in memory 414 and thereby performing processing operations; one or more network or other communications interfaces 404; memory 414; and one or more communication buses 412 for interconnecting these components. In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- one or more server applications 420, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 422 and 424 may execute on the same physical computer;
- one or more database servers 426 that provides storage and access to one or more databases 428. The databases 428 may provide storage for metadata 206, replication queues 226, blob policies 326, global configuration 312, the statistics used by statistics server 324, as well as ancillary databases used by any of the other functionality. Each database 428 has one or more tables with data records 430. In some embodiments, some databases include aggregate tables 432, such as the statistics used by statistics server 324; and
- one or more file servers 434 that provide access to read and write files, such as file #1 (436) and file #2 (438). File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods.

Figures 5, 6:
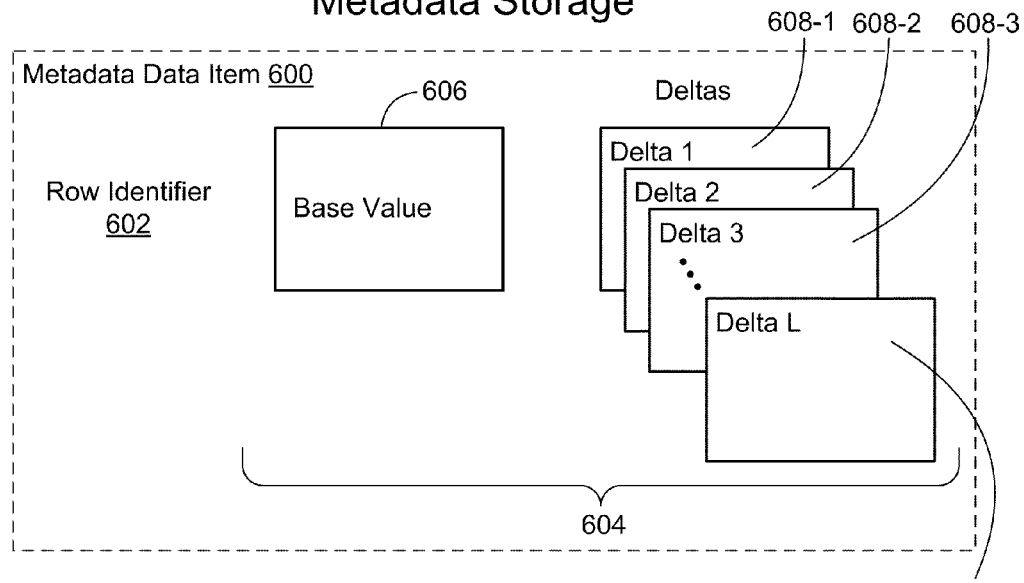
FIG. 5 illustrates a typical allocation of instance servers to various programs or processes illustrated in FIGS. 1B, 2, and 3, according to some embodiments.
FIG. 6 illustrates how metadata is stored according to some embodiments.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512) as tape masters. In some embodiments, each instance has about 10 instance servers performing (514) replication management, which includes both dynamic and background replication. In some embodiments, each instance has about 5 instance servers performing (516) as quorum clock servers.

FIG. 6 illustrates the storage of metadata data items 600 according to some embodiments. Each data item 600 has a unique row identifier 602. Each data item 600 is a row 604 that has a base value 606 and zero or more deltas 608-1, 608-2, ..., 608-L. When there are no deltas, then the value of the data item 600 is the base value 606. When there are deltas, the "value" of the data item 600 is computed by starting with the base value 606 and applying the deltas 608-1, etc. in order to the base value. A row thus has a single value, representing a single data item or entry. Although in some embodiments the deltas store the entire new value, in some embodiments the deltas store as little data as possible to identify the change. For example, metadata for a blob includes specifying what instances have the blob as well as who has access to the blob. If the blob is copied to an additional instance, the metadata delta only needs to specify that the blob is available at the additional instance. The delta need not specify where the blob is already located. The reading of metadata data items 600 is described in more detail with respect to FIG. 13. As the number of deltas increases, the time to read data increases, so there is also a compaction process 1200 described below in FIGS. 8 and 12A-12B. The compaction process merges the deltas 608-1, etc. into the base value 606 to create a new base value that incorporates the changes in the deltas.

Although the storage shown in FIG. 6 relates to metadata for blobs, the same process is applicable to other non-relational databases, such as columnar databases, in which the data changes in specific ways. For example, an access control list may be implemented as a multi-byte integer in which each bit position represents an item, location, or person. Changing one piece of access information does not modify the other bits, so a delta to encode the change requires little space. In alternative embodiments where the data is less structured, deltas may be encoded as instructions for how to make changes to a stream of binary data. Some embodiments are described in publication RFC 3284, "The VCDIFF Generic Differencing and Compression Data Format," The Internet Society, 2002. One of ordinary skill in the art would thus recognize that the same technique applied here for metadata is equally applicable to certain other types of structured data.

Figure 7:
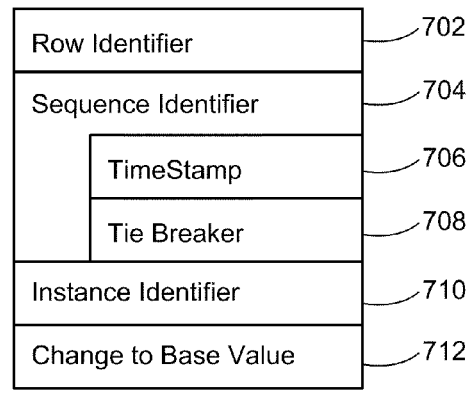
FIG. 7 illustrates a data structure that is used to store deltas according to some embodiments.

FIG. 7 illustrates an exemplary data structure to hold a delta. Each delta applies to a unique row, so the delta includes the row identifier 702 of the row to which it applies. In order to guarantee data consistency at multiple instances, the deltas must be applied in a well-defined order to the base value. The sequence identifier 704 is globally unique, and specifies the order in which the deltas are applied. In some embodiments, the sequence identifier comprises a timestamp 706 and a tie breaker value 708 that is uniquely assigned to each instance where deltas are created. In some embodiments, the timestamp is the number of microseconds past a well-defined point in time. In some embodiments, the tie breaker is computed as a function of the physical machine running the blobmaster as well as a process id. In some embodiments, the tie breaker includes an instance identifier, either alone, or in conjunction with other characteristics at the instance. In some embodiments, the tie breaker 708 is stored as a tie breaker value 132. By combining the timestamp 706 and a tie breaker 708, the sequence identifier is both globally unique and at least approximately the order in which the deltas were created. In certain circumstances, clocks at different instances may be slightly different, so the order defined by the sequence identifiers may not correspond to the "actual" order of events. However, in some embodiments, the "order," by definition, is the order created by the sequence identifiers. This is the order the changes will be applied at all instances.

A change to metadata at one instance is replicated to other instances. The actual change to the base value 712 may be stored in various formats. In some embodiments, data structures similar to those in FIGS. 18A-18E are used to store the changes, but the structures are modified so that most of the fields are optional. Only the actual changes are filled in, so the space required to store or transmit the delta is small. In other embodiments, the changes are stored as key/value pairs, where the key uniquely identifies the data element changed, and the value is the new value for the data element.

In some embodiments where the data items are metadata for blobs, deltas may include information about forwarding. Because blobs may be dynamically replicated between instances at any time, and the metadata may be modified at any time as well, there are times that a new copy of a blob does not initially have all of the associated metadata. In these cases, the source of the new copy maintains a "forwarding address," and transmits deltas to the instance that has the new copy of the blob for a certain period of time (e.g., for a certain range of sequence identifiers).

Figure 8:
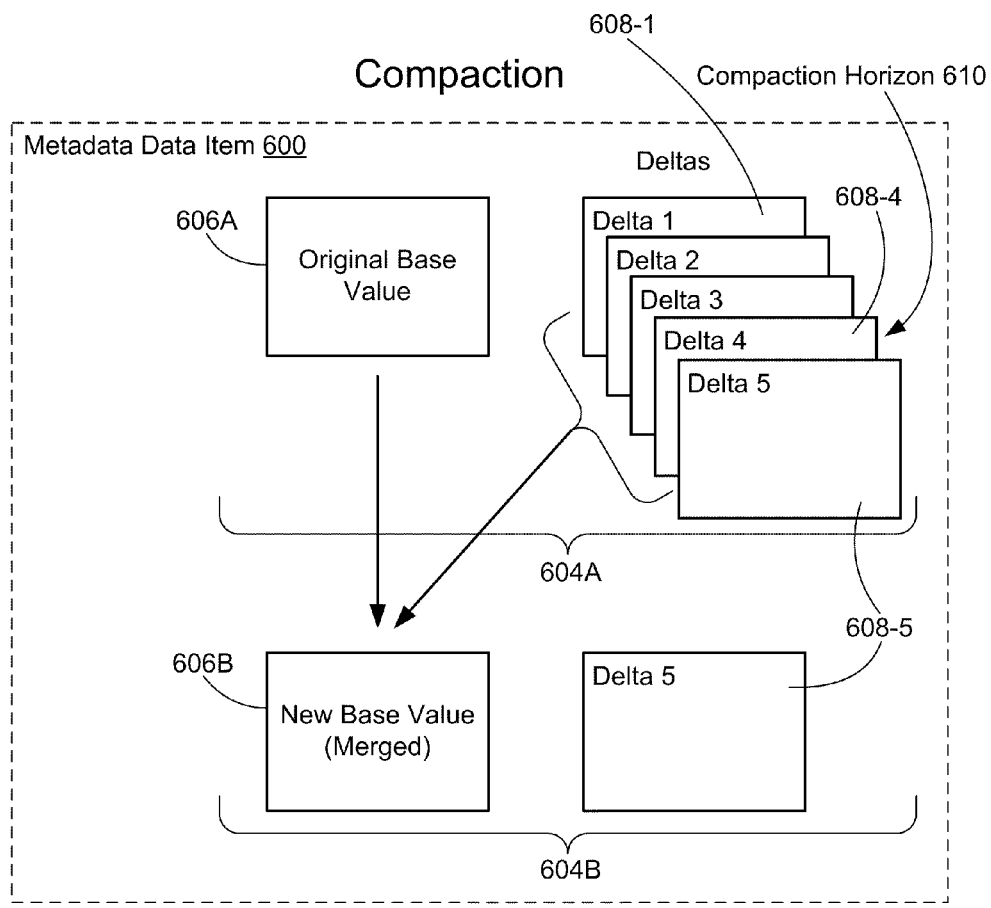
FIG. 8 illustrates an exemplary compaction process according to some embodiments.

FIG. 8 illustrates a compaction process that reduces the number of deltas. If compaction were not performed, the number of deltas would grow without limit, taking up storage space and slowing down performance for reading data. The idea is to apply the deltas to the base value, effectively merging the base values and the deltas into a single new base value. However, because of the existence of multiple copies of the same data at distinct instances, there are some constraints imposed on which deltas may be merged with the base value. In some embodiments, a compaction horizon is selected that specifies the upper limit on which deltas will be merged. In some embodiments, the compaction horizon is selected for a group of data items 600, although a compaction horizon could be selected for an individual data item 600.

Before the compaction process begins, each data item 600 is a row 604A with an original base value 606A, and a set of zero or more deltas 608-1, etc. For a data item 600 with zero deltas, there is nothing to compact. The data item 600 illustrated in FIG. 8 initially has five deltas 608-1 to 608-5. In the embodiment shown, the compaction horizon 610 is somewhere between the sequence identifier of delta 4 (608-4) and the sequence identifier of delta 5 (608-5). More specifically, FIG. 8 depicts an example in which the sequence identifier of delta 4 is less than or equal to the compaction horizon 610, and the compaction horizon is strictly less than the sequence identifier of delta 5. Delta 1 (608-1) through delta 4 (608-4) are applied to the base value 606A in sequence, to produce a new base value 606B that has been merged with the deltas. Delta 1 to delta 4 are then deleted from original row 604A, leaving the new row 604B with the merged base value 606B and a set with the single delta 608-5. If the compaction horizon had included delta 608-5, the new row 604B would not have included any deltas.

The compaction process is also described below in FIGS. 12A-12B, and 17. In particular, the discussion of FIGS. 12A and 12B includes examples of why the compaction horizon may not include all of the deltas at an instance (as illustrated in FIG. 8). Although shown here in the context of a single data item 600, compaction is generally a batch process because of the very large quantities of data and the fact that deltas are generally transmitted between instances in batches.

Figure 9:
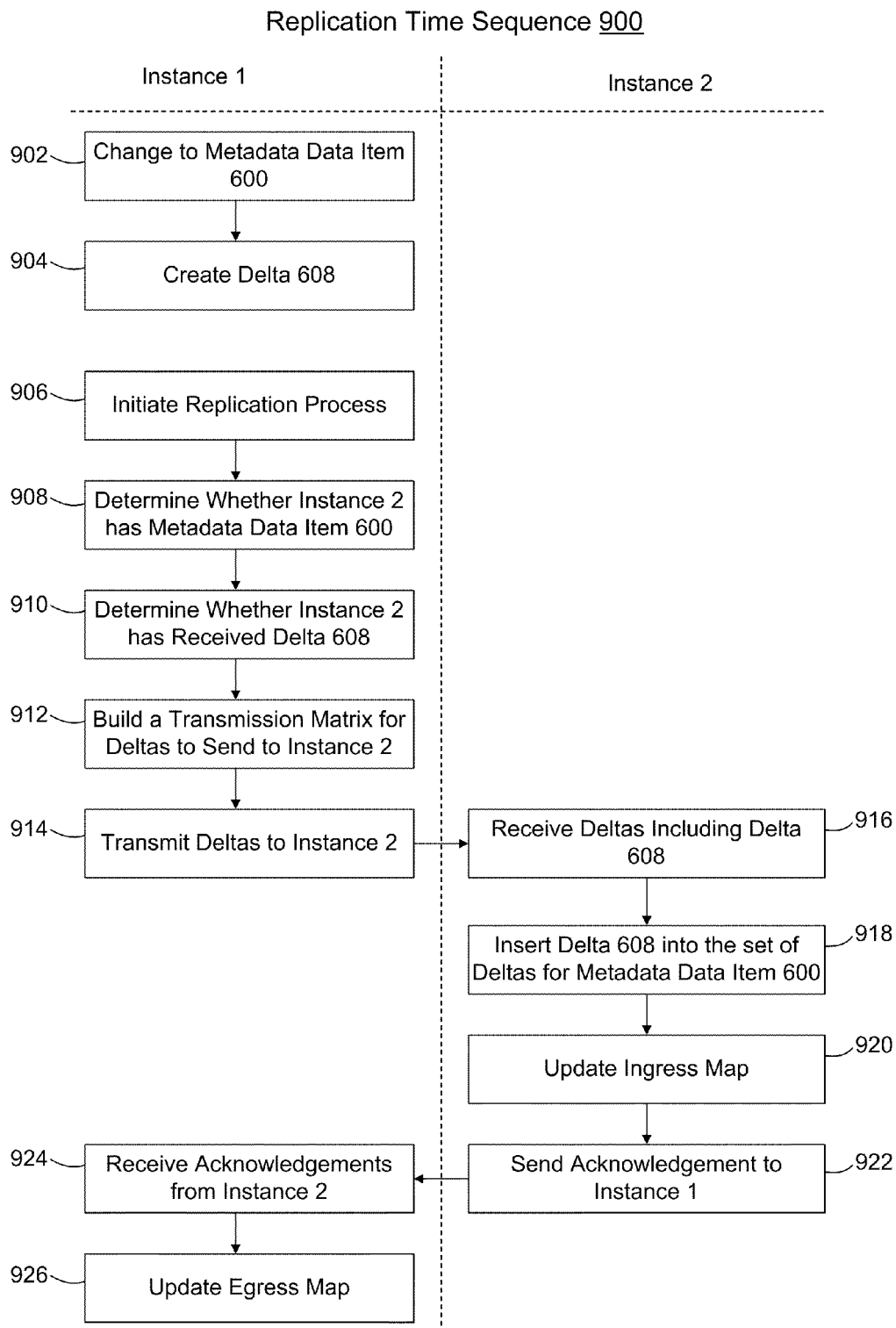
FIG. 9 illustrates a sequence of events in the replication process according to some embodiments.

FIG. 9 illustrates an exemplary process for replicating metadata from one instance to another instance. Although the simple illustration in FIG. 9 shows only a single metadata data item 600 and a single delta 608, the method is generally applied to much larger batches as illustrated below with respect to FIGS. 15A-15B.

The replication process described here applies to existing copies of data at multiple instances. When metadata at one instance changes, the changes must be replicated to all other instances that have metadata for the same underlying data. Co-pending application U.S. patent application Ser. No. 12/703,167, "Method and System for Efficiently Replicating Data in Non-Relational Databases," filed Feb. 9, 2010, describes a different replication process, where a new copy of data is replicated to a new instance. In this latter instance, a complete copy of the metadata must be sent to the new instance, and any recent changes to the metadata must get to the new instance as well.

The replication process effectively begins when a change to metadata occurs (902) at one instance that will require replication to other instances. When the change (also known as a mutation) occurs, a delta is created (904) to specify the change. An exemplary format is illustrated in FIG. 7 and described above. In principle, the delta could be replicated immediately, but deltas are generally transmitted in batches as more fully illustrated in the exemplary processes shown in FIGS. 15A-15B.

At some point, the replication process is initiated (906). In some embodiments, replication can be initiated manually. In other embodiments, replication is a scheduled background process (e.g., triggered at certain time intervals, certain times of the day, or when the workload is low). In some embodiments, replication runs continuously in the background. In some embodiments, every instance has metadata for each of the blobs, regardless of whether the blobs are physically stored at the instance. In other embodiments, there are a limited number of global instances that maintain metadata for all of the blobs, and a greater number of local instances that maintain metadata only for the blobs stored at the instance. For replication targets that are local instances, the replication process determines (908) whether the metadata item 600 resides at the replication target. In some embodiments, the replication process determines all instances that require the changed metadata.

Figure 15A:
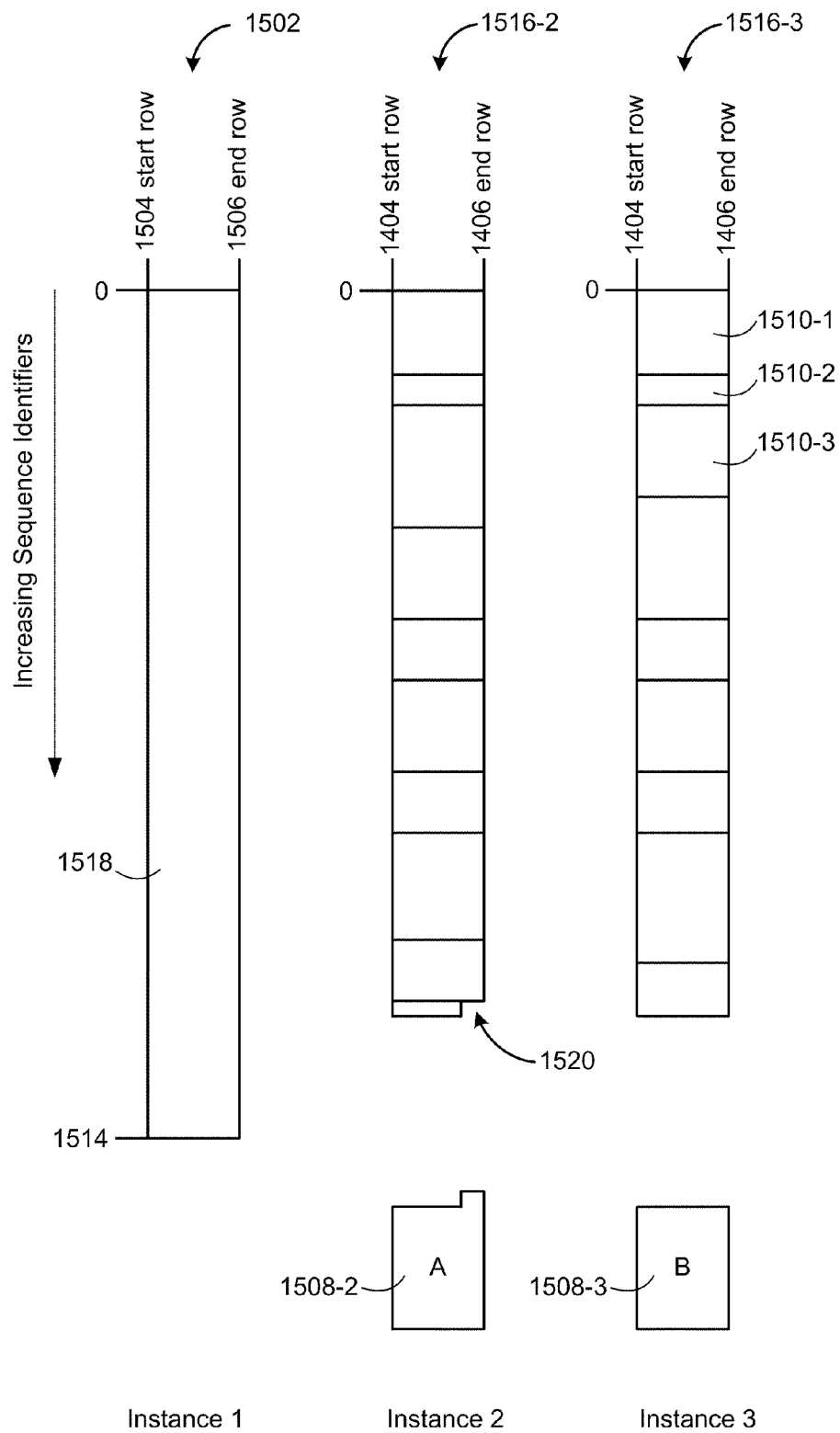
FIGS. 15A-15B illustrate a process of developing a transmission plan for sending database changes to other instances according to some embodiments.
Figure 15B:
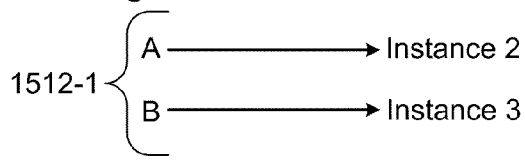
Figure 15B:
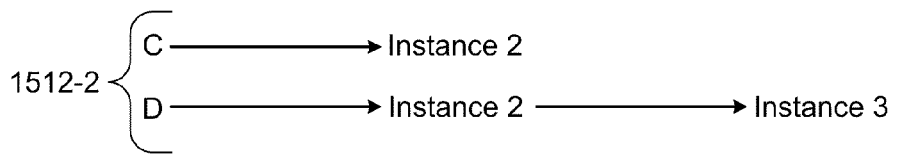
Figure 15B:
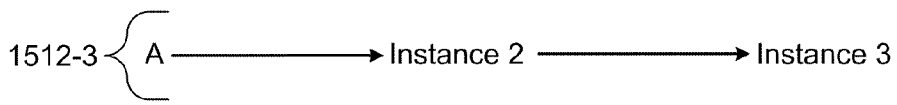
Figure 15B:
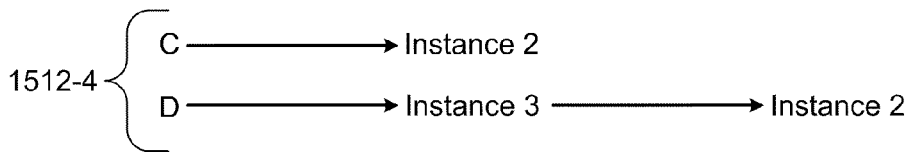

For the target instances that have the metadata data item 600, the replication process determines (910) whether the target instance has received delta 608. In some embodiments, this determination uses an egress map 134, as shown in FIGS. 14A and 14B and described in more detail in FIGS. 15A-15B. Based on the deltas to send, and which deltas have already been received at each target instance, the replication process builds (912) a transmission matrix that specifies a group of deltas to transmit to each target instance. In some embodiments, the transmission matrix is a two-dimensional shape (e.g., a rectangle) as illustrated in FIGS. 15A-15B. In other embodiments, the transmission matrix is a list or one-dimensional array. The replication process then transmits (914) the selected deltas to each target instance.

At a target instance, the deltas are received (916) and each delta is inserted (918) into the set of deltas for the corresponding metadata data item 600. In some embodiments, the replication process updates (920) an ingress map 136 to indicate that the delta (or batch of deltas) has been incorporated into the metadata at the target instance. The replication process at the target instance also sends an acknowledgement back to the sender to indicate that the deltas have been received and incorporated.

The original sender of the deltas receives (924) the acknowledgement from the target instance, and updates (926) an egress map 134. By updating the egress map, the same deltas will not be transmitted to the same target again in the future. The updated egress map also enables compaction of deltas, as explained in more detail with respect to FIGS. 12A and 12B.

Figure 10:
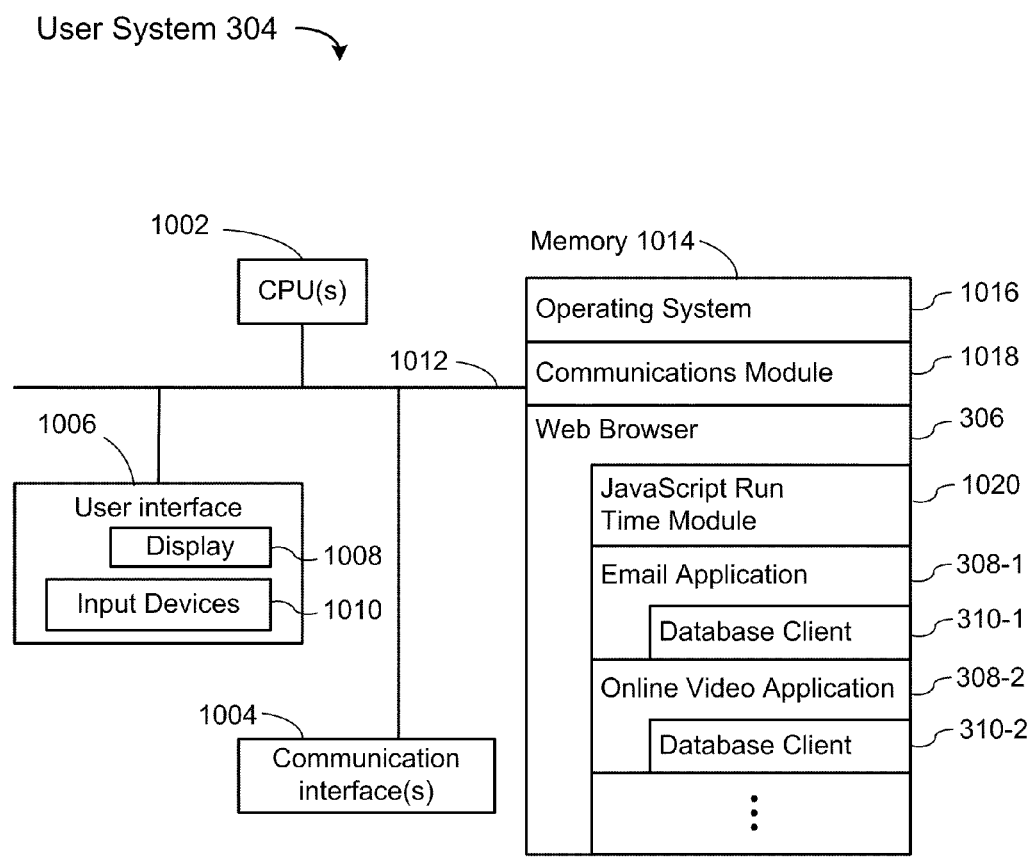
FIG. 10 is a block diagram that illustrates a client computer according to some embodiments.

FIG. 10 is a block diagram illustrating a client computer system 304 that is used by a user 302 to access data stored at an instance 102 in accordance with some embodiments of the present invention. A client computer system 304 typically includes one or more processing units (CPU's) 1002 for executing modules, programs and/or instructions stored in memory 1014 and thereby performing processing operations; one or more network or other communications interfaces 1004; memory 1014; and one or more communication buses 1012 for interconnecting these components. The communication buses 1012 may include circuitry (sometimes called a chipset) that interconnects and controls communications between system components. A client computer system 304 includes a user interface 1006 comprising a display device 1008 and one or more input devices 1010 (e.g., a keyboard and a mouse or other pointing device). In some embodiments, memory 1014 includes high-speed random access memory, such as DRAM, SRAM, DDR RAM or other random access solid state memory devices. In some embodiments, memory 1014 includes non-volatile memory, such as one or more magnetic disk storage devices, optical disk storage devices, flash memory devices, or other non-volatile solid state storage devices. Optionally, memory 1014 includes one or more storage devices remotely located from the CPU(s) 1002. Memory 1014, or alternately the non-volatile memory device(s) within memory 1014, comprises a computer readable storage medium. In some embodiments, memory 1014 or the computer readable storage medium of memory 1014 stores the following programs, modules and data structures, or a subset thereof:

- an operating system 1016 that includes procedures for handling various basic system services and for performing hardware dependent tasks;
- a communications module 1018 that is used for connecting the client computer system 304 to other computers via the one or more communication network interfaces 1004 (wired or wireless) and one or more communication networks 328, such as the Internet, other wide area networks, local area networks, metropolitan area networks, and so on; and
- a web browser 306 (or other client application) that enables a user to communicate over a network 328 (such as the Internet) with remote computers. In some embodiments, the web browser 306 uses a JavaScript run-time module 1020 to perform some functions.
- one or more user applications 308 that provide specific functionality. For example, user applications 308 may include an email application 308-1 and/or an online video application 308-2.
- one or more database clients, such as email database client 310-1 or video database client 310-2, that provide an API for the data stored at instances 102 to user applications 308.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1014 may store a subset of the modules and data structures identified above. Furthermore, memory 1014 may store additional modules or data structures not described above.

Although FIG. 10 shows a client computer system 304 that may access data stored at an instance 102, FIG. 10 is intended more as functional description of the various features which may be present in a set of one or more computers rather than as a structural schematic of the embodiments described herein. In practice, and as recognized by those of ordinary skill in the art, items shown separately could be combined and some items could be separated.

Figure 11A:
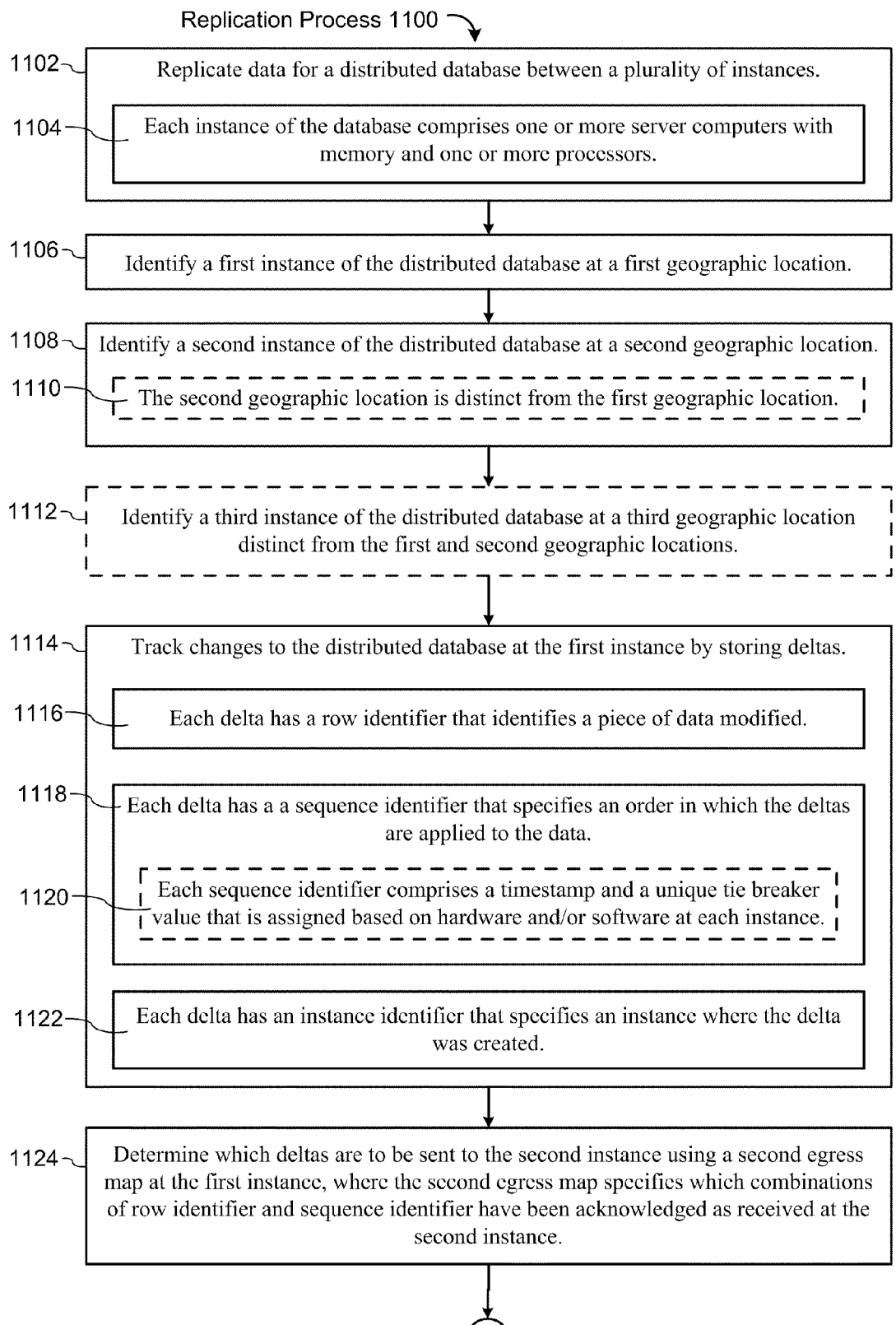
FIGS. 11A-11C illustrate a method of replicating distributed data according to some embodiments.
Figure 11B:
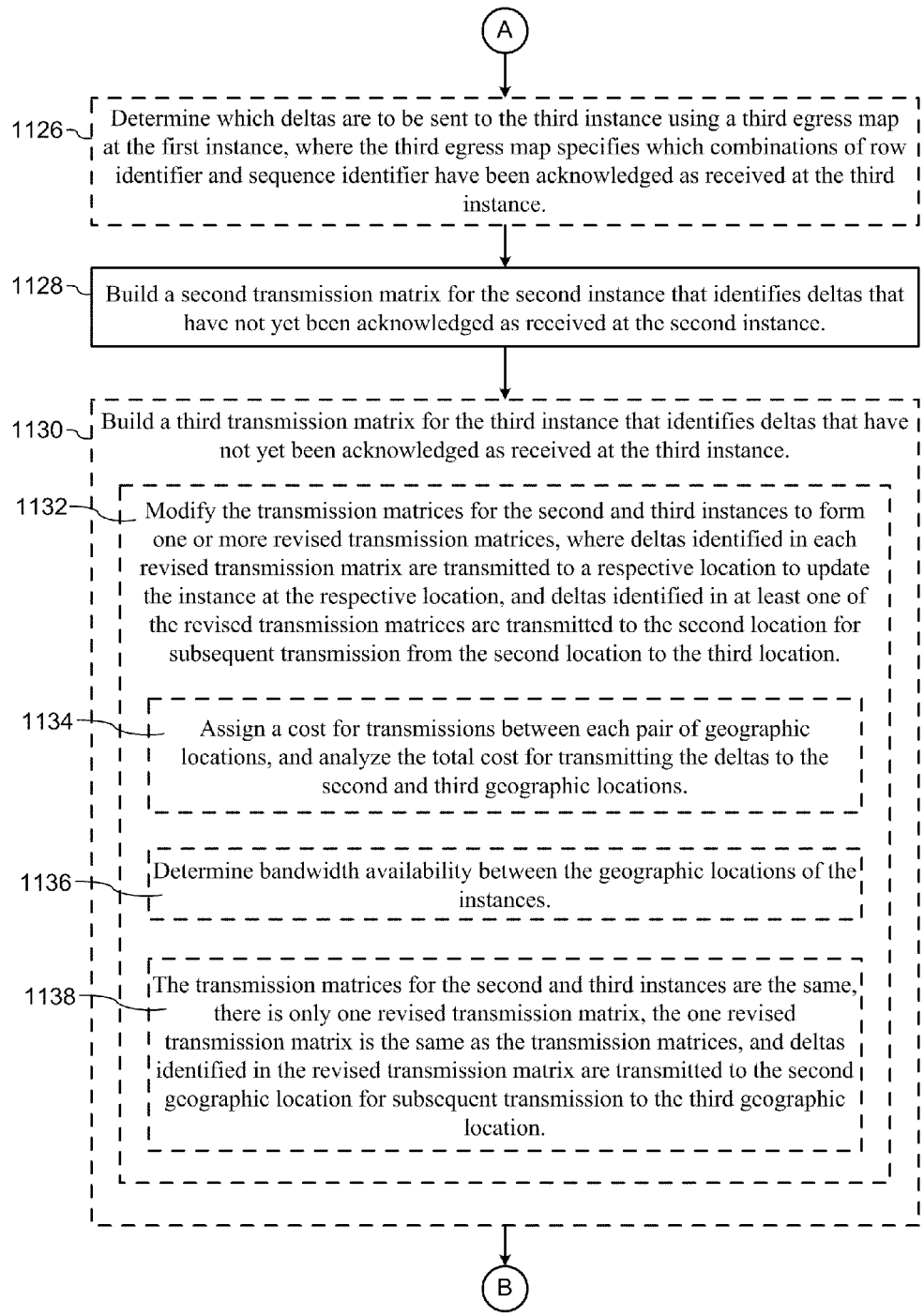
Figure 11C:
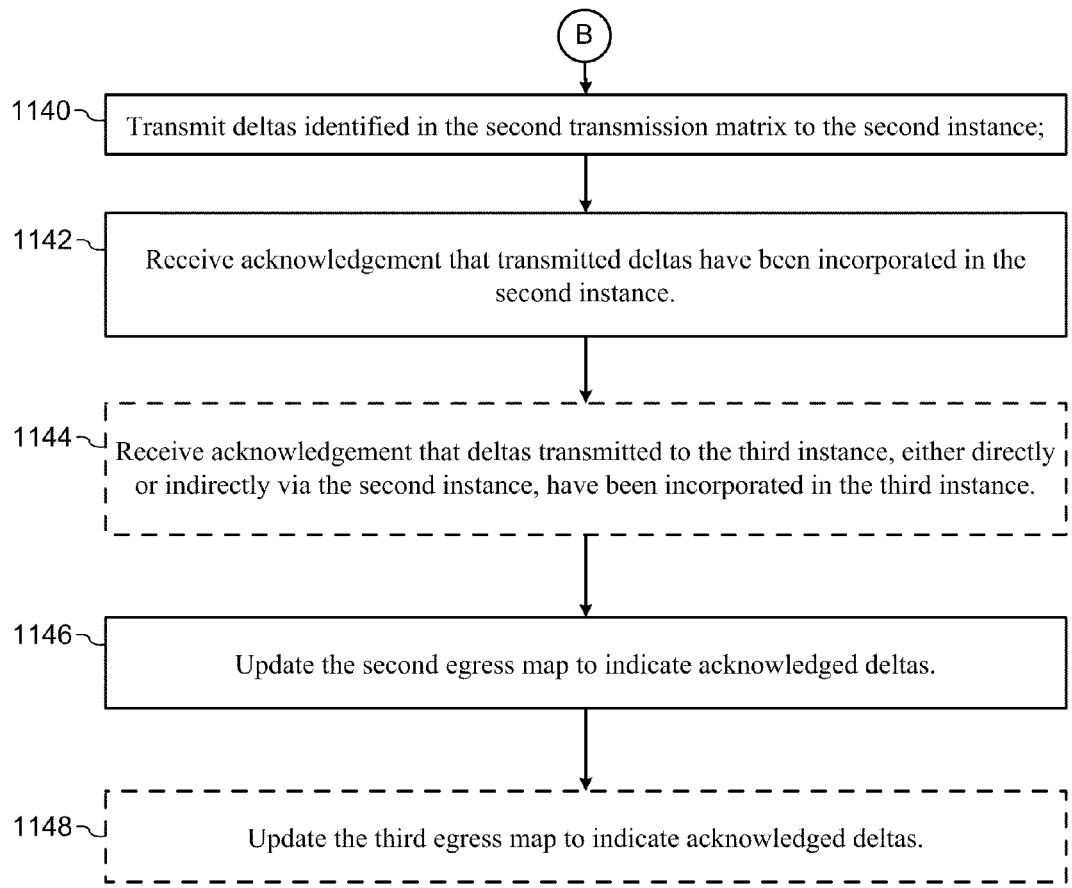

FIGS. 11A-11C provide a flowchart of an exemplary process 1100 for replicating (1102) data between a plurality of instances of a distributed database. In one embodiment, the distributed database holds metadata for a distributed storage system. In some embodiments, each instance of the distributed database is stored on one or more server computers, each having memory and one or more processors (1104).

The replication process 1100 identifies (1106) a first instance of the database at a first geographic location and identifies (1108) a second instance of the database at a second geographic location. In some embodiments, the second geographic location is distinct from the first location (1110). In some embodiments, a third instance of the database is identified (1112) at a third geographic location, which is distinct from the first and second geographic locations. In some embodiments, there are four or more instances of the database. In some embodiments, two or more instances of the database reside at the same geographic location. One reason for having multiple instances at the same geographic site is to provide for maintenance zones. In some embodiments, a single data center has multiple maintenance zones, and each such zone comprises an instance in the distributed database system. In some embodiments, when an instance is going to be taken down for maintenance, the data is replicated to one or more other instances beforehand, which may be other instances at the same data center.

For example, there may be single instances of the database in Atlanta, Seattle, and Los Angeles, and two instances of the database in Boston. In some embodiments, there are instances of the database on every continent except Antarctica, and even some instances on islands. The disclosed distributed storage system imposes no limit on the number or location of instances.

To facilitate efficient replication, changes to the distributed database are tracked as deltas (1114). Each delta has a row identifier that identifies the piece of data modified (1116). Each delta also has a sequence identifier that specifies the order in which the deltas are applied to the data (1118). The sequence identifiers are globally unique throughout the distributed storage system, so there is no ambiguity about the order in which the deltas are applied to the data. In some embodiments, the sequence identifier comprises (1120) a timestamp and a unique tie breaker value that is assigned based on hardware and/or software at each instance. In some embodiments, the timestamp specifies the number of microseconds after a designated point of time in the past. In some embodiments, the tie breaker value is computed based on one or more of the following values: an identifier of a physical machine at the instance, such as a unique serial number or a network interface card (NIC) address; an instance identifier; a process id of a specific process running at the instance (e.g., a UNIX process ID assigned to the database process). Because the tie-breaker is a unique value assigned to each instance, the combination of a timestamp and the tie breaker provides a sequence identifier based on time, but guaranteed to be unique.

The time clocks at each instance are not guaranteed to be synchronized to the microsecond and thus the ordering defined by the sequence identifiers is not guaranteed to match exactly what happened. However, if two changes to the same metadata item 600 occur about the same time at two distant locations on the globe (e.g., Los Angeles and Paris), the exact order is unimportant. Having a well-defined unique order that will be applied to every instance of the database is the more relevant issue, and this is provided by sequence identifiers. Moreover, in embodiments that use a timestamp or something similar to create the sequence identifiers, the sequence identifiers are in the right time sequence order virtually all of the time because multiple changes to the same metadata rarely occur at the same time at two distinct instances.

Each delta includes an instance identifier (1122) as well. Each instance is responsible for pushing out its changes (i.e., deltas) to all of the other instances, so each instance must be able to recognize the deltas that it created. In some embodiments, the instance identifier is saved as part of the data structure for each individual delta. In other embodiments, the association between deltas and instances is stored differently. For example, deltas may include a bit flag that indicates which deltas were created at the current instance. In other embodiments, the instance identifier is not stored as a separate data element because it is stored as part of the sequence identifier, or can be readily derived from the sequence identifier.

The replication process 1100 determines (1124) which deltas are to be sent to the second instance using a second egress map 134 at the first instance, where the second egress map specifies which combinations of row identifier and sequence identifier have been acknowledged as received at the second instance. An egress map 134 can be stored in a variety of ways, as illustrated in FIGS. 14A and 14B. FIG. 14B illustrates a map that might be used if the egress map were stored in a typical database. In this example, each row represents a single delta that is to be transmitted to a single destination. The destination instance 1412 specifies to what instance the delta has been (or will be) sent. The row identifier 1414 and sequence identifier 1416 specify the row identifier and sequence identifier of a delta. In some embodiments, presence of a row in this egress table indicates that the delta has been acknowledged as received at the destination instance. In other embodiments, there is an additional field, such as "acknowledged," which is updated when the deltas are acknowledged. In these embodiments, rows may be inserted into the egress table as soon as deltas are created, or prior to transmission of the deltas to destination instances. In some embodiments, there is a separate egress table for each destination instance, so the rows in each egress table do not need to specify a destination instance.

Although the egress table in FIG. 14B is conceptually simple, it consumes considerable resources, both in time and disk space. In some embodiments, a structure similar to the one shown in FIG. 14A may be used. In the egress table 134 shown in FIG. 14A, each record specifies a two dimensional rectangle of deltas. In one dimension, the start row 1404 and end row 1406 specify the beginning and ending of a range of row identifiers. In a second dimension, the start sequence 1408 and end sequence 1410 specify the beginning and ending of a range of sequence identifiers. Although this two dimensional region could theoretically contain a very large number of deltas, this two dimensional region is actually sparse for three reasons. First, within the continuous range of row identifiers, few of the rows will actually have any changes. Second, very few of the potential sequence identifiers within the range are actually used. For example, an exemplary timestamp used to form sequence identifiers uses microseconds, but there are not changes to metadata occurring every microsecond. Third, each sequence identifier that is used applies to a single delta, and that single delta applies to a unique row of data.

In some embodiments that use egress maps similar to the one depicted in FIG. 14A, there is no overlap between distinct rows in the table. In these embodiments, each delta corresponds to a unique record in the egress table for each destination instance. In other embodiments, overlapping rectangles are allowed. Even when the same delta is transmitted to another instance multiple times, it will only be inserted one time, so multiple acknowledgements for the same delta do not indicate an error condition.

In some embodiments, there is a separate egress table for each destination instance, so the rows in each egress table do not need to specify a destination instance. The usage of egress tables is described in more detail below with respect to FIGS. 15A-15B.

Attention is directed back to the replication process 1100, which continues in FIG. 11B. In some embodiments, the replication process 1100 determines (1126) which deltas are to be sent to the third instance using a third egress map at the first instance, where the third egress map specifies which combinations of row identifier and sequence identifier have been acknowledged as received at the third instance. This process is analogous to the process used to determine which deltas to send to the second instance.

The use of "second" in "second egress map" and "third" within "third egress map" are solely to identify a specific egress map, and do not imply or suggest the existence of a first egress map. This same use of "second" and "third" appears below with respect to transmission matrices as well.

The replication process 1100 builds (1128) a second transmission matrix for the second instance that identifies deltas that have not yet been acknowledged as received at the second instance. In some embodiments, the replication process 1100 selects a range of row identifiers, and manages all deltas that correspond to rows with row identifiers within the specified range, regardless of sequence identifier. The selection without regard to sequence identifier is equivalent to selecting a range of sequence identifiers from 0 (or the lowest value) to the highest sequence identifier currently in use. This is a two dimensional rectangle that contains all possible deltas for the rows contained in the rectangle. Because this large rectangle contains all possible deltas of interest, and the egress map 134 indicates which deltas have already been transmitted to the second instance and acknowledged, the difference (i.e., the set-theoretic difference) identifies the set to send to the second instance. This process is described in more detail with respect to FIGS. 15A-15B below.

In some embodiments, the transmission matrix is built using information from the egress map about what deltas have been acknowledged as received by the second instance. In this case, it is possible (and sometimes desirable) to re-send deltas that have already been transmitted to the second instance. In some cases resending is useful because there was a failure at some point in the previous attempt (e.g., the transmission did not reach the destination, the destination was down and therefore could not receive the transmission, there was a failure at the destination in the middle of processing the deltas, or an acknowledgement was sent back but never received at the first instance). Even if a previous transmission was fully or partially incorporated into the destination instance, re-sending the deltas does not create a problem because only the missing deltas will be inserted. When the re-sent transmission is complete, an acknowledgement will be sent to the first instance for the entire batch of deltas, potentially including some deltas that were already incorporated into the second instance but not yet acknowledged.

In some embodiments, the replication process builds (1130) a third transmission matrix for the third instance that identifies deltas that have not yet been acknowledged as received at the third instance. This process is analogous to building (1128) the second transmission matrix as described above.

Figure 16:
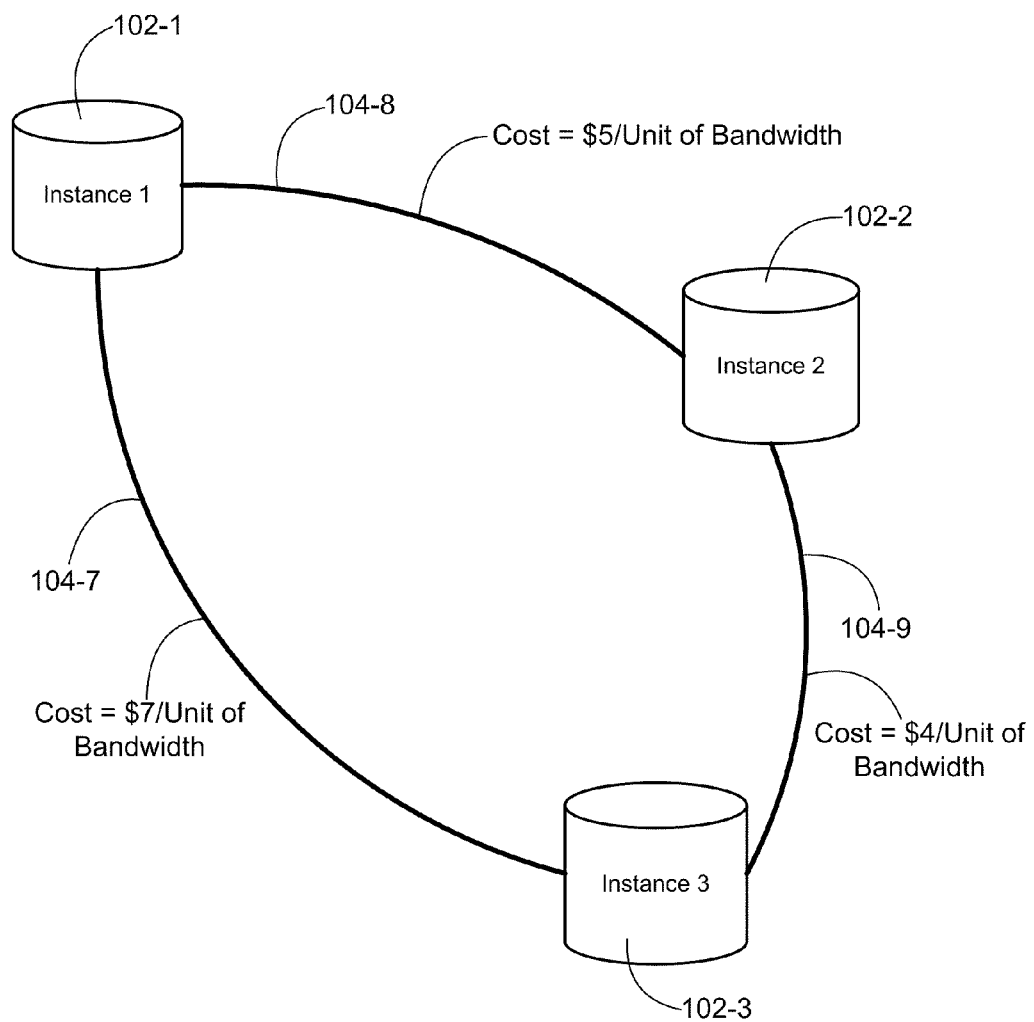
FIG. 16 provides an example of evaluating the cost of various transmission plans according to some embodiments.

Once transmission matrices have been created for multiple instances, the transmission matrices and their destinations can be modified in several ways to better utilize resources. In this context, network bandwidth is one important resource that is both limited and costly. One simple example is illustrated in FIG. 16. In this example, suppose the transmission matrices to the second and third instances are the same, and suppose the deltas corresponding to these transmission matrices use one unit of bandwidth. The total cost would be $5+$7=$12 if the deltas were transmitted directly to the second and third instances using network links 104-8 and 104-7. However, if the deltas were transmitted to Instance 2 using network link 104-8, and then on to Instance 3 using network link 104-9, the total cost would be only $5+$4=$9. In general, other factors would be considered, including the availability of the network bandwidth, the reliability of the network links, processing power at each of the instances, etc.

The previous example was based on the assumption that the same transmission matrices applied to both the second and third instances. Although this is commonly true, they may be different. However, even when they are different, the difference is often small, so modifying the transmission matrices may produce new ones that are more efficient, as explained in more detail with respect to FIGS. 15A-15B below.

In some embodiments, the replication process 1100 modifies (1132) the transmission matrices for the second and third instances to form one or more revised transmission matrices. The deltas identified in each revised transmission matrix are transmitted (1132) to a respective location to update the instance at the respective location, and deltas identified in at least one of the revised transmission matrices are transmitted to the second location for subsequent transmission from the second location to the third location. In some embodiments, the modification of the transmission matrices is based on analysis of the total cost for transmitting the deltas to the second and third geographic locations (1134), and includes assigning (1134) a cost for transmissions between each pair of geographic locations. In some embodiments, the modification to the transmission matrices includes determining (1136) bandwidth availability between the geographic locations of the instances. In some circumstances, the transmission matrices for the second and third instances are the same. Sometimes when this occurs, there is only one revised transmission matrix, which is the same as the transmission matrices, and deltas identified in the revised transmission matrix are transmitted to the second geographic location for subsequent transmission to the third geographic location (1138). However, having two (or more) transmission matrices that are the same does not necessarily lead to revising the transmission matrices, or sending the deltas to one instance for subsequent forwarding to another instance. For example, if the cost of network link 104-9 in FIG. 16 were $10/Unit of Bandwidth instead of $4/Unit as depicted in the figure, then it would be more cost effective to transmit the deltas to instance 2 and instance 3 directly.

The replication process 1100 transmits (1140) deltas identified in the second transmission matrix to the second instance. If the process does not fail, the first instance ultimately receives (1142) acknowledgement that transmitted deltas have been incorporated in the second instance. The replication process updates (1146) the second egress map to indicate the acknowledged deltas. In some embodiments, the first instance receives (1144) acknowledgement that deltas transmitted to the third instance, either directly or indirectly via the second instance, have been incorporated into the third instance. When the first instance receives (1144) acknowledgement regarding deltas transmitted to the third instance, the replication process updates (1148) the third egress map to indicate acknowledged deltas.

Figure 12A:
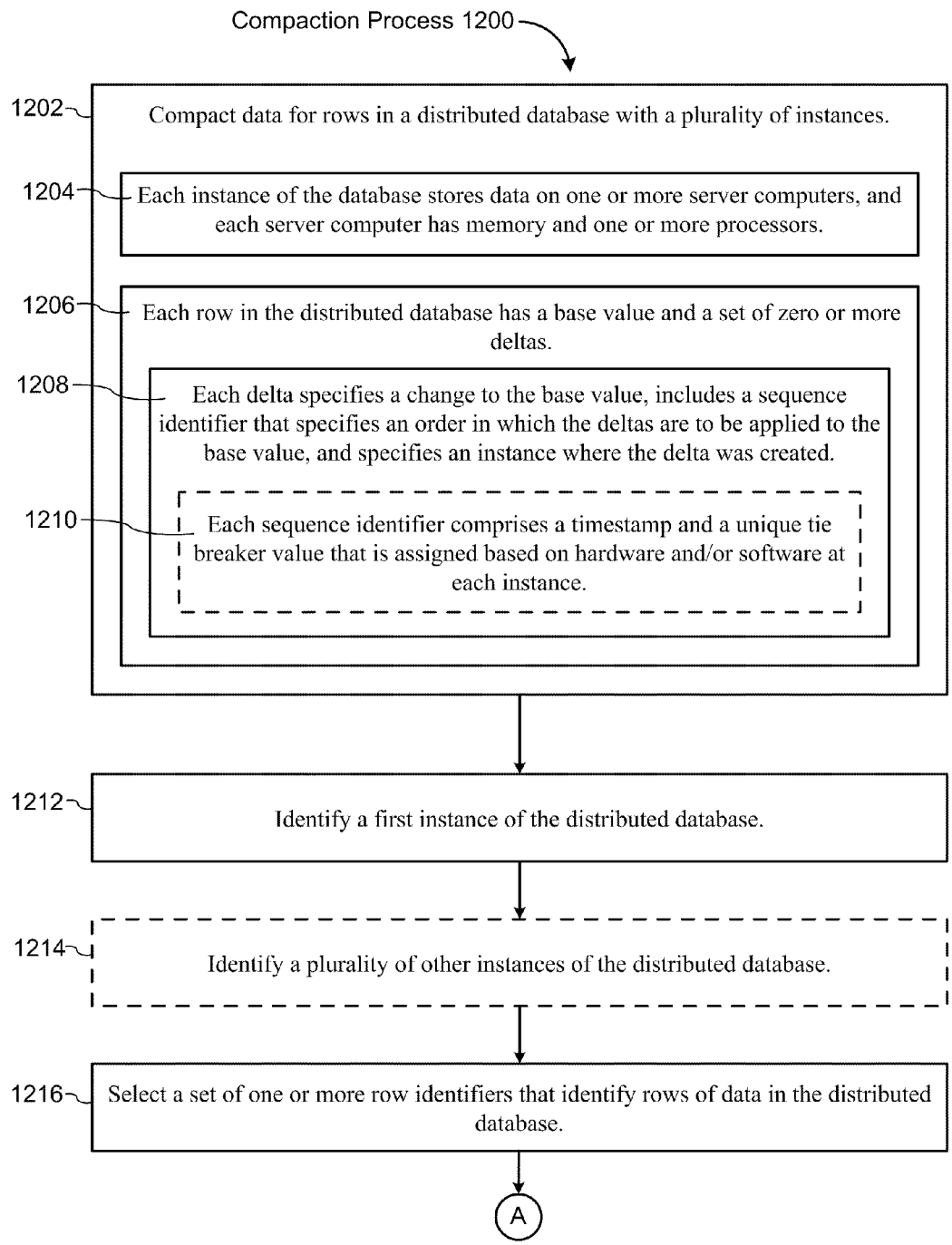
FIGS. 12A-12B illustrate a method of compacting data in a distributed database according to some embodiments.
Figure 12B:
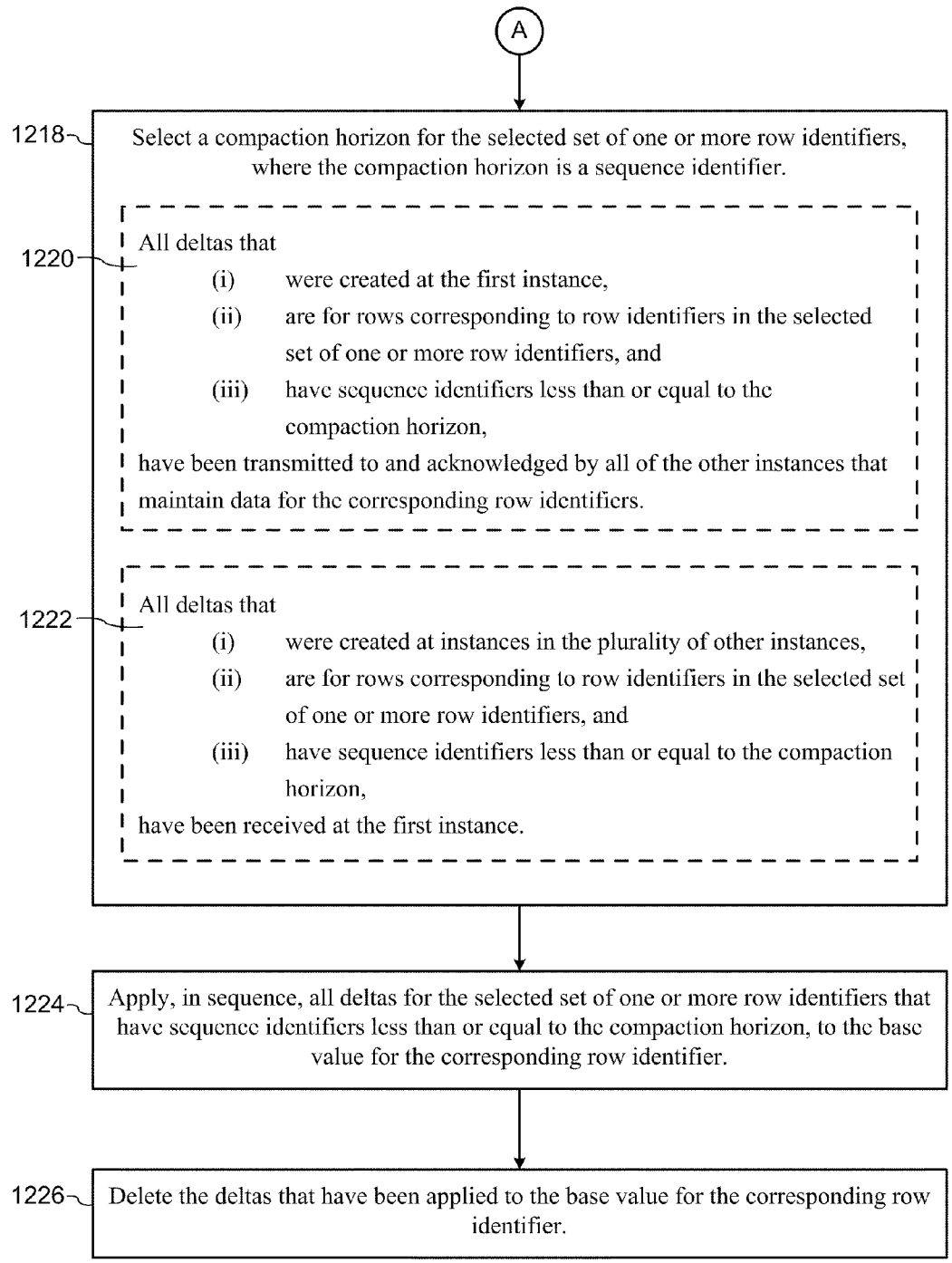

FIGS. 12A and 12B illustrate an exemplary compaction process 1200 that compacts (1202) data for rows in a distributed database with a plurality of instances. Each instance of the database stores (1204) data on one or more server computers, and each server computer has (1204) memory and one or more processors. Each row in the distributed database has (1206) a base value and a set of zero or more deltas as illustrated in FIG. 6. Each delta specifies (1208) a change to the base value, includes a sequence identifier that specifies (1208) the order in which the deltas are to be applied to the base value, and specifies (1208) the instance where the delta was created. In some embodiments, each sequence identifier comprises (1210) a timestamp and a unique tie breaker value that is assigned based on hardware and/or software at each instance.

The compaction process 1200 identifies (1212) a first instance of the distributed database. Compaction will occur at this instance. In some embodiments, the compaction process 1200 identifies (1214) a plurality of other instances of the distributed database. In some embodiments, one or more of the other instances are at other geographic locations distinct from the geographic location of the first instance. The compaction process 1200 selects (1216) a set of one or more row identifiers that identify rows of data in the distributed database. In some embodiments, the set of rows comprises a contiguous range of TOWS.

The compaction process 1200 selects (1218) a compaction horizon for the selected set of one or more row identifiers. In some embodiments, the compaction horizon is a sequence identifier of a delta for a row corresponding to a row identifier in the selected set. The compaction horizon has the same data format as sequence identifiers so that sequence identifiers can be compared to the compaction horizon. I.e., each sequence identifier is either less than the compaction horizon, equal to the compaction horizon, or greater than the compaction horizon. The compaction horizon need not be equal to any of the sequence identifiers that are assigned to deltas.

In some embodiments, the compaction horizon must satisfy one or more criteria. In some embodiments, deltas at the first instance with corresponding sequence identifiers less than or equal to the compaction horizon must have been transmitted to all other appropriate instances (1220): specifically, all deltas that (i) were created at the first instance, (ii) are for rows corresponding to row identifiers in the selected set of one or more row identifiers, and (iii) have sequence identifiers less than or equal to the compaction horizon, have been transmitted to and acknowledged by all of the other instances that maintain data for the corresponding row identifiers (1220). In some embodiments, the transmission of deltas to other instances is verified using one or more egress maps (which are described above with respect to the replication process 1100). In some embodiments, the first instance must have received all deltas from other instances that are relevant to the selected set of rows and have sequence identifiers less than or equal to the compaction horizon (1222): specifically, all deltas that (i) were created at instances in the plurality of other instances, (ii) are for rows corresponding to row identifiers in the selected set of one or more row identifiers, and (iii) have sequence identifiers less than or equal to the compaction horizon, have been received at the first instance (1222). In some embodiments, receipt of deltas from other instances is verified using one or more ingress maps (which are described in more detail below with respect to FIGS. 14C and 14D). The selection of a compaction horizon is also described in more detail below with respect to FIG. 17.

After the compaction horizon is selected, the compaction process applies (1224), in sequence, all deltas for the selected set of one or more row identifiers that have sequence identifiers less than or equal to the compaction horizon, to the base value for the corresponding row identifier. This is shown graphically in FIG. 8, where data item 600 has original base value 606A and set of deltas 608-1 to 608-5. In the example of FIG. 8, the sequence identifiers for the first four deltas are less than or equal to the compaction horizon, but the fifth delta 608-5 has a sequence identifier greater than the compaction horizon. The compaction process applies (or merges) the deltas with the original base value 606A to create a new base value 606B. The compaction process also deletes (1226) the deltas that have been applied to the base value. In the example in FIG. 8, the first four deltas have been deleted, leaving only the fifth delta 608-5 (which was greater than the compaction horizon).

Figure 13:
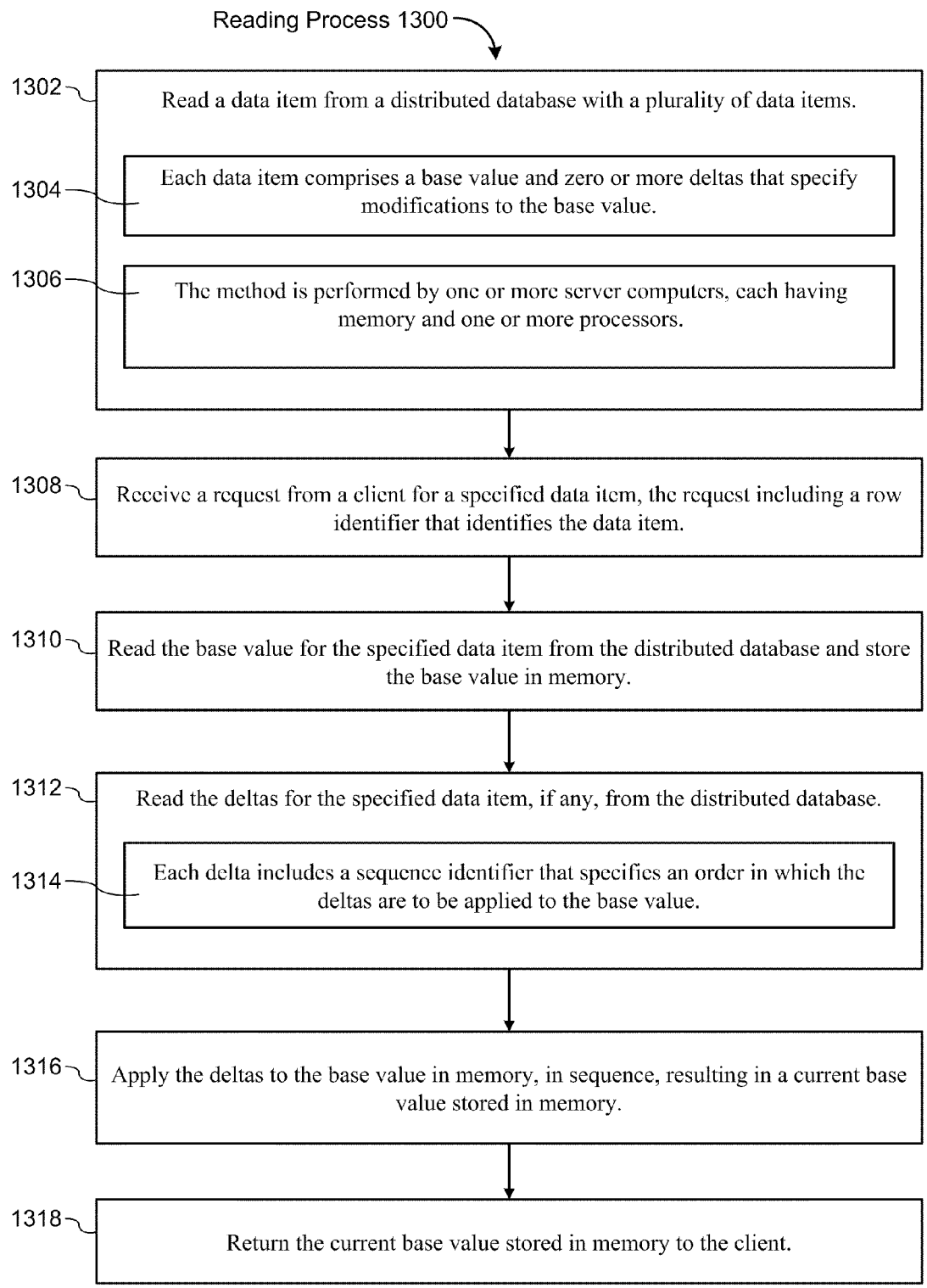
FIG. 13 illustrates a method of reading a piece of data from a distributed database according to some embodiments.

FIG. 13 illustrates an exemplary process 1300 for reading (1302) a data item from a distributed database with a plurality of data rows. Each row comprises (1304) a base value and zero or more deltas that specify modifications to the base value. This is illustrated in FIG. 6. The reading process is performed (1306) by one or more server computers, each having memory and one or more processors.

The reading process 1300 receives (1308) a request from a client for a specified data item 600. The request includes (1308) a row identifier that identifies the data item 600. The process 1300 reads (1310) the base value 606 for the specified data item from the distributed database, and stores (1310) the base value in memory. The process 1300 also reads (1312) the deltas 608-1 to 608-L for the specified data item, if any, from the distributed database. Each delta includes (1314) a sequence identifier 704 that specifies the order in which the deltas are to be applied to the base value. Typically there are no deltas at all for any individual data item 600, so the value for the data item is just the base value 606.

The process 1300 applies (1316) the deltas 608 to the base value stored in memory, in sequence, resulting in a current base value stored in memory. Unlike compaction, the reading process does not change the based value 606 stored in the database. The current base value in memory is distinct from the base value 606 in the database. When there are no deltas for a data item, there is no work to perform in applying the deltas. As used herein, the operation of "applying deltas to the base value" occurs even when there are no deltas. The process returns (1318) the current base value stored in memory to the client.

Because the read process 1300 reads and applies all of the deltas, the reading time and disk space usage for the deltas will increase over time. Therefore, some embodiments utilize a compaction process 1200 as described above, which merges deltas into the corresponding base values, which reduces both disk space usage and the time required to read data items.

FIGS. 14C and 14D provide exemplary data structures for ingress maps 136. Ingress maps 136 identify deltas that have been received at an instance from other instances. The ingress map shown in FIG. 14D is a typical map for use in a database. Each record in the ingress map of FIG. 14D represents a single delta. The ingress map includes the source instance 1428, which specifies the original source of the delta. As described above with respect to replication, transmissions may be forwarded from one instance to another, so a delta need not be received from the instance where the delta was created. The ingress map tracks the original instance. Optionally, some embodiments also track the instance that transmitted the delta to the current instance.

The ingress map also includes a row identifier 1430, which specifies the row to which the delta applies, and a sequence identifier 1432, which is globally unique and specifies the order in which the deltas are to be applied. In general, an instance is not aware of deltas created at other instances until the deltas are received, so presence of a record in the ingress table indicates receipt of the delta. In alternative embodiments, the ingress table includes a field such as "received" to indicate that the delta has been received. For large scale distributed databases, the ingress map of FIG. 14D is inefficient both in its use of disk space and in the time required to insert a very large number of records. Therefore, in some embodiments, an ingress map has a data structure similar to the one illustrated in FIG. 14C.

The ingress map in FIG. 14C specifies two dimensional rectangles of deltas, so each individual record identifies a very large set of deltas. In one dimension, each record in the ingress map specifies a start row 1420 and an end row 1422, which specifies a contiguous range of row identifiers. In a second dimension, the ingress map in FIG. 14C specifies a start sequence 1424 and an end sequence 1426, which creates a contiguous range of sequence identifiers. In some embodiments, deltas are included in the sequence range if a delta has a sequence identifier greater than or equal to the start sequence and less than or equal to the end sequence. In other embodiments, there is a strict inequality on the upper end, so that deltas are included only when the sequence identifier is strictly less than the end sequence. (The strict inequality could also be placed on the lower end.) In these latter embodiments, the start sequence 1424 of one record is equal to the end sequence of the previous record. In still other embodiments, records in the ingress table do not specify a start sequence 1424, making the assumption that the starting sequence for one record is the end sequence of the previous record. In some embodiments, the ingress table includes an identifier of the source instance. In other embodiments, there is a separate ingress table for each other instance, so the source instance need not be saved in the table.

An ingress map may be used in the compaction process to identify which deltas have been received from other instances. In some embodiments, the sets of row identifiers used in transmissions and compaction are the same, and are contiguous ranges that are reused. See FIGS. 15A-15B and the associated discussion below. Because the same start row 1420 and end row 1422 are reused, the compaction process can read the ingress records for these start and end rows, and determine if there are any sequence gaps. This is illustrated in FIG. 17.

FIGS. 15A and 15B illustrate a process for developing a plan to transmit deltas to other instances in an efficient manner according to some embodiments. In these embodiments, a range of row identifiers is selected, beginning with transmission start row 1504 and ending with transmission end row 1506. In some embodiments, the transmission start row 1504 and end row 1506 match the start row 1404 and end row 1406 used in the egress maps 1516-2 and 1516-3. In addition to the selection of row identifiers, the process determines the highest sequence identifier 1514 that has been used for any deltas at the first instance. At this point, all deltas within the transmission rectangle 1518 should be sent to the other instances.

Because many of the deltas have already been transmitted to other instances (and acknowledged as received), the actual transmission matrices (also known as Shapes to Send) are much smaller. The egress maps 1516-2 and 1516-3 identify which deltas have already been transmitted and acknowledged, so the deltas in each egress map are "subtracted" from the transmission rectangle 1518 to create the transmission matrices 1508-2 and 1508-3 for each of the other instances. As illustrated in FIG. 15A, the egress map 1516-3 includes individual egress records 1510-1, 1510-2, 1510-3, etc., which jointly identify the deltas already sent to instance 3 and acknowledged. The egress records are stored in an egress table 134 such as the one illustrated in FIG. 14C. Subtracting the individual egress records 1510-1, etc. from transmission rectangle 1518 yields transmission matrix 1508-3.

The egress map 1516-2 to instance 2 is a little different in the illustration because there is a notch 1520 of deltas that have not been acknowledged as received at instance 2. This may occur, for example, when the start row 1504 and end row 1506 for the transmission do not match the start row 1404 and end row 1406 of records in the egress map. The transmission matrix 1508-2 for instance 2 is thus not a simple rectangle. The original transmission plan 1512-1 is thus to transmit matrix A 1508-2 to instance 2 and transmit matrix B 1508-3 to instance 3. In some instances, this transmission plan will be used. However, other transmission plans are contemplated, and the costs for each of the transmission plans are compared. In this context, "costs" come in many forms: the actual dollar cost for use of certain bandwidth, the opportunity cost for using bandwidth that could have been used for another process, the risk associated with network links (which could incur other costs to retransmit or resolve), the cost in time it takes to transmit deltas to other instances, etc.

To investigate other transmission plans, several set theoretic operations are performed on the transmission matrices A 1508-2 and B 1508-3. In some embodiments, difference A−B 1508-4 and difference B−A 1508-5 are computed. In the example illustrated in FIGS. 15A and 15B, A−B is a small transmission matrix C 1508-4, and B−A is the empty set 1508-5. In some embodiments, the intersection A∪B 1508-6 is computed, which in this case yields a large revised transmission matrix D. Transmission matrix C 1508-4 only needs to go to instance 2, but transmission matrix D 1508-6 needs to go to instance 2 and instance 3. If the cost of transmitting data between instance 2 and instance 3 is lower than the cost of transmitting data from instance 1 to instance 3, then a good option is transmission plan 1512-2, which transmits the deltas for matrix D 1508-6 to instance 2, which incorporates the data and forwards the deltas for matrix D to instance 3. The deltas for matrix C 1508-4 are transmitted only to instance 2. A simple cost analysis example is illustrated in FIG. 16, described above.

Because the data in matrix D 1506 must go to instance 2 and instance 3 in the illustration, an alternative transmission plan 1512-4 sends the deltas for matrix D 1508-6 to instance 3, which incorporates the deltas and transmits them to instance 2. This alternative transmission plan may be more cost effective if the cost of bandwidth directly from instance 1 to instance 2 is more costly than bandwidth from instance 1 to instance 3. In some embodiments, "over-transmission" is permitted, as illustrated in transmission plan 1512-3. In this transmission plan, transmission matrix A 1508-2 is sent to instance 2 (as needed), then transmitted to instance 3, even though it contains an extra portion of deltas that are already at the third instance. Generally, intentional over-transmission of deltas is undesirable, but if the over-transmission is small and there are sufficient other benefits to the transmission plan, it may be a good option.

Figure 17:
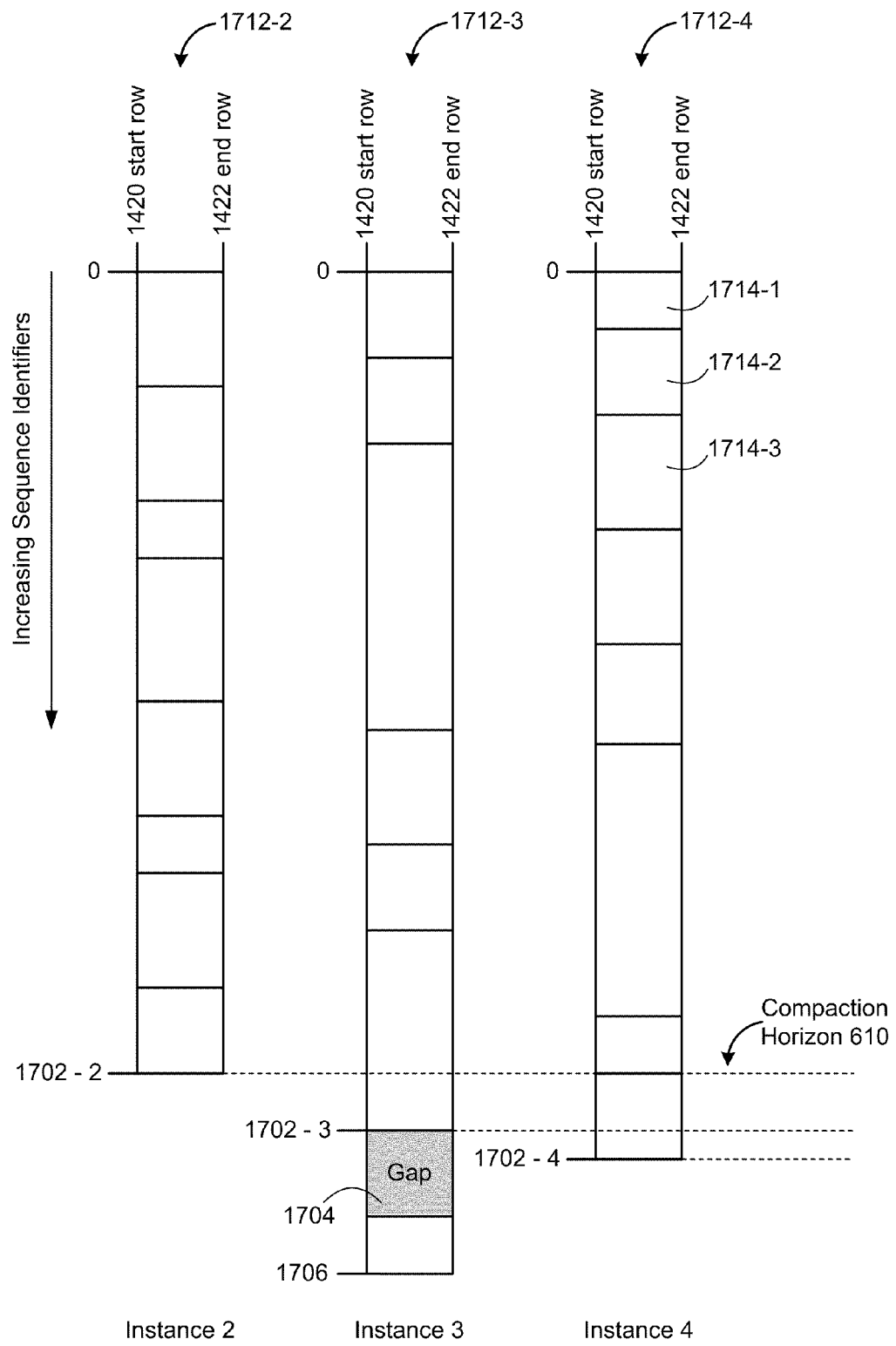
FIG. 17 illustrates a method of determining a compaction horizon using ingress maps according to some embodiments.

FIG. 17 illustrates how ingress maps 1712-2, 1712-3, and 1712-4 at instance 1 may be used in compaction operation 1222. Ingress map 1712-2 identifies deltas received from instance 2, and so on. In some embodiments, the ingress maps all use the same ranges of row identifiers, as depicted by start row 1420 and end row 1422 in FIG. 17. In other embodiments, or under certain circumstances, different ranges may be used. In fact, different ranges may be used even within a single ingress map 136. Each rectangle in an egress map, such as rectangles 1714-1, 1714-2, and 1714-3 in ingress map 1712-4, identifies a batch of deltas that was received. Typically, received batches arrive in order as illustrated by ingress records 1714-1, 1714-2, and 1714-3. In some embodiments, the start sequence of one batch is the end sequence of the previous batch. In these embodiments, deltas are included in a batch if there sequence identifiers are strictly greater than the start sequence and less than or equal to the end sequence. In other embodiments, the ingress map table saves only the ending sequence, and each batch includes deltas that have sequence identifiers greater than the previous end sequence. In some rare circumstances there are gaps in the ingress map as illustrated by gap 1704 for ingress map 1712-3 in FIG. 17. The gap 1704 shows a range of sequence identifiers that have not yet been received from instance 3.

To calculate a compaction horizon 610, the largest received sequence identifier for each instance is determined. For instance 2, the highest received sequence identifier is 1702-2, which is the end sequence of the most recent transmission from instance 2. For instance 4, the highest received sequence identifier is 1702-4, which is the end sequence of the most recent transmission from instance 4. For instance 3, the highest sequence identifier received is 1706 from the most recent transmission, but the gap 1704 prevents compaction beyond point 1702-3, which represent the highest usable sequence identifier. The sequence identifiers 1702-2, 1702-3, and 1702-4 identify the highest usable sequence identifiers for each individual instance, so the compaction horizon cannot be greater than any of these values. For example, there may be deltas at instance 2 with sequence identifiers greater than 1702-2, so the compaction horizon cannot be greater than the sequence identifier at 1702-2. Therefore, the compaction horizon is less than or equal to min(1702-2, 1702-3, 1702-4). In the example illustrated in FIG. 17, the minimum of these is 1702-2, so the compaction horizon is at most the sequence identifier at 1702-2. Of course the compaction horizon is also limited based on what deltas have been transmitted from instance 1 to the other instances.

In some embodiments, a process analogous to the process just described for using ingress maps in the calculation of a compaction horizon also applies to the use of egress maps. This is operation 1220 in FIG. 12B. For each instance other than the current instance, a maximum sequence identifier is determined, and the compaction horizon is limited by each of these. This is similar to the compaction horizon being limited to the sequence identifiers 1702-2, 1702-3, and 1702-4 in the ingress maps.

In the embodiments just described, deltas with sequence identifiers less than or equal to the compaction horizon are merged with the corresponding base values. In alternative embodiments, the deltas are merged only when their sequence identifiers are strictly less than the compaction horizon. In these embodiments, the compaction horizon is selected slightly differently. Specifically, the compaction horizon is selected to be a sequence identifier S such that, for all S'<S, (a) Every delta for relevant entries with sequence identifier S' has been transmitted to every other instance that potentially has an interest in these entries (and the other instances have acknowledged receipt of the deltas), and (b) There is certainty that no delta will ever arrive in the future for one of these relevant entries with sequence identifier S'. In particular, (1) no delta with such a sequence identifier will be created at the current instance, and (2) all deltas for the relevant entries with sequence identifier S' have already been received locally and been acknowledged.

The manner of ensuring these conditions depends on the implementation. In some embodiments, where sequencer identifiers are assigned by a blobmaster 204, the compaction horizon S can be calculated using "first missing sequence identifiers" in the ingress maps 136 and egress maps 134.

Some embodiments define a function called 'FirstMissingSequencer', which returns the least sequence identifier S that is not an element of an ingress or egress map. In this way, condition (a) is satisfied if S<=the first missing sequence identifier for each egress map. Condition (b)(2) is satisfied if S<=the first missing sequence identifier for each ingress map. And (b)(1) follows from (a) because the sequence identifiers generated at an instance are monotonically increasing. Therefore, the minimum of the various first missing sequencer identifiers provides an exemplary compaction horizon. One of ordinary skill in the art would recognize that other embodiments could compute the compaction horizon differently.

FIGS. 18A-18E illustrate data structures that are used to store metadata in some embodiments. In some embodiments, these data structures exist within the memory space of an executing program or process. In other embodiments, these data structures exist in non-volatile memory, such as magnetic or optical disk drives. In some embodiments, these data structures form a protocol buffer, facilitating transfer of the structured data between physical devices or processes. See, for example, the Protocol Buffer Language Guide, available at http://code.google.com/apis/protocolbuffers/docs/proto.html.

The overall metadata structure 1802 includes three major parts: the data about blob generations 1804, the data about blob references 1808, and inline data 1812. In some embodiments, read tokens 1816 are also saved with the metadata, but the read tokens are used as a means to access data instead of representing characteristics of the stored blobs.

The blob generations 1804 can comprise one or more "generations" of each blob. In some embodiments, the stored blobs are immutable, and thus are not directly editable. Instead, a "change" of a blob is implemented as a deletion of the prior version and the creation of a new version. Each of these blob versions 1806-1, 1806-2, etc. is a generation, and has its own entry. In some embodiments, a fixed number of generations are stored before the oldest generations are physically removed from storage. In other embodiments, the number of generations saved is set by a blob policy 326. (A policy can set the number of saved generations as 1, meaning that the old one is removed when a new generation is created.) In some embodiments, removal of old generations is intentionally "slow," providing an opportunity to recover an old "deleted" generation for some period of time. The specific metadata associated with each generation 1806 is described below with respect to FIG. 18B.

Blob references 1808 can comprises one or more individual references 1810-1, 1810-2, etc. Each reference is an independent link to the same underlying blob content, and each reference has its own set of access information. In most cases there is only one reference to a given blob. Multiple references can occur only if the user specifically requests them. This process is analogous to the creation of a link (a hard link) in a desktop file system. The information associated with each reference is described below with respect to FIG. 18C.

Inline data 1812 comprises one or more inline data items 1814-1, 1814-2, etc. Inline data is not "metadata"—it is the actual content of the saved blob to which the metadata applies. For blobs that are relatively small, access to the blobs can be optimized by storing the blob contents with the metadata. In this scenario, when a client asks to read the metadata, the blobmaster returns the actual blob contents rather than read tokens 1816 and information about where to find the blob contents. Because blobs are stored in the metadata table only when they are small, there is generally at most one inline data item 1814-1 for each blob. The information stored for each inline data item 1814 is described below in FIG. 18D.

Figure 18A:
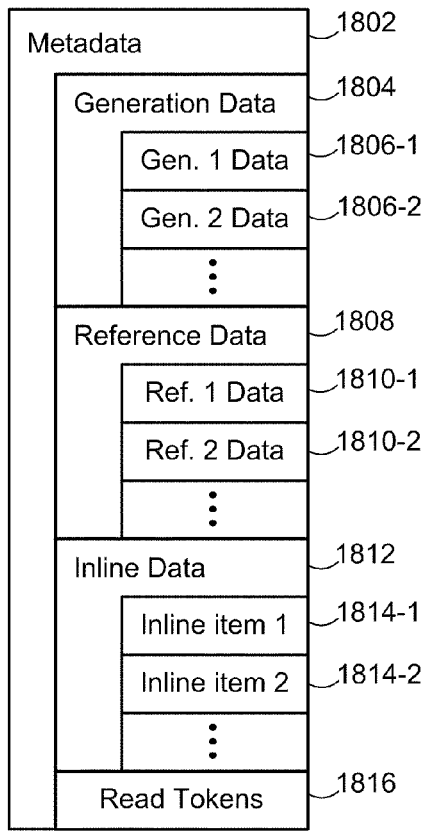
FIGS. 18A-18E illustrate data structures used to store metadata according to some embodiments.
Figure 18B:
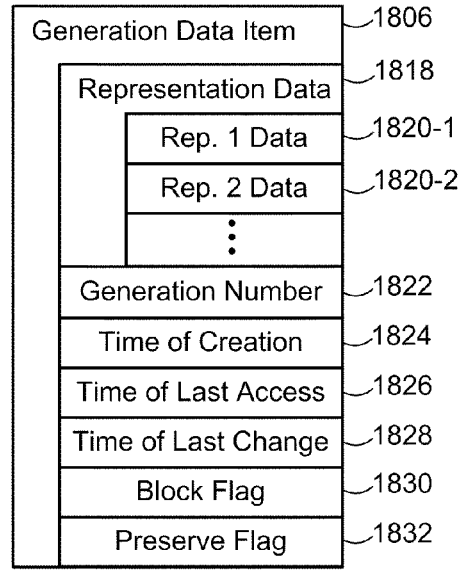

As illustrated in the embodiment of FIG. 18B, each generation 1806 includes several pieces of information. In some embodiments, a generation number 1822 (or generation ID) uniquely identifies the generation. The generation number can be used by clients to specify a certain generation to access. In some embodiments, if a client does not specify a generation number, the blobmaster 204 will return information about the most current generation. In some embodiments, each generation tracks several points in time. Specifically, some embodiments track the time the generation was created (1824). Some embodiments track the time the blob was last accessed by a user (1826). In some embodiments, last access refers to end user access, and in other embodiments, last access includes administrative access as well. Some embodiments track the time the blob was last changed (1828). In some embodiments that track when the blob was last changed, changes apply only to metadata because the blob contents are immutable. Some embodiments provide a block flag 1830 that blocks access to the generation. In these embodiments, a blobmaster 204 would still allow access to certain users or clients who have the privilege or seeing blocked blob generations. Some embodiments provide a preserve flag 1832 that will guarantee that the data in the generation is not removed. This may be used, for example, for data that is subject to a litigation hold or other order by a court. In addition to these individual pieces of data about a generation, a generation has one or more representations 1818. The individual representations 1820-1, 1820-2, etc. are described below with respect to FIG. 18E.

Figure 18D:
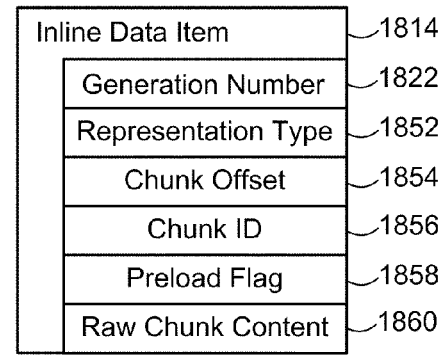
Figure 18C:
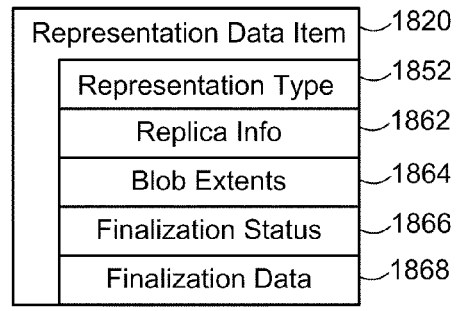

FIG. 18C illustrates a data structure to hold an individual reference according to some embodiments. Each reference 1810 includes a reference ID 1834 that uniquely identifies the reference. When a user 302 accesses a blob, the user application 308 must specify a reference ID in order to access the blob. In some embodiments, each reference has an owner 1836, which may be the user or process that created the reference. Each reference has its own access control list ("ACL"), which may specify who has access to the blob, and what those access rights are. For example, a group that has access to read the blob may be larger than the group that may edit or delete the blob. In some embodiments, removal of a reference is intentionally slow, in order to provide for recovery from mistakes. In some embodiments, this slow deletion of references is provided by tombstones. Tombstones may be implemented in several ways, including the specification of a tombstone time 1840, at which point the reference will be truly removed. In some embodiments, the tombstone time is 30 days after the reference is marked for removal. In some embodiments, certain users or accounts with special privileges can view or modify references that are already marked with a tombstone, and have the rights to remove a tombstone (i.e., revive a blob).

In some embodiments, each reference has its own blob policy, which may be specified by a policy ID 1842. The blob policy specifies the number of copies of the blob, where the copies are located, what types of data stores to use for the blobs, etc. When there are multiple references, the applicable "policy" is the union of the relevant policies. For example, if one policy requests 2 copies, at least one of which is in Europe, and another requests 3 copies, at least one of which is in North America, then the minimal union policy is 3 copies, with at least one in Europe and at least one in North America. In some embodiments, individual references also have a block flag 1844 and preserve flag 1846, which function the same way as block and preserve flags 1830 and 1832 defined for each generation. In addition, a user or owner of a blob reference may specify additional information about a blob, which may include on disk information 1850 or in memory information 1848. A user may save any information about a blob in these fields.

FIG. 18D illustrates inline data items 1814 according to some embodiments. Each inline data item 1814 is assigned to a specific generation, and thus includes a generation number 1822. The inline data item also specifies the representation type 1852, which, in combination with the generation number 1822, uniquely identifies a representation item 1820. (See FIG. 18E and associated description below.) In embodiments that allow multiple inline chunks for one blob, the inline data item 1814 also specifies the chunk ID 1856. In some embodiments, the inline data item 1814 specifies the chunk offset 1854, which specifies the offset of the current chunk from the beginning of the blob. In some embodiments, the chunk offset is specified in bytes. In some embodiments, there is a Preload Flag 1858 that specifies whether the data on disk is preloaded into memory for faster access. The contents 1860 of the inline data item 1814 are stored with the other data elements.

Figure 18E:
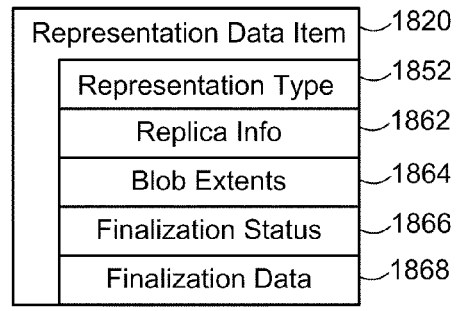

FIG. 18E illustrates a data structure to store blob representations according to some embodiments. Representations are distinct views of the same physical data. For example, one representation of a digital image could be a high resolution photograph. A second representation of the same blob of data could be a small thumbnail image corresponding to the same photograph. Each representation data item 1820 specifies a representation type 1852, which would correspond to "high resolution photo" and "thumbnail image" in the above example. The Replica Information 1862 identifies where the blob has been replicated, the list of storage references (i.e., which chunk stores have the chunks for the blob). In some embodiments, the Replica Information 1862 includes other auxiliary data needed to track the blobs and their chunks. Each representation data item also includes a collection of blob extents 1864, which specify the offset to each chunk within the blob, to allow reconstruction of the blob.

When a blob is initially created, it goes through several phases, and some embodiments track these phases in each representation data item 1820. In some embodiments, a finalization status field 1866 indicates when the blob is UPLOADING, when the blob is FINALIZING, and when the blob is FINALIZED. Most representation data items 1820 will have the FINALIZED status. In some embodiments, certain finalization data 1868 is stored during the finalization process.

Figure 19:
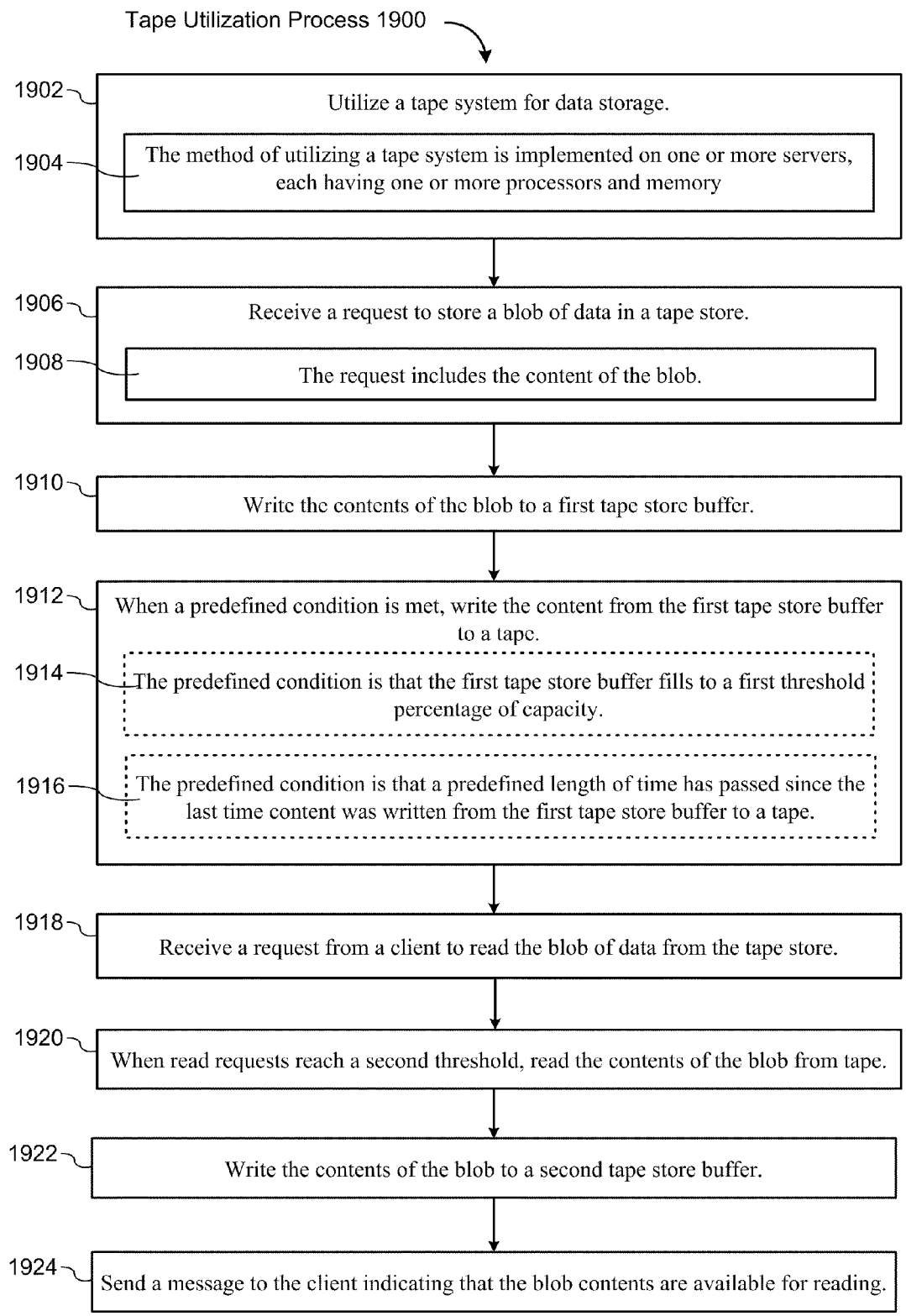
FIG. 19 illustrates a method of utilizing a tape device as a data store according to some embodiments.

FIG. 19 illustrates a process 1900 of utilizing tapes as a direct storage medium in a distributed storage system (1902). The method is implemented on one or more servers, each having one or more processors and memory (1904). Initially, a request is received (1906) to store a blob of data in a tape store. In some embodiments, these requests are limited to background replication because reading and writing to tape is a comparatively slow process. The request includes (1908) the contents of the blob to be stored. When the request is received, the contents of the blob are written (1910) to a tape store buffer. In some embodiments, a tape store buffer comprises non-volatile memory, but in other embodiments, a tape store buffer may comprise volatile memory or a combination of volatile and non-volatile memory.

The blobs in the tape store buffer are written (1912) to tape when a predefined condition is met. In some embodiments, the predefined condition is that the tape store buffer fills to a first threshold percentage of capacity (1914). In some embodiments, the predefined condition is that a predefined length of time has passed since the last time content was written from the tape store buffer to tape (1916). Some embodiments have a predefined condition that combines both percent of capacity and time (e.g, when the buffer fills to a certain percent of capacity or a certain amount of time has elapsed).

At some point in the future, a request is received (1918) from a client to read the blob of data from the tape store. In some embodiments, the request must come from background replication. When the read requests reach a certain threshold, the contents of the blob are read from tape. In some embodiments, the request threshold is based on the number of read requests. In some embodiments, the request threshold is based on the number of bytes in the read requests. In some embodiments, the request threshold is based on the amount of time elapsed since the first request, or the weighted average wait time for multiple requests (e.g., weighted by the size of the blob, or a priority level). In some embodiments, the request threshold includes a combination of above (e.g, total requested bytes or maximum length of time).

The bytes that are read from tape are written to another tape store buffer (1922). The tape store buffer for reading data from tape may be the same buffer used for writing data to tape, or partitions of the same computer readable medium. In some embodiments, the two buffers are distinct, and may comprise distinct media. For example, in some embodiments, the media used for writing is more reliable than the media use for reading because data loss during reading could be resolved by reading the data from tape again. Once the blob has been written to the tape store buffer, a message is sent to the client indicating that the blob is available for reading.

Figure 20:
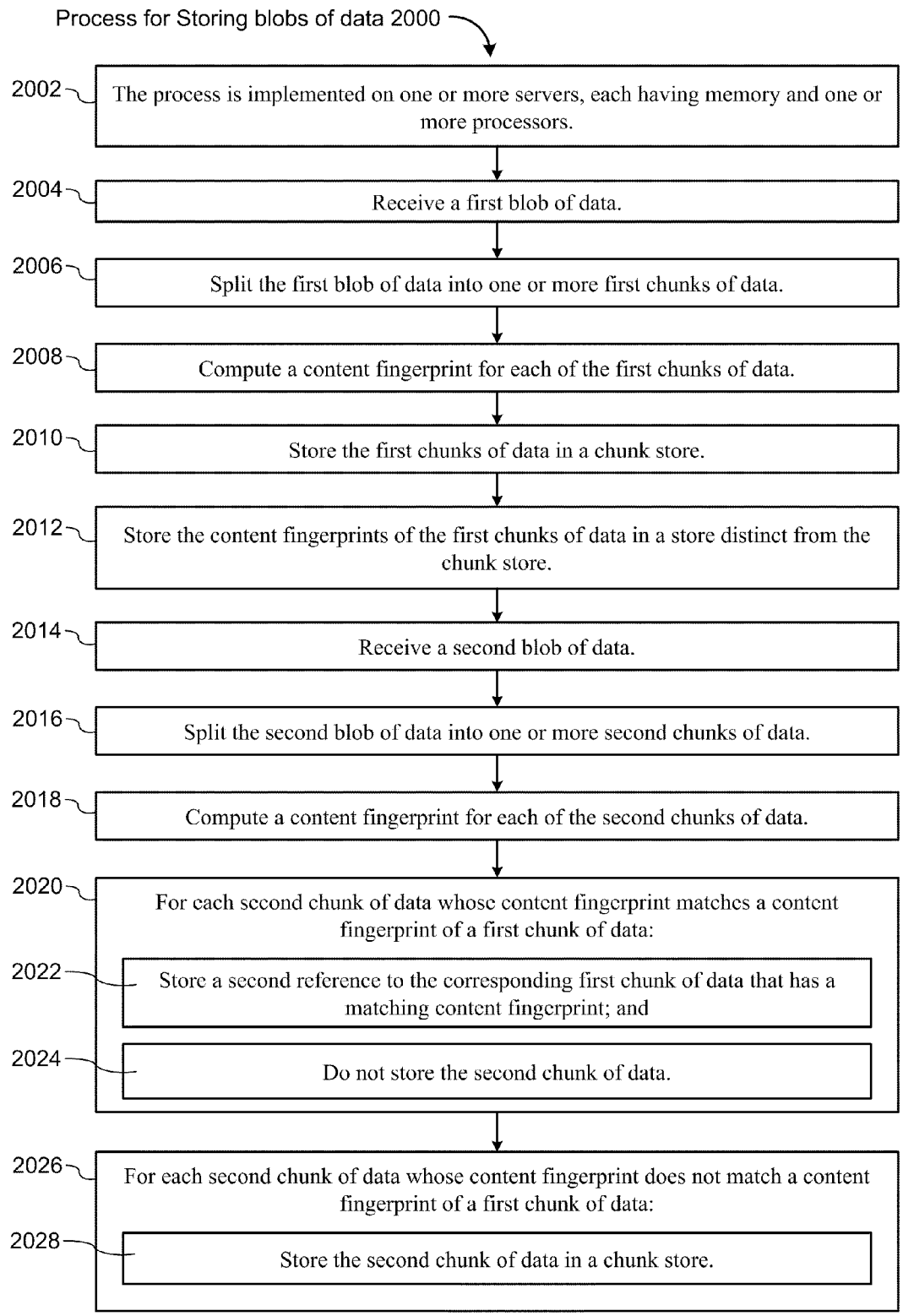
FIG. 20 illustrates a method of implementing content-based de-duplication according to some embodiments.

FIG. 20 illustrates a process 2000 for storing blobs of data that incorporates content-based de-duplication. The process is implemented (2002) on one or more servers, each having memory and one or more processors. Process 2000 receives (2004) a first blob, and splits (2006) the first blob into one or more chunks. A small blob typically consists of a single chunk, but a large blob may be split into a large number of chunks. For example, a one gigabyte blob may be split into roughly 100 individual chunks of 10 megabytes. In some embodiments, the splitting into chunks creates chunks of a fixed size (except for the last chunk, which holds the remaining bytes of the blob). In other embodiments, chunks are selected to optimize processing or storage. For example, chunks may be selected in order to match chunks that are already stored, to take advantage of the content-based de-duplication described here. For each chunk, the process 2000 computes (2008) a content fingerprint as a function of the chunk contents. In some embodiments, the content fingerprint is a fixed-length bit string. In some embodiments, the content fingerprint is a 128 bit hash value. In some embodiments, the content fingerprint is a 256 bit (or larger) hash value. In some embodiments, the content fingerprint is a cryptographic hash. Some embodiments use MD4, MD5, SHA-1, or SHA-2 hash functions to compute the content fingerprint.

The process 2000 stores (2010) the first chunks in a chunk store. The process 2000 also stores (2012) the content fingerprints of the first chunks in a store distinct from the chunk store. In some embodiments, the content fingerprints are stored with the metadata for each blob. In other embodiments, the bitpusher 210 stores content fingerprints in an index to facilitate lookup.

The process 2000 receives (2014) a second blob, and splits (2016) the second blob into one or more chunks. The process 2000 computes (2018) the content fingerprint for each of the second chunks. The process 2000 compares the content fingerprints for each of the second chunks to previously saved content fingerprints.

For each second chunk whose content fingerprint matches (2020) a content fingerprint of a chunk that is already stored, the respective second chunk is not stored (2024); instead, the process 2000 stores (2022) a reference to the existing stored chunk with matching content fingerprint.

For each second chunk whose content fingerprint does not match (2026) a content fingerprint of any chunk that is already stored, the process 2000 stored the respective second chunk in a chunk store.

The process of content-based de-duplication is also described below with respect to FIG. 23. In general, chunks of one blob may match chunks from a blob saved earlier. However, it is also possible for two or more chunks within a single blob to have the same content (and thus have matching content fingerprints). In some embodiments, a chunk whose content fingerprint matches the content fingerprint of a chunk that has already been stored will not be stored, regardless of whether the earlier stored chunk is from the same blob or a different blob. In addition, chunks from different generations of the same blob may match. For example, a later generation of a file may be nearly identical to an earlier version, and thus there may be multiple chunks that are the same. Although the generations are conceptually different versions of the blob, the storage space may overlap if some of the chunks are the same across generations.

Figure 21:
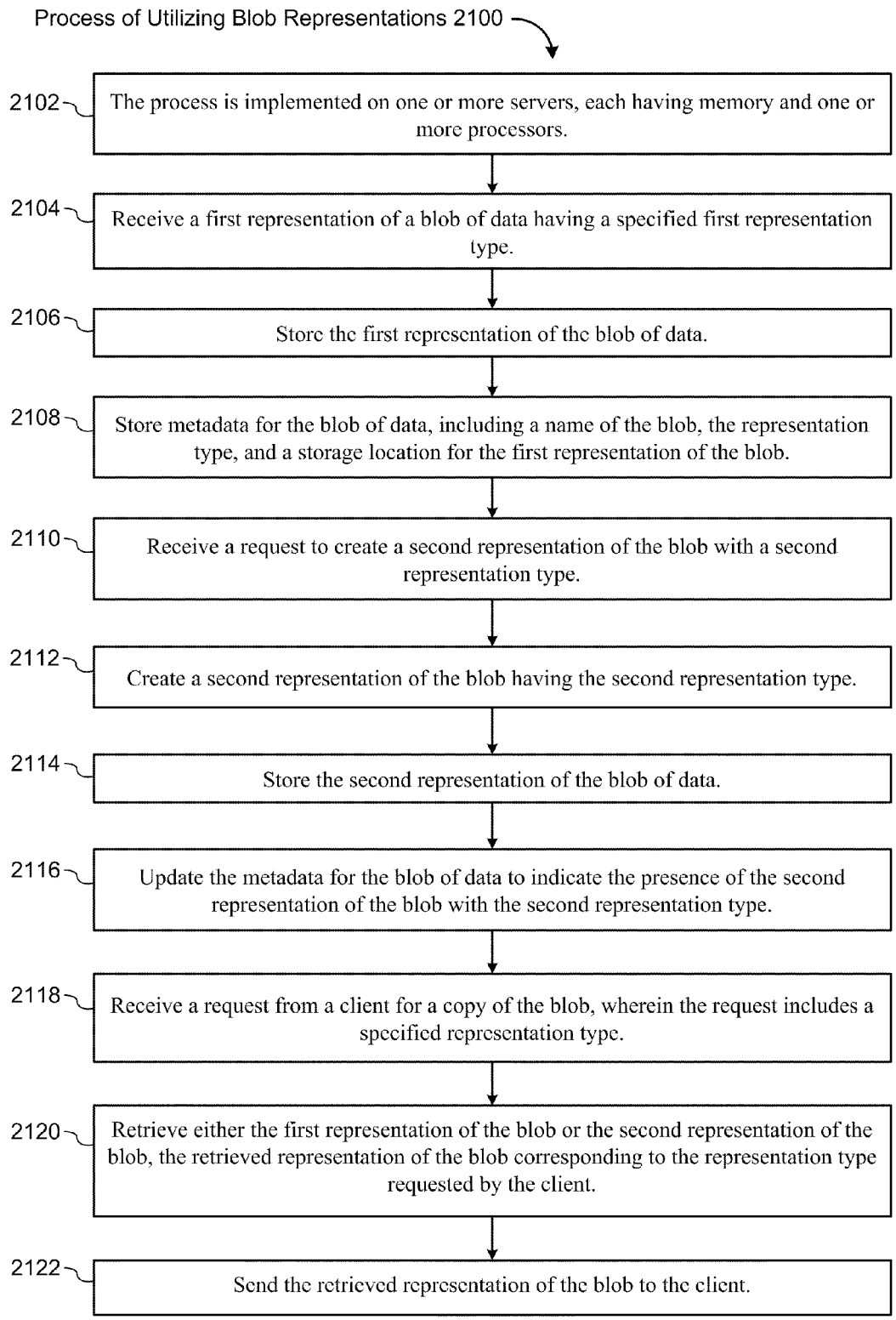
FIG. 21 illustrates a method of efficiently creating an utilizing multiple representations of a blob according to some embodiments.

FIG. 21 illustrates a process 2100 of utilizing blob representations. The process 2100 is implemented (2102) on one or more servers, each having memory and one or more processors. The process receives (2104) a first representation of a blob having a specified representation type. In some embodiments, each blob has a default representation type if the representation type is not specified. In some embodiments, an empty string " " denotes the default representation type. The process 2100 stores (2106) the first representation of the blob. In addition, the process 2100 stores (2108) metadata for the blob, including a name of the blob, the representation type, and a storage location for the first representation of the blob.

The process 2100 later receives (2110) a request to create a second representation of the blob with a second representation type. In some embodiments, a client requests the second representation type using a remote procedure call. Rather than send the entire blob back (over expensive network bandwidth) to the client to build the second representation, the second representation is created (2112) with the second representation type at or near the data center where the first representation of the blob is stored. The process stores (2114) the second representation of the blob. The second representation of the blob does not necessarily use the same chunk store as the original representation of the blob. For example, if the second representation is a thumbnail version of a higher resolution first representation, the thumbnail may be stored as an inline chunk, whereas the first representation may be stored in a file system store or a BigTable store. When the second representation is created, the metadata for the blob is updated (2116) to indicate the presence of the second representation of the blob with the second representation type.

Subsequently, a client may request to read either representation of the blob. In particular, the process 2100 receives (2118) a request from the clients for a copy of the blob, and the request includes a specified representation type. As noted above, some embodiments allow an empty string to specify the default representation. In these embodiments, to identify the non-default representation, the client must specify the appropriate representation type with a non-empty string. In response, the process 2000 retrieves (2120) either the first representation of the blob or the second representation of the blob. The retrieval corresponds (2120) to the representation type requested by the client. The process 2100 then returns (2122) the retrieved representation of the blob to the client.

The creation and retrieval of blob representation is also described below with respect to FIGS. 24A-24C.

Figure 22:
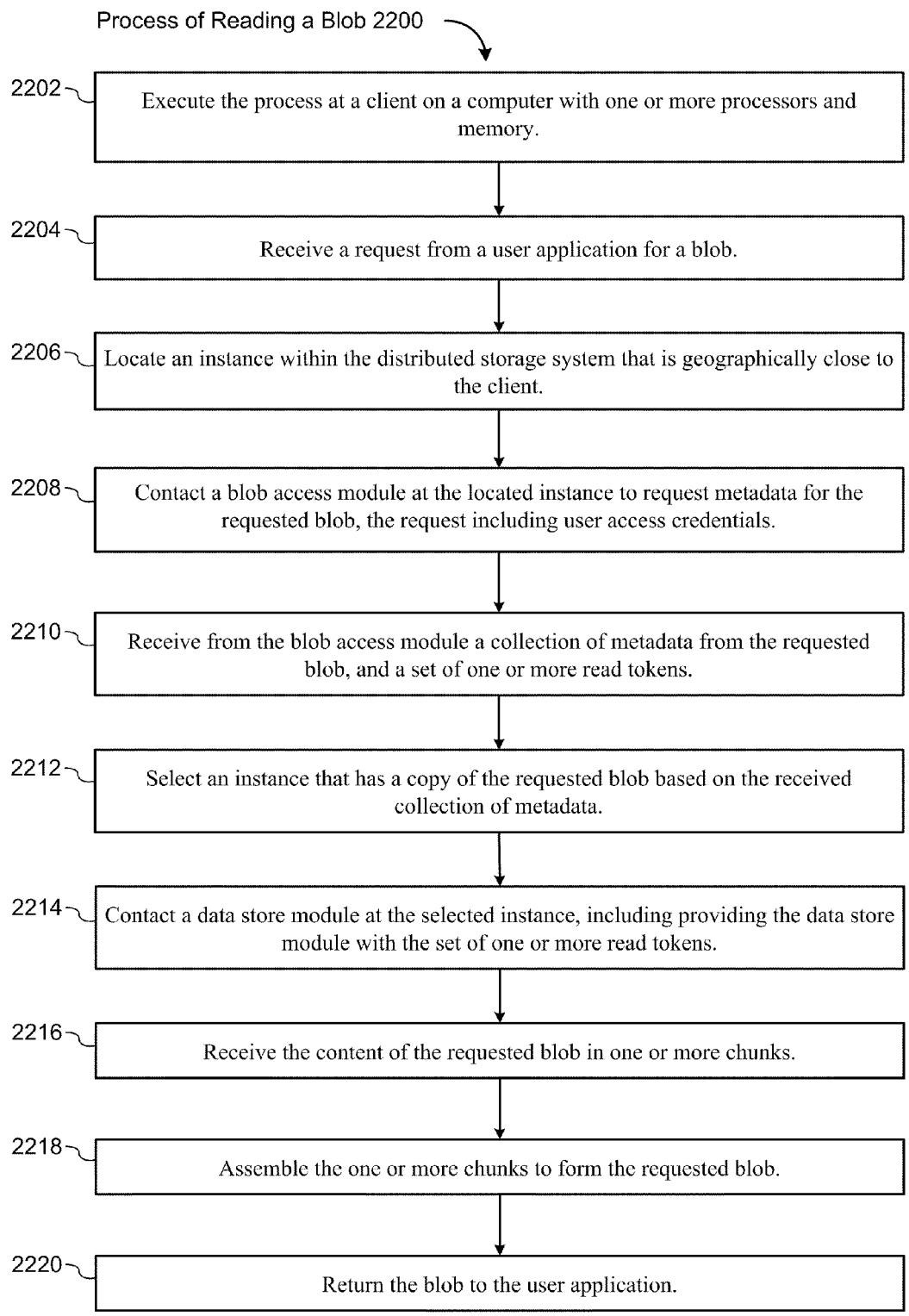
FIG. 22 illustrate a method of reading a blob stored in a distributed storage system according to some embodiments.

FIG. 22 illustrates an exemplary process 2200 for reading a blob of data. This process is also described below with respect to FIG. 25. At a high level, this is a two-stage process. First, find the metadata. Then, using the metadata, find the actual blob and retrieve it.

The process 2200 executes (2202) at a client on a computer with one or more processors and memory. The process 2200 receives (2204) a request from a user application 308 for a blob. The process 2200 locates (2206) an instance within the distributed storage system that is geographically close to the client. At this point there is no guarantee that the located instance has the requested blob or even knows about the blob (i.e., has the metadata for the requested blob). The client contacts (2208) a blob access module (e.g., a blobmaster) at the located instance to request the metadata for the requested blob. The request includes (2208) user access credentials.

The client receives (2210) from the blob access module a collection of metadata for the requested blob, and a set of one or more read tokens. The metadata includes information that specifies which instances have copies of the blob. From this list of instances, the client selects (2212) an instance that has a copy of the requested blob. The client then contacts (2214) a data store module (e.g., a bitpusher 210) at the selected instance, and provides (2214) the data store module with the set of one or more read tokens. In some embodiments, read tokens correspond to the chunks that comprise the selected blob. The read tokens indicate to the data store module that the client has been authorized to read the specified chunks. In some embodiments, the read tokens are chunk-specific, so a client cannot acquire read tokens for one blob and use them to access chunks for a different blob.

The client receives (2216) the content of the requested blob in one or more chunks, then assembles (2218) the one or more chunks to form the requested blob. For one-chunk blobs, assembly requires little work. The client then returns (2220) the blob to the user application.

Note that the process illustrated in FIG. 22 is the simple case. There are two common variations. First, if the blob is stored as inline chunks, and the chunks are stored at the instance that the client initially contacts, the blob access module just returns the blob contents to the client rather than returning read tokens. In some embodiments the blob access module returns the metadata as well, but in other embodiments, only the content is returned. This one-step process to retrieve inline chunks is one reason that retrieval from inline chunks is fast.

On the other hand, the blob access module (e.g., the blobmaster) may not have the metadata for the requested blob. In this case, the local instance passes the request on to a global instance that has the metadata for all of the blobs. As long as the requested blob does exist, and the end user has access rights, the global instance passes the metadata back to the original local instance, and from there back to the client. Once the client has the metadata, the process 2200 proceeds to select (2212) an instance with a copy of the blob.

Figure 23:
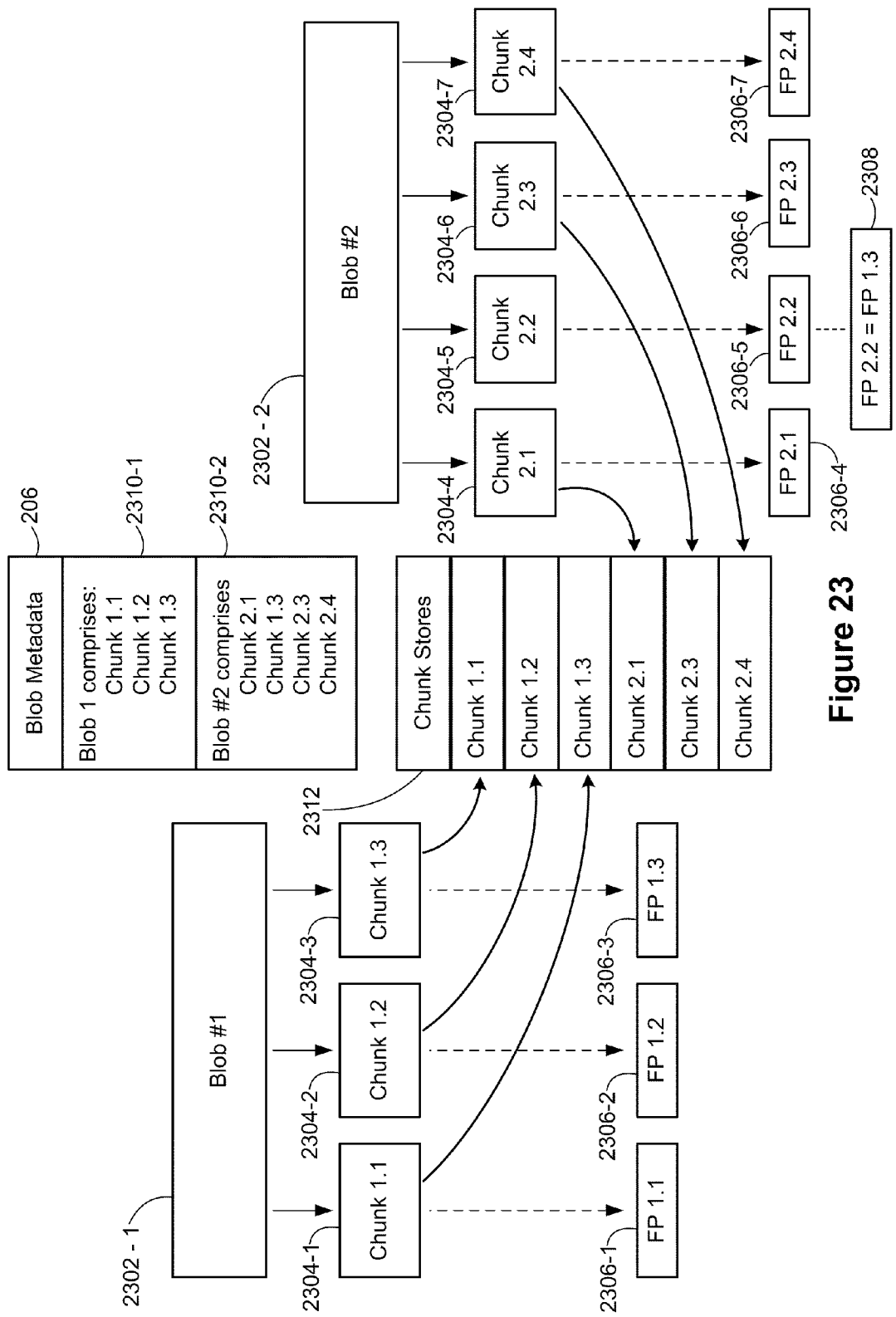
FIG. 23 is a block diagram that illustrates a process to reduce the amount of storage using content-based de-duplication according to some embodiments.

FIG. 23 illustrates graphically an exemplary process to implement content-based de-duplication. Blob #1 (2302-1) is received first, and is split into three chunks 2304-1, 2304-2, and 2304-3. The process computes the content fingerprints 2306-1, 2306-2, and 2306-3 for these three chunks. All three of the chunks have distinct content fingerprints, so all three of the chunks are stored in chunk store 2312. In addition, metadata 2310-1 is stored in the metadata store 206, and identifies the three chunks that comprise the first blob.

Blob #2 (2302-2) is processed in the same way. Blob #2, however, is split into four chunks 2304-4, 2304-5, 2304-6, and 2304-7. The split into four chunks could be based on a selected fixed size for chunks, or other chunk algorithm. For each of these four chunks, the process computes the associated content fingerprint 2306-4, 2306-5, 2306-6, and 2306-7. Content fingerprints 2306-4, 2306-6, and 2306-7 do not match the content fingerprints of any chunks that are already saved, so the corresponding chunks are saved into the chunks stores 2312. However, the content fingerprint 2306-5 matches (2308) content fingerprint 2306-3, so chunk 2304-5 has already been saved in the chunk stores as chunk 2304-3. Rather than save this chunk again, the metadata for blob#2 (2310-2) identifies the existing chunk (Chunk 1.3) as part of the blob contents.

This simple example illustrates some points. First, the source of the matching chunks is irrelevant. In this example, the second chunk from one blob matches the third chunk of another blob. Second, the process compares the content fingerprints, not the entire content of the blobs. While chunks may be relatively large (e.g., 16K bytes), some embodiments create content fingerprints that are small and fixed in size (e.g., 128 bits). Some embodiments of the disclosed distributed storage system utilize a hash function that virtually eliminates the risk of creating two identical content fingerprints from chunks with distinct content.

Figure 24A:
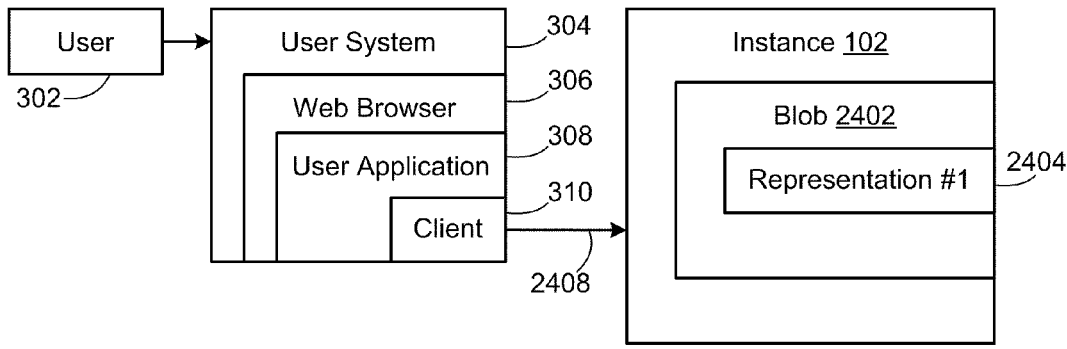
FIGS. 24A-24C illustrate an exemplary set of operations to create and retrieve multiple representations of the same blob according to some embodiments.
Figure 24B:
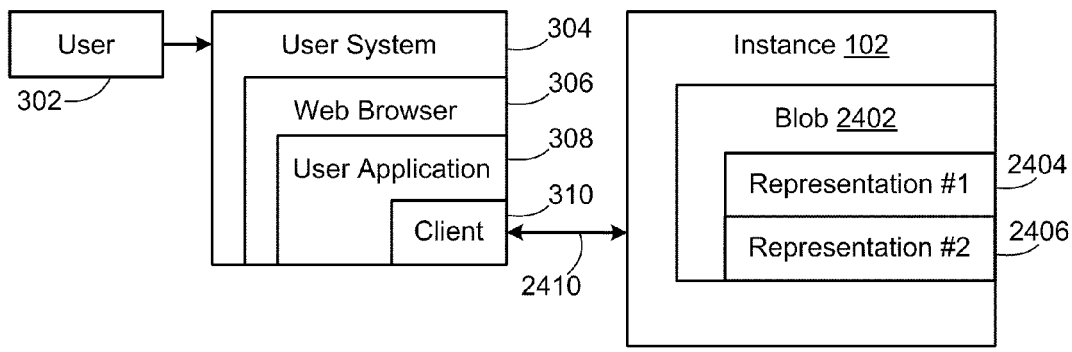
Figure 24C:
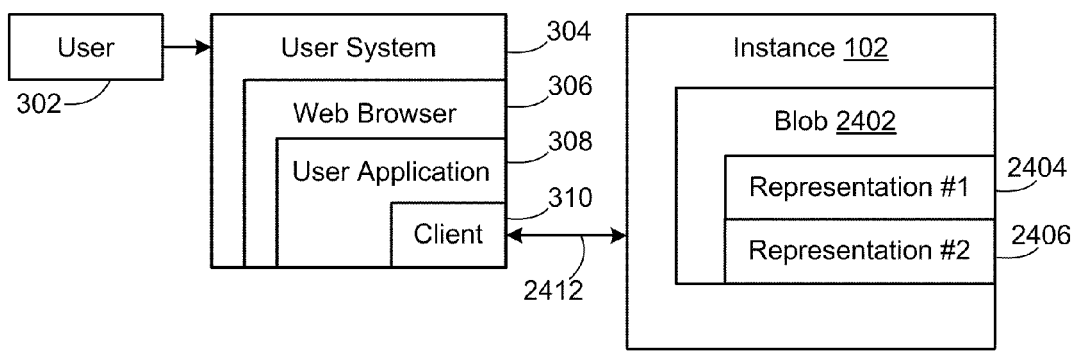

FIGS. 24A-24C graphically illustrate a process of creating and using multiple representations of the same blob. In FIG. 24A, the client 310 writes (2408) a blob 2402 to chunks stores at an instance 102. Initially, the blob has a single representation 2404. Later, a user requests creation of a second representation 2406 of the same blob 2402. The request is transmitted (2410) to the instance 102 using a remote procedure call. A coprocessor module at or near instance 102 creates a second representation 2406 with the requested second representation type. In some embodiments, a request to create a new representation may include a request to receive a copy of the new representation once it is created. In that case, the second representation 2406 is transmitted (2410) back to the client for presentation in the user application 308.

Once the second representation 2406 is created and saved, it can be retrieved (and replicated) like any other representation. Therefore, in the future, a user 302 may request (2412) a copy of the second representation 2406 of the blob 2402, and the second representation 2406 will be returned to the client. A more detailed description of reading a blob was presented above with respect to FIG. 22, and is described below with respect to FIG. 25.

Figure 25:
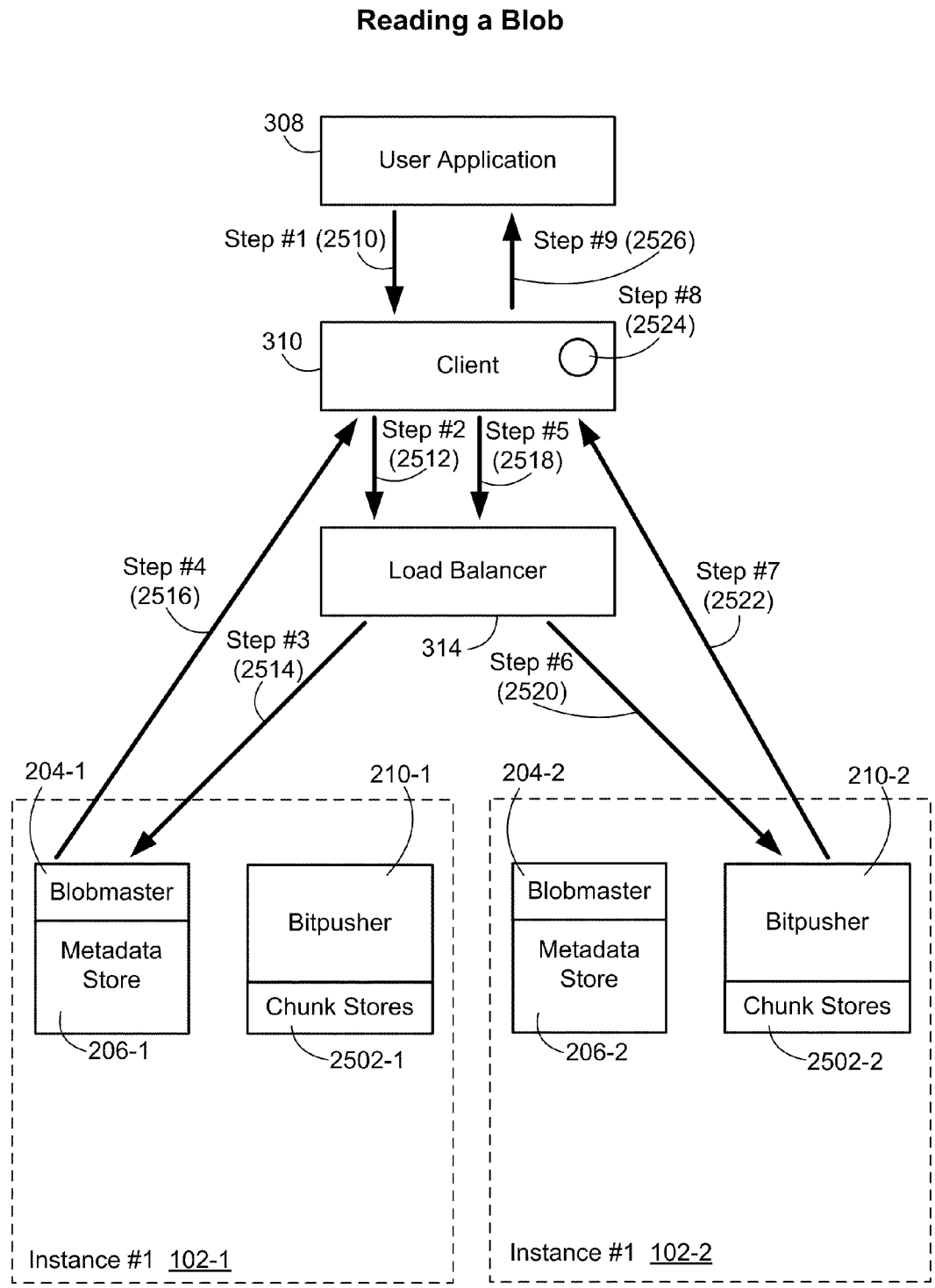
FIG. 25 is a block diagram that illustrates a process of reading a blob deom a distributed storage system according to some embodiments.

FIG. 25 illustrates graphically an exemplary process flow for reading a blob. Initially, a user application 308 requests (2510) a blob from the client library 310. In some embodiments, the client library 310 contacts (2512) a load balancer 314 to identify an appropriate instance to call for metadata lookup. Once the load balancer 314 selects an instance 102-1 to contact, the load balancer will either forward (2514) the request to the selected instance 102-1, or return the identity of the selected instance to the client 310. In the latter case, client 310 would then call the selected instance 102-1 directly. In the simple case where the metadata for the requested blob is at the instance 102-1, the blobmaster 204-1 retrieves the relevant metadata from the metadata store 206-1 and returns (2516) the metadata to the client, along with one or more read tokens.

The client then contacts (2518) a load balancer 314, and provides (2518) the load balancer 314 with a list of instances that have the requested blob. Based on known loads and/or network traffic, the load balancer selects an instance 102-2 to provide the blob contents. FIG. 25 illustrates a case where the instance 102-2 is not the same as the instance 102-1 that provided the metadata. However, in many cases the source of the metadata and the source of the blob contents will be the same.

The load balancer 314 either forwards (2520) the blob content request to the instance 102-2, or returns the identity of the selected instance 102-2 to the client. In the latter case, the client then contacts the instance 102-2 directly. In some embodiments, requests for blob contents are directed to a bitpusher 210-2 at the instance 102-2. The bitpusher 210-2 retrieves the chunks for the requested blob from the appropriate chunk stores 2502-2, and returns (2522) the chunks to the client 310. The client assembles (2524) the one or more chunks to reconstruct the desired blob, then delivers (2526) the blob to the user application that made the original request.

In this illustrated example, the bitpusher 210-1 and chunk stores 2502-1 at the initial instance 102-1 were not contacted, whereas the blobmaster 204-2 and metadata store 206-2 at the second instance 102-2 were not contacted. FIG. 25 illustrates the simple case of reading a blob, as noted above with respect to FIG. 22. To address inline data and the case where the instance contacted 102-1 does not have the metadata for the desired blob, refer to the discussion for FIG. 22.

FIG. 27 illustrates some basic blob policies that may be applied to blobs stored in embodiments of the disclosed distributed storage system 200. Policy 2702 is a typical policy for storing a blob on "disk." In this policy, the actual chunk store used depends on the size of the blob. Policies 2704 and 2706 represent policies that specify a combination of storage on disk and storage on tape, which are typically in different cities. Policies 2708 and 2710 demonstrate that policies can specify geographic information about where blobs are stored or not stored. Policy 2712 illustrates a policy that has a time component, so that the desired number of copies changes over time. Although not depicted in this figure, a blob policy may specify the quality of service (QOS) that will be used when replicating a blob over the network.

FIG. 27 also illustrates the relationship between policies and the blobs that use those policies. Blobs 2714, 2716, 2724, and 2726 each has a blob policy that applies to it alone. Although this is allowed, policies are rarely created for individual blobs. In general, a user application specifies a small number of blob policies (e.g., 3) that apply to all blobs created or used by that user application. The policies may apply to millions of blobs. This is illustrated by policy 2706, which applies to blobs 2718, 2720, . . . , 2722. Similarly, policy 2712 applies to all blobs between blob 2828 and blob 2730.

FIG. 28 illustrates how chunks and the associated metadata and indexes are stored according to some embodiments. Blob metadata 2802 indicates that the first generation of blob 1 is split into two chunks C1 and C2. Chunk C1 comprises bytes 0 to 1000 of the blob, and chunk C2 comprises bytes 1001 to 2596 of the blob. In some embodiments, this metadata is saved in metadata store 206 and accessed by blobmaster 204. The bitpusher 210 manages a chunk index that specifies where each of the chunks are located, and which blobs use each of the chunks. The chunk index portion 2806 corresponding to the first chunk C1 indicates that the first chunk is used in both the first generation of blob 1 and the first generation of blob 2. The actual contents 2812 of chunk C1 are in a chunk store. In particular, there is only one physical copy of the contents of chunk C1 even though there are two distinct blobs using this chunk.

The chunk index portion 2808 corresponding to chunk C2 indicates that it is used by the first generation of blob 1. The corresponding chunk contents 2814 of chunk C2 (bytes 1001 to 2596) are stored in a chunk store. The illustration in FIG. 28 also shows a second generation of blob 1, with metadata 2804. The second generation comprises a single chunk C3, which is different from both chunks C1 and C2. The corresponding chunk index portion 2810 indicates that this chunk is in use by the second generation of blob 1, and the contents 2816 of this chunk are stored in a chunk store.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A distributed storage system for storing blobs, comprising:
a plurality of instances, wherein each respective instance includes a plurality of server computers having memory and one or more processors storing one or more programs for execution by the one or more processors, and wherein at least a subset of the instances are at physically distinct geographic locations;
wherein a respective instance stores data for a plurality of blobs; and
wherein each respective blob has corresponding metadata that includes information that identifies a set of one or more instances where the respective blob is stored and includes a blob placement policy that specifies the desired number of copies of the respective blob as well as the desired locations for copies of the respective blob; and
a location assignment module configured to:
compare the desired number of copies of each respective blob and the desired locations for copies of the respective blob, as specified in the respective blob placement policy for the respective blob, to a current number of copies of the respective blob and current locations of copies of the respective blob; and
issue commands to delete a copy of the respective blob or to replicate the respective blob to another instance in response to determining that the current number of copies of the respective blob is inconsistent with the desired number of copies of the respective blob or the current locations of the respective blob are inconsistent with the desired locations for copies of the respective blob, as specified in the respective blob placement policy for the respective blob.

2. The distributed storage system of claim 1, wherein one or more blob placement policies further specify data store type requirements of blob replicas.

3. The distributed storage system of claim 1, wherein a respective instance further comprises a first replication module that dynamically replicates blobs from one instance to another instance based on user requests to access blobs that are not stored at an instance near the user.

4. The distributed storage system of claim 2, wherein the data store types include inline data stores, BigTable data stores, file system data stores, and tape data stores.

5. A method, comprising:
at a server having one or more processors and memory storing programs configured for execution by the one or more processors to manage storage of blobs in a distributed storage system, wherein the distributed storage system includes a plurality of instances, at least a subset of the instances are at physically distinct geographic locations, each respective instance stores data for a plurality of blobs, and each respective blob has corresponding metadata that includes information that identifies a set of one or more instances where the respective blob is stored and includes a blob placement policy that specifies the desired number of copies of the respective blob as well as the desired locations for copies of the respective blob:
comparing the desired number of copies of each respective blob and the desired locations for copies of the respective blob, as specified in the respective blob placement policy for the respective blob, to a current number of copies of the respective blob and current locations of copies of the respective blob; and
issue commands to delete a copy of the respective blob or to replicate the respective blob to another instance in response to determining that the current number of copies of the respective blob is inconsistent with the desired number of copies of the respective blob or the current locations of the respective blob are inconsistent with the desired locations for copies of the respective blob, as specified in the respective blob placement policy for the respective blob.

6. The method of claim 5, wherein one or more blob placement policies further specify data store type requirements of blob replicas.

7. The distributed storage system of claim 6, wherein the data store types include inline data stores, BigTable data stores, file system data stores, and tape data stores.

8. The distributed storage system of claim 5, further comprising dynamically replicating a first blob from one instance to another instance based on a user request to access the first blob, wherein the first blob is not stored at an instance near the user.

9. A non-transitory computer readable storage medium storing one or more programs configured for execution by a server having one or more processors and memory, the one or more programs comprising instructions for:
managing storage of blobs in a distributed storage system, wherein the distributed storage system includes a plurality of instances, at least a subset of the instances are at physically distinct geographic locations, each respective instance stores data for a plurality of blobs, and each respective blob has corresponding metadata that includes information that identifies a set of one or more instances where the respective blob is stored and includes a blob placement policy that specifies the desired number of copies of the respective blob as well as the desired locations for copies of the respective blob; and
wherein managing storage of the blobs includes:
comparing the desired number of copies of each respective blob and the desired locations for copies of the respective blob, as specified in the respective blob placement policy for the respective blob, to a current number of copies of the respective blob and current locations of copies of the respective blob; and
issuing commands to delete a copy of the respective blob or to replicate the respective blob to another instance in response to determining that the current number of copies of the respective blob is inconsistent with the desired number of copies of the respective blob or the current locations of the respective blob are inconsistent with the desired locations for copies of the respective blob, as specified in the respective blob placement policy for the respective blob.

10. The computer readable storage medium of claim 9, wherein one or more blob placement policies further specify data store type requirements of blob replicas.

11. The computer readable storage medium of claim 10, wherein the data store types include inline data stores, BigTable data stores, file system data stores, and tape data stores.

12. The computer readable storage medium of claim 9, wherein the one or more programs further comprise instructions for dynamically replicating a first blob from one instance to another instance based on a user request to access the first blob, wherein the first blob is not stored at an instance near the user.

* * * * *